(12) United States Patent
Dou et al.

(10) Patent No.: US 11,356,233 B2
(45) Date of Patent: Jun. 7, 2022

(54) INFORMATION TRANSMISSION METHOD AND COMMUNICATIONS APPARATUS

(71) Applicant: HUAWEI TECHNOLOGIES CO., LTD., Guangdong (CN)

(72) Inventors: Shengyue Dou, Shanghai (CN); Ting Wang, Shanghai (CN); Yi Huang, Shenzhen (CN); Yuanjie Li, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 25 days.

(21) Appl. No.: 16/786,129

(22) Filed: Feb. 10, 2020

(65) Prior Publication Data

US 2020/0235901 A1    Jul. 23, 2020

Related U.S. Application Data

(63) Continuation of application No. PCT/CN2018/099824, filed on Aug. 10, 2018.

(30) Foreign Application Priority Data

Aug. 10, 2017   (CN) .......................... 201710682732.7

(51) Int. Cl.
*H04L 5/10* (2006.01)
*H04L 5/00* (2006.01)
(Continued)

(52) U.S. Cl.
CPC .............. *H04L 5/10* (2013.01); *H04L 5/0051* (2013.01); *H04W 72/042* (2013.01); *H04W 72/1273* (2013.01)

(58) Field of Classification Search
CPC ...... H04L 5/10; H04L 5/0051; H04W 72/042; H04W 72/1273; H04W 72/04; H04W 72/02; H04W 72/1242
(Continued)

(56) References Cited

U.S. PATENT DOCUMENTS

2011/0237283 A1   9/2011   Shan et al.
2016/0020882 A1*  1/2016   Shimezawa ......... H04L 27/2613
                                                         370/330
(Continued)

FOREIGN PATENT DOCUMENTS

CN   103188041 A   7/2013
CN   103795513 A   5/2014
(Continued)

OTHER PUBLICATIONS

Intel Corporation, "Enhancements and TP for non-coherent JT", 3GPP TSG HAN WG1 Meeting #88, R1-1702171, Athens, Greece, Feb. 13-17, 2017, 6 pages.
(Continued)

*Primary Examiner* — Candal Elpenord
(74) *Attorney, Agent, or Firm* — Fish & Richardson P.C.

(57) ABSTRACT

This application provides an information transmission method and a communications apparatus. The method includes: receiving downlink control information DCI, where the DCI includes indication information, the indication information indicates at least one demodulation reference signal DMRS antenna port group and layer information of downlink data, the at least one DMRS antenna port group is one or more of a plurality of DMRS antenna port groups, and DMRS antenna ports in a same DMRS antenna port group satisfy a quasi co-location QCL relationship; and determining, based on the indication information, a DMRS antenna port occupied by the downlink data. According to
(Continued)

embodiments of this application, a DMRS antenna port can be indicated when DMRS antenna ports are grouped.

10 Claims, 5 Drawing Sheets

(51) Int. Cl.
   *H04W 72/04* (2009.01)
   *H04W 72/12* (2009.01)

(58) Field of Classification Search
   USPC .................................................. 370/329–330
   See application file for complete search history.

(56) References Cited

U.S. PATENT DOCUMENTS

| | | | |
|---|---|---|---|
| 2017/0201360 A1* | 7/2017 | Shin | H04J 13/004 |
| 2018/0042028 A1* | 2/2018 | Nam | H04B 7/0626 |
| 2018/0351719 A1* | 12/2018 | Lee | H04L 1/00 |
| 2019/0159209 A1* | 5/2019 | Xiao | H04L 5/0051 |
| 2020/0228267 A1* | 7/2020 | Park | H04B 7/0639 |
| 2020/0383091 A1* | 12/2020 | Park | H04L 5/0048 |

FOREIGN PATENT DOCUMENTS

| | | |
|---|---|---|
| CN | 106105052 A | 11/2016 |
| CN | 106470088 A | 3/2017 |
| CN | 106685580 A | 5/2017 |
| WO | 2017020201 A1 | 2/2017 |
| WO | 2017039400 A1 | 3/2017 |

OTHER PUBLICATIONS

Extended European Search Report issued in European Application No. 18844022.6 dated Jul. 1, 2020, 8 pages.
Office Action issued in Chinese Application No. 201710682732.7 dated Jan. 27, 2021, 10 pages.
Huawei, HiSilicon, "QCL assumption for DMRS antenna ports," 3GPP TSG RAN WG1 Meeting #89, R1-1707008, Hangzhou, China, May 15-19, 2017, 2 pages.
Intel Corporation, "QCL assumption for DM-RS antenna ports," GPP TSG RAN WG1 Meeting #88bis, R1-1704690 Spokane, USA, Apr. 3-7, 2017, 2 pages.
3GPP TS 36.212 V14.3.0, "3rd Generation Partnership Project; Technical Specification Group Radio Access Network Evolved Universal Terrestrial Radio Access (E-UTRA); Multiplexing and channel coding (Release 14)," Jun. 2016, 198 pages.
PCT International Search Report and Written Opinion issued in International Application No. PCT/CN2018/099824 dated Oct. 24, 2018, 15 pages (with English translation).
Huawei, HiSilicon, "DMRS port to layer mapping and resouice allocation for non-coherent JT," 3GPP TSG RAN WG1 Meeting #90, R1-1712094, Prague, Czech Republic, Aug. 21-25, 2017, 5 pages.
Office Action issued in Chinese Application No. 201710682732.7 dated Sep. 30, 2021, 9 pages.

* cited by examiner

INFORMATION TRANSMISSION METHOD AND COMMUNICATIONS APPARATUS

CROSS-REFERENCE TO RELATED APPLICATIONS

This application is a continuation of International Application No. PCT/CN2018/099824, filed on Aug. 10, 2018, which claims priority to Chinese Patent Application No. 201710682732.7, filed on Aug. 10, 2017. The disclosures of the aforementioned applications are hereby incorporated by reference in their entireties.

TECHNICAL FIELD

This application relates to the communications field, and in particular, to an information transmission method and an apparatus.

BACKGROUND

To support coordinated multipoint transmission/reception (coordination multiple point, CoMP), a concept of quasi co-location (quasi-co-located, QCL) is used, where antenna ports are required to satisfy a specific QCL limitation.

In CoMP communication, signals may come from a plurality of transmission points (transmission point, TP, or transmission reception point, TRP), and an antenna port in the CoMP needs to satisfy the QCL limitation. A network device may sometimes need to configure a plurality of groups of QCL information to notify a terminal device. For example, in a non-coherent joint transmission (non-coherent Joint Transmission, NCJT) case, different transmission points (for example, network devices) may transmit different multiple-input multiple-output (multiple-input multiple-output, MIMO) data streams (MIMO layers) to a same terminal device on a same time-frequency resource in a same carrier. Therefore, a demodulation reference signal (demodulation reference signal, DMRS) antenna port (sometimes also referred to as a DMRS ports) and a channel state information-reference signal (channel state information reference signal, CSI-RS) antenna port (sometimes also referred to as a CSI-RS port) that are on a first transmission point are QCL-ed (that is, satisfy a QCL relationship), a DMRS antenna port and a CSI-RS antenna port that are on a second transmission point are QCL-ed, but an antenna port on the first transmission point and an antenna port on the second transmission point are not QCL-ed (that is, do not satisfy the QCL relationship).

To correctly receive and demodulate a signal, antenna port information needs to be known. How to effectively indicate the antenna port information becomes an urgent problem to be resolved.

SUMMARY

This application provides an information transmission method and an apparatus, to indicate an antenna port.

According to a first aspect, an information transmission method and an apparatus are provided. A network device generates downlink control information DCI, where the DCI includes indication information, the indication information indicates at least one demodulation reference signal DMRS antenna port group and layer information of data, the at least one DMRS antenna port group is one or more of a plurality of DMRS antenna port groups, and DMRS antenna ports in a same DMRS antenna port group satisfy a quasi co-location QCL relationship; and sends the DCI.

Correspondingly, a terminal device receives the DCI, and determines, based on the indication information, a DMRS antenna port occupied by the data.

It should be understood that the method in this embodiment of this application may be applied to uplink transmission, or may be applied to downlink transmission. When the method is applied to uplink transmission, the plurality of DMRS antenna port groups are obtained by grouping DMRS ports that are used by the terminal device side for uplink transmission, data scheduled by using the DCI is uplink data, and the layer information of the data indicated in the indication information is layer information of the uplink data. When the method is applied to the foregoing transmission scenario, the terminal device may be a device such as a car or an unmanned aerial vehicle that has a wireless transmission function. This embodiment of this application is not limited thereto.

When the method is applied to downlink transmission, the plurality of DMRS antenna port groups are obtained by grouping DMRS ports that are used by the network device side for downlink transmission, data scheduled by using the DCI is downlink data, and the layer information of the data indicated in the indication information is layer information of the downlink data.

For ease of understanding and description, a solution of indicating a DMRS antenna port during downlink transmission is used as an example for description below. It should be understood that, in this specification, only downlink transmission is used as an example to describe a method for indicating a DMRS antenna port. A person skilled in the art may understand that, with reference to the solution of indicating a DMRS antenna port during downlink transmission, a correspondence among indication information, a DMRS antenna port, and layer information of uplink data that are for uplink transmission may be established, to indicate a DMRS port during uplink transmission. For example, for a method for indicating a DMRS port during uplink transmission, the network device side may configure grouping of DMRS ports of the terminal device by using signaling, or after accessing a network, the terminal device reports grouping of DMRS ports of the terminal device by using higher layer signaling such as RRC signaling. The network device side uses, based on grouping information of the DMRS ports of the terminal device and by using DCI (which may alternatively be uplink grant (UL grant), for example, formats (format) 0, 1, and 1A in LTE) for scheduling uplink data, the method in this application to indicate a DMRS port used for uplink transmission. To avoid repetition, the method for indicating a DMRS antenna port during uplink transmission is not described in detail in this specification. For a specific process, refer to the method for downlink transmission in this specification.

Specifically, when the method is applied to downlink transmission, the information transmission method in this embodiment of this application includes: A network device generates downlink control information DCI, where the DCI includes indication information, the indication information indicates at least one demodulation reference signal DMRS antenna port group and layer information of downlink data, the at least one DMRS antenna port group is one or more of a plurality of DMRS antenna port groups, and DMRS antenna ports in a same DMRS antenna port group satisfy a quasi co-location QCL relationship; and sends the DCI.

Correspondingly, a terminal device receives the DCI, and determines, based on the indication information, a DMRS antenna port occupied by the downlink data.

Therefore, in this embodiment of this application, when grouping is used, a quantity of layers of the downlink data and the at least one antenna port group are indicated by using the indication information, so that the terminal device can obtain the DMRS antenna port, thereby indicating the DMRS antenna port when grouping is used, and improving network performance.

The layer information of the downlink data includes: a total quantity of layers of the downlink data, or a quantity of layers that is corresponding to each DMRS antenna port group, or a total quantity of layers of the downlink data and a quantity of layers that is corresponding to some or all of the at least one DMRS antenna port group.

In this application, the total quantity of layers of the downlink data is a total quantity of layers of downlink data scheduled by using the DCI that is generated by the network device. That is, one piece of DCI corresponds to one total quantity of layers.

In a single-station transmission scenario and a single-DCI joint transmission scenario, the terminal device obtains only one piece of DCI, and a total quantity of layers of downlink data scheduled by using this piece of DCI is equal to a quantity of layers that is of downlink data and that is corresponding to the DCI obtained by the terminal device.

In a multi-DCI (which may also be referred to as multi-PDCCH) joint transmission scenario, the terminal device receives DCI sent by at least two network devices, and each piece of DCI corresponds to one total quantity of layers. A quantity of layers that is of downlink data and that is obtained by the terminal device is a sum of total quantities of layers of downlink data that are corresponding to all of the at least two pieces of DCI.

Optionally, in another embodiment, the indication information in the DCI further indicates one or more of the following information:

a scrambling identity corresponding to the at least one DMRS antenna port group; or an orthogonal cover code OCC used for a downlink DMRS pilot and/or the downlink data; or an antenna port that is occupied by the downlink data and that is in the at least one DMRS antenna port group.

It should be understood that, in this embodiment of this application, the indication information included in the DCI may be an entry of one or more lists, the one or more lists are applicable to one codeword and/or two codewords, and the one or more lists include: the indication information and content corresponding to the indication information (or referred to as content indicated in the indication information). Specifically, the one or more lists may include:

the indication information, the at least one DMRS antenna port group corresponding to the indication information, and the quantity of layers that is corresponding to each DMRS antenna port group; or the indication information, the total quantity of layers of the downlink data corresponding to the indication information, and the at least one DMRS antenna port group; or the indication information, the total quantity of layers of the downlink data corresponding to the indication information, the at least one DMRS antenna port group, and the quantity of layers that is corresponding to some or all of the at least one DMRS antenna port group; or the indication information, the at least one DMRS antenna port group corresponding to the indication information, the quantity of layers that is corresponding to each DMRS antenna port group, and one or more of the following information: the scrambling identity corresponding to the at least one DMRS antenna port group, the orthogonal cover code OCC used for the downlink DMRS pilot and/or the downlink data, or the antenna port that is occupied by the downlink data and that is in the at least one DMRS antenna port group; or the indication information, the total quantity of layers of the downlink data corresponding to the indication information, the at least one DMRS antenna port group, and one or more of the following information: the scrambling identity corresponding to the at least one DMRS antenna port group, the orthogonal cover code OCC used for the downlink DMRS pilot and/or the downlink data, or the antenna port that is occupied by the downlink data and that is in the at least one DMRS antenna port group; or the indication information, the total quantity of layers of the downlink data corresponding to the indication information, the at least one DMRS antenna port group, the quantity of layers that is corresponding to some or all of the at least one DMRS antenna port group, and one or more of the following information: the scrambling identity corresponding to the at least one DMRS antenna port group, the orthogonal cover code OCC used for the downlink DMRS pilot and/or the downlink data, or the antenna port that is occupied by the downlink data and that is in the at least one DMRS antenna port group.

It should be understood that, for ease of description, in this embodiment of this application, the content corresponding to the indication information (which may also be referred to as content related to or indicated by the indication information) may be referred to as "combination information". In other words, the list in this embodiment of this application may include a plurality of pieces of indication information and corresponding combination information thereof.

To be specific, the list in this embodiment of this application includes a one-to-one correspondence between a plurality of pieces of indication information and a plurality of pieces of combination information. In this embodiment of this application, the correspondence between the plurality of pieces of indication information and the plurality of pieces of combination information may be indicated by using the list, or may be indicated in another manner. This embodiment of this application is not limited thereto.

In this embodiment of this application, the correspondence between the indication information and the combination information may be specified in a protocol, or may be prestored or preconfigured. In other words, the network device and the terminal device may obtain the one-to-one correspondence between the plurality of pieces of indication information and the plurality of pieces of combination information in advance.

In this embodiment of this application, "the correspondence between the indication information and the combination information" may also be referred to as "a mapping relationship between the indication information and the combination information". In this embodiment of this application, a one-to-one correspondence (a mapping relationship) between the plurality of pieces of combination information and the plurality of pieces of QCL indication information may be described in a tabular form. However, this embodiment of this application is not limited thereto. In this specification, the tabular form is used merely for easy and vivid description of the correspondence. In an actual application, the correspondence may be in the tabular form, or may be a string of characters or a segment of code. This embodiment of this application is not limited thereto.

In an implementation, in this embodiment of this application, the combination information may include a group identity of the at least one port group, and the at least one port group is indicated by using the group identity of the at least one port group. In other words, in this embodiment of this application, each DMRS antenna port group is identified by a group identity. The group identity may also be referred to as a group index.

In this embodiment of this application, antenna ports of the network device may be grouped into a plurality of DMRS antenna port groups, and the plurality of DMRS antenna port groups may be configured by the network device. Correspondingly, the method may further include: The network device sends group configuration information to the terminal device, where the group configuration information is used to configure the plurality of DMRS antenna port groups. For example, the network device may send the group configuration information by using higher layer signaling such as RRC signaling, for example, to configure a quantity of DMRS port groups and/or a specific DMRS antenna port (where the antenna port may be identified by an antenna port number) included in each DMRS port group.

The plurality of DMRS antenna port groups include two or more antenna port groups. For example, the plurality of DMRS antenna port groups include two DMRS antenna port groups: a DMRS antenna port group 1 and a DMRS antenna port group 2. For another example, the plurality of DMRS antenna port groups include three DMRS antenna port groups: a DMRS antenna port group 1, a DMRS antenna port group 2, and a DMRS antenna port group 0.

When the DMRS antenna port group 0 includes all DMRS ports of the network device, it may also be considered that the network device does not group the DMRS ports, or it may be considered that the network device groups the DMRS ports into one group.

The DMRS antenna port group 1 includes a part of antenna ports in ports of the network device, the DMRS antenna port group 2 includes another part of antenna ports in the ports of the network device, and the antenna ports in the DMRS antenna port group 1 or the antenna ports in the DMRS antenna port group 2 are a subset of the antenna ports in the DMRS antenna port group 0, where the subset may further be a proper subset. An intersection set between the antenna ports in the DMRS antenna port group 1 and the antenna ports in the DMRS antenna port group 2 is empty. Optionally, a union set of the DMRS antenna port group 1 and the DMRS antenna port group 2 may be a subset of the DMRS antenna port group 0.

The antenna ports in the DMRS antenna port group 1 satisfy a first QCL relationship, and the antenna ports in the DMRS antenna port group 2 satisfy a second QCL relationship. The first QCL relationship is different from the second QCL relationship.

A plurality of antenna ports of the network device may include, for example, eight antenna ports (for example, antenna ports 1000 to 1007) or 12 antenna ports (for example, antenna ports 1000 to 1011), and the plurality of antenna ports may be grouped into the foregoing plurality of antenna port groups.

The 12 antenna ports are used as an example. The DMRS antenna port group 1 (a DMRS group index 1) includes antenna ports {1000, 1002, 1004, 1006, 1008, and 1010}, and the DMRS antenna port group 2 (a DMRS group index 2) includes antenna ports {1001, 1003, 1005, 1007, 1009, and 1011}, and the DMRS antenna port group 0 (a DMRS group index 0) includes antenna ports {1000 to 1011}.

The foregoing grouping is merely an example. In an actual application, grouping may be flexibly performed based on a communications requirement. For example, the DMRS antenna port group 1 (the DMRS group index 1) includes antenna ports {1000 to 1004} or {1000 to 1005}, the DMRS antenna port group 2 (the DMRS group index 2) includes antenna ports {1007 to 1011} or {1006 to 1011}, and the DMRS antenna port group 0 (the DMRS group index 0) includes antenna ports {1000 to 1011}. This embodiment of this application is not limited thereto.

The eight antenna ports are used as another example. The DMRS antenna port group 1 (a DMRS group index 1) includes antenna ports {1000, 1002, 1004, and 1006}, the DMRS antenna port group 2 (a DMRS group index 2) includes antenna ports {1001, 1003, 1005, and 1007}, and the DMRS antenna port group 0 (a DMRS group index 0) includes antenna ports {1000 to 1007}. Alternatively, the DMRS antenna port group 1 (a DMRS group index 1) includes antenna ports {1000 to 1003}, the DMRS antenna port group 2 (a DMRS group index 2) includes antenna ports {1004 to 1007}, the DMRS antenna port group 0 (a DMRS group index 0) includes antenna ports {1000 to 1007}, and so on. This embodiment of this application is not limited thereto.

In the foregoing example, a quantity of the antenna ports in the DMRS antenna port group 1 is equal to a quantity of the antenna ports in the DMRS antenna port group 2. Optionally, in this embodiment of this application, the quantity of the antenna ports in the DMRS antenna port group 1 may be not equal to the quantity of the antenna ports in the DMRS antenna port group 2.

The foregoing grouping case may be a result of grouping performed by the network device on the plurality of antenna ports based on a pilot pattern corresponding to the antenna port and in a plurality of manners such as frequency division, time division, code division, and port sequence division.

Optionally, whether the network device enables the foregoing DMRS grouping may be configured for the terminal device by using signaling. For example, the network device may configure, by using higher layer RRC signaling, whether the terminal device uses the DMRS port grouping of the network device. For example, indication information DMRS-Port-Group in the RRC signaling is 'ON', indicating that the network device instructs the terminal device to use the DMRS grouping; or indication information DMRS-Port-Group in the RRC signaling is 'OFF', indicating that the network device instructs the terminal device not to use the DMRS grouping.

There are three data scheduling cases (case) in 5G. A first data scheduling case is single-DCI (which may also be referred to as single-PDCCH) single-cell transmission applied to a scenario shown in FIG. 1. To be specific, there is only one network device for sending DCI and downlink data. A second data scheduling case is single-DCI (which may also be referred to as single-PDCCH) joint transmission in a joint transmission scenario. To be specific, one of at least two network devices that perform joint transmission sends DCI, and the at least two network devices jointly send data. A third data scheduling case is multi-DCI (which may also be referred to as multi-PDCCH) joint transmission in a joint transmission scenario. To be specific, at least two network devices for joint scheduling separately send DCI, and the at least two network devices jointly send data.

For example, in this embodiment of this application, that the DMRS antenna port group 0 includes all antenna ports may be understood as that the network device does not group DMRSs, or groups all the DMRS ports into one group. In the first data scheduling case in the 5G system, namely, the single-station transmission scenario. In this case, first combination information corresponding to first indication information in the DCI is used to indicate layer information of the downlink data and one antenna port group (for example, the DMRS antenna port group 0). The antenna ports in the DMRS antenna port group 1 and the antenna ports in the DMRS antenna port group 2 correspond to different QCL relationships. In the second data scheduling case in the 5G system, namely, the single-DCI (which may also be referred to as single-PDCCH) joint transmission scenario, first combination information corresponding to first indication information in the DCI is used to indicate layer information of the downlink data and two antenna port groups (for example, the DMRS antenna port group 1 and the DMRS antenna port group 2). In the third data scheduling case in the 5G system, namely, the multi-DCI (which may also be referred to as multi-PDCCH) joint transmission scenario, each network device sends one piece of DCI, and each piece of DCI is used to indicate only one DMRS antenna port group. For example, a first network device and a second network device perform joint transmission. The first network device sends first DCI, and combination information corresponding to indication information in the first DCI is used to indicate first layer information and one antenna port group (for example, one of the DMRS antenna port group 1 and the DMRS antenna port group 2, for example, the DMRS antenna port group 1). The second network device sends second DCI, and combination information corresponding to indication information in the second DCI is used to indicate second layer information and one antenna port group (for example, the other one of the DMRS antenna port group 1 and the DMRS antenna port group 2, for example, the DMRS antenna port group 2).

In the first data scheduling case and the second data scheduling case, the terminal device obtains only one piece of DCI, and in the third data scheduling case, the terminal device obtains DCI separately sent by two network devices that perform joint transmission.

For example, the DMRS antenna port group 1 (the DMRS group index 1) includes antenna ports {1000 to 1005}, the DMRS antenna port group 2 (the DMRS group index 2) includes antenna ports {1006 to 1011}, and the DMRS antenna port group 0 (the DMRS group index 0) includes antenna ports {1000 to 1011}.

In the first data scheduling case, for example, the terminal device obtains combination information (for example, 2 layers, DMRS group index 0) corresponding to a value of the first indication information in the DCI that is sent by the network device. The terminal device may determine that DMRS antenna ports are the first two antenna ports such as the antenna ports 1000 and 1001 that are in the DMRS antenna port group 0.

In the second data scheduling case, for example, the terminal device obtains combination information (for example, 4 layers: DMRS group index 1, 2 layers; DMRS group index 2, 2 layers) corresponding to the first indication information in the DCI that is sent by the network device. The terminal device may determine that DMRS antenna ports are the first and second antenna ports such as the antenna ports 1000 and 1001 in the DMRS antenna port group 1 and the first and second antenna ports such as the antenna ports 1006 and 1007 in the DMRS antenna port group 2. In addition, the terminal device may determine that the antenna ports 1000 and 1001 satisfy the first QCL relationship, and may correspond to one network device; and that the antenna ports 1006 and 1007 satisfy the second QCL relationship, and may correspond to another network device.

In the third data scheduling case, the terminal device receives the first DCI sent by the first network device and the second DCI sent by the second network device. First indication information in the first DCI is used to indicate a total quantity of layers of downlink data sent by the first network device and the DMRS antenna port group 1, and the second indication information in the second DCI is used to indicate a total quantity of layers of downlink data sent by the second network device and the DMRS antenna port group 2. The DMRS antenna port group 1 includes an antenna port used by the first network device to send the downlink data, and the DMRS antenna port group 2 includes an antenna port used by the second network device to send the downlink data. The antenna ports in the DMRS antenna port group 1 satisfy the first QCL relationship, and the antenna ports in the DMRS antenna port group 2 satisfy the second QCL relationship. For example, the terminal device may determine DMRS antenna ports such as the antenna ports 1000 to 1002 based on combination information (3 layers, DMRS group index 1) corresponding to the first indication information. The terminal device determines DMRS antenna ports such as the antenna ports 1006 to 1008 based on combination information (3 layers, DMRS group index 2) corresponding to the second indication information. In addition, the terminal device may determine that the antenna ports 1000 to 1002 corresponding to the first network device satisfy the first QCL relationship, and that the antenna ports 1006 to 1008 corresponding to the second network device satisfy the second QCL relationship.

Therefore, in this embodiment of this application, when grouping is used, the quantity of layers of the downlink data and the at least one DMRS antenna port group are indicated by using the indication information, so that the terminal device can obtain the DMRS antenna port, thereby indicating the DMRS antenna port when grouping is used, and improving network performance.

In an implementation, a specific antenna port number may be determined according to a preset rule. For example, a quantity of layers (a quantity of antenna ports) that is corresponding to an antenna port group may be selected based on a sequence of antenna port numbers in the antenna port group. In other words, assuming that a quantity of layers that is corresponding to an $i^{th}$ antenna port group in the plurality of antenna port groups is n, the downlink data occupies first n DMRS antenna ports in the $i^{th}$ antenna port group, where i is an integer greater than or equal to 1, and n is an integer greater than or equal to 1.

Optionally, in an implementation of the first aspect, each piece of indication information in the correspondence is used to indicate the layer information of the downlink data and one of the plurality of DMRS antenna port groups.

It should be understood that, in this case, the foregoing implementation may be applied to the first data scheduling case in the 5G system, namely, the single-station transmission scenario, or may be applied to the third data scheduling case in the 5G system, the multi-DCI (which may also be referred to as multi-PDCCH) joint transmission scenario.

Optionally, in an implementation of the first aspect, each piece of indication information in the correspondence is used to indicate the layer information of the downlink data and at least two of the plurality of DMRS antenna port groups. In any two of the at least two DMRS antenna port groups, an antenna port in one DMRS antenna port group and an antenna port in the other DMRS antenna port group do not satisfy the QCL relationship. In other words, antenna ports in different DMRS antenna port groups do not satisfy the QCL relationship.

It should be understood that, in this case, the foregoing implementation may be applied to the second data scheduling case in the 5G system, namely, the single-DCI (which may also be referred to as single-PDCCH) joint transmission scenario.

Therefore, in this embodiment of this application, when grouping is used, a quantity of layers of the downlink data and the at least one antenna port group are indicated by using the indication information, so that the terminal device can obtain the DMRS antenna port, thereby indicating the DMRS antenna port when grouping is used, and improving network performance.

According to a second aspect, an information transmission method and an apparatus are provided.

A network device generates indication information and quasi co-location QCL information, where the QCL information is used to indicate a QCL type of demodulation reference signal DMRS antenna ports or a quantity of QCL relationships that DMRS antenna ports satisfy, the indication information indicates a total quantity N of layers of downlink data and N non-sequentially numbered DMRS antenna ports corresponding to sequentially numbered layers, or indicates a total quantity N of layers of downlink data and N sequentially numbered DMRS antenna ports corresponding to sequentially numbered layers, and N is an integer not less than 1; and sends the indication information and the QCL information.

Correspondingly, a terminal device receives the indication information and the quasi co-location QCL information; determines, based on the QCL information and the indication information, whether the indication information is used to indicate the total quantity N of layers of the downlink data and the N non-sequentially numbered DMRS antenna ports corresponding to the sequentially numbered layers or is used to indicate the total quantity N of layers of the downlink data and the N sequentially numbered DMRS antenna ports corresponding to the sequentially numbered layers; and determines, based on the determined indication information, a DMRS antenna port occupied by the downlink data.

Therefore, in this embodiment of this application, when antenna ports are grouped, an existing method for indicating an antenna port is redesigned, so that a DMRS antenna port is indicated when DMRS antenna ports are grouped.

In this embodiment of this application, the N non-sequentially numbered DMRS antenna ports corresponding to the sequentially numbered layers indicate that the N layers are numbered and sorted according to a sequence, that is, the first layer, the second layer, the third layer, . . . , and an $N^{th}$ layer, and numbers of DMRS antenna ports corresponding to the first layer to the $N^{th}$ layer are not arranged according to a sequence. The N sequentially numbered DMRS antenna ports corresponding to the sequentially numbered layers indicate that numbers of DMRS antenna ports corresponding to the first layer to an $N^{th}$ layer are sequentially arranged, where N is an integer greater than or equal to 1.

For example, if N is 5, the N non-sequentially numbered DMRS antenna ports corresponding to the sequentially numbered layers may be antenna ports 7, 8, 9, 10, and 12, and the N sequentially numbered DMRS antenna ports corresponding to the sequentially numbered layers may be antenna ports 7 to 11.

In this embodiment of this application, for ease of description, "the total quantity N of layers of the downlink data and the N non-sequentially numbered DMRS antenna ports corresponding to the sequentially numbered layers" that are indicated in the indication information above may be referred to as "first combination information", and "the total quantity N of layers of the downlink data and the N sequentially numbered DMRS antenna ports corresponding to the sequentially numbered layers" that are indicated in the indication information above may be referred to as "second combination information".

In this embodiment of this application, the indication information may be an entry of one or more lists, and the one or more lists include a correspondence between the indication information and the first combination information and/or the second combination information. In other words, the list in this embodiment of this application includes a plurality of pieces of indication information and combination information (namely, the first information and/or the second combination information) corresponding thereto. The list in this embodiment of this application may indicate a correspondence between the indication information and the combination information. In this embodiment of this application, the correspondence between the indication information and the combination information may be specified in a protocol, or may be prestored or preconfigured. In other words, the network device and the terminal device may obtain the correspondence between the indication information and the combination information in advance.

In this embodiment of this application, "the correspondence between the indication information and the combination information" may also be referred to as "a mapping relationship between the indication information and the combination information". In this embodiment of this application, the correspondence (the mapping relationship) between the indication information and the combination information may be described in a tabular form. However, this embodiment of this application is not limited thereto. In this specification, the tabular form is used merely for easy and vivid description of the correspondence. In an actual application, the correspondence may be in the tabular form, or may be a string of characters, an array, or a segment of code. This embodiment of this application is not limited thereto.

In this embodiment of this application, in the correspondence between the indication information and the combination information, first indication information may correspond to only the first combination information or only the second combination information, or first indication information may correspond to the first combination information and the second combination information.

Optionally, in an implementation of the second aspect, the QCL information is used to indicate the QCL type of the DMRS antenna ports, the QCL information is sent by the network device by using higher layer signaling, and the indication information is sent by the network device by using downlink control information DCI. Alternatively, the QCL information is used to indicate the quantity of QCL relationships that the DMRS antenna ports satisfy, and the QCL information and the indication information are sent by the network device by using DCI.

Optionally, in an implementation of the second aspect, that the indication information is used to indicate the total quantity N of layers of the downlink data and the N non-sequentially numbered DMRS antenna ports corresponding to the sequentially numbered layers includes:

the indication information is used to indicate that the total quantity of layers of the downlink data is 3, and the non-sequentially numbered DMRS antenna ports corresponding to the sequentially numbered layers are antenna ports 7, 9, and 10 in sequence; or the indication information is used to indicate that the total quantity of layers of the downlink data is 5, and the non-sequentially numbered DMRS antenna ports corresponding to the sequentially numbered layers are antenna ports 7, 8, 9, 10, and 12 in sequence; or the indication information is used to indicate that the total quantity of layers of the downlink data is 6, and the non-sequentially numbered DMRS antenna ports corresponding to the sequentially numbered layers are antenna ports 7, 8, 11, 9, 10, and 12 in sequence; or the indication information is used to indicate that the total quantity of layers of the downlink data is 7, and the non-sequentially numbered DMRS antenna ports corresponding to the sequentially numbered layers are antenna ports 7, 8, 11, 9, 10, 12, and 14 in sequence; or the indication information is used to indicate that the total quantity of layers of the downlink data is 8, and the non-sequentially numbered DMRS antenna ports corresponding to the sequentially numbered layers are antenna ports 7, 8, 11, 13, 9, 10, 12, and 14 in sequence.

In this application, the total quantity of layers of the downlink data is a total quantity of layers of downlink data scheduled by using the DCI for scheduling the downlink data.

Optionally, in an implementation of the second aspect, the N non-sequentially numbered DMRS antenna ports that are indicated in the indication information and that are corresponding to the sequentially numbered layers include a first group of DMRS antenna ports corresponding to a first codeword and a second group of DMRS antenna ports corresponding to a second codeword.

Optionally, in an implementation of the second aspect, that the indication information is used to indicate the total quantity N of layers of the downlink data and the N non-sequentially numbered DMRS antenna ports corresponding to the sequentially numbered layers includes:

the indication information is used to indicate that the total quantity of layers of the downlink data is 3, the first group of DMRS antenna ports corresponding to the first codeword include an antenna port 7, and the second group of DMRS antenna ports corresponding to the second codeword include antenna ports 9 and 10; or the indication information is used to indicate that the total quantity of layers of the downlink data is 5, the first group of DMRS antenna ports corresponding to the first codeword include antenna ports 7 and 8, and the second group of DMRS antenna ports corresponding to the second codeword include antenna ports 9, 10, and 12; or the indication information is used to indicate that the total quantity of layers of the downlink data is 6, the first group of DMRS antenna ports corresponding to the first codeword include antenna ports 7, 8, and 11, and the second group of DMRS antenna ports corresponding to the second codeword include antenna ports 9, 10, and 12; or the indication information is used to indicate that the total quantity of layers of the downlink data is 7, the first group of DMRS antenna ports corresponding to the first codeword include antenna ports 7, 8, and 11, and the second group of DMRS antenna ports corresponding to the second codeword include antenna ports 9, 10, 12, and 14; or the indication information is used to indicate that the total quantity of layers of the downlink data is 8, the first group of DMRS antenna ports corresponding to the first codeword include antenna ports 7, 8, 11, and 13, and the second group of DMRS antenna ports corresponding to the second codeword include antenna ports 9, 10, 12, and 14.

Optionally, in an implementation of the second aspect, when the QCL information indicates that the QCL type of the DMRS antenna ports is a type A or a type B, or when the QCL information indicates that the DMRS antenna ports satisfy one QCL (which may also be referred to as a single QCL) relationships, the indication information indicates the total quantity N of layers of the downlink data and the N sequentially numbered DMRS antenna ports corresponding to the sequentially numbered layers; and when the QCL information indicates that the QCL type of the DMRS antenna ports is a non-type-A QCL type or a non-type-B QCL type, or when the QCL information indicates that the DMRS antenna ports satisfy at least two QCL relationships, the indication information is used to indicate the total quantity N of layers of the downlink data and the N non-sequentially numbered DMRS antenna ports corresponding to the sequentially numbered layers, where a QCL relationship between the DMRS antenna ports corresponding to the non-type-A QCL type or the non-type-B QCL type (which may be referred to as a type C) is different from a QCL relationship between the DMRS antenna ports corresponding to the type A or the type B.

On the terminal device side, that the terminal device determines, based on the QCL information and the first indication information, whether the first indication information is used to indicate the total quantity N of layers of the downlink data and the N non-sequentially numbered DMRS antenna ports corresponding to the sequentially numbered layers or is used to indicate the total quantity N of layers of the downlink data and the N sequentially numbered DMRS antenna ports corresponding to the sequentially numbered layers includes:

when the QCL information indicates that the QCL type of the DMRS antenna ports is the type A or the type B, or when the QCL information indicates that the DMRS antenna ports satisfy one QCL relationship, the terminal device determines that the first indication information is used to indicate the total quantity N of layers of the downlink data and the N sequentially numbered DMRS antenna ports corresponding to the sequentially numbered layers; and when the QCL information indicates that the QCL type of the DMRS antenna ports is the non-type-A QCL type or the non-type-B QCL type, or when the QCL information indicates that the DMRS antenna ports satisfy at least two QCL relationships, the terminal device determines that the first indication information is used to indicate the total quantity N of layers of the downlink data and the N non-sequentially numbered DMRS antenna ports corresponding to the sequentially numbered layers.

Optionally, in a design, that the QCL type of the DMRS antenna ports is the type C is indicated in the QCL information. In this case, it may also be understood that the indicated type is the non-type A or the non-type B.

Two QCL types, namely, the type A (Type-A) and the type B (Type-B), are defined in an existing LTE protocol. The type A defines a QCL configuration of one TP. To be specific, antenna ports (including a CRS, a DMRS, and a CSI-RS) of the TP are QCL-ed. The type B defines a QCL configuration of antenna ports of a plurality of TPs, and the QCL configuration of the antenna ports of the plurality of TPs may be indicated by using a PDSCH resource mapping and quasi co-location indicator (PDSCH RE mapping and quasi-co-location indicator, PQI) (2 bits) in DCI. The PQI is specifically used to indicate that one or more of a channel state information-reference signal (channel state information-reference signal, CSI-RS), a DMRS, a phase tracking reference signal (phase tracking reference signal, PTRS) (which may also be referred to as a phase compensation reference signal (phase compensation reference signal, PCRS) or a phase noise reference signal (phase noise reference signal for short)), and an SS block (including one or more of a synchronization signal and a broadcast channel, where the synchronization signal includes a primary synchronization signal PSS and/or a secondary synchronization signal SSS) satisfy a quasi co-location relationship. In this embodiment of this application, the type A may correspond to a case of a same antenna panel of a same network device in NR, and the type B may correspond to a case of different antenna panels of a same network device in NR or a case of different network devices in NR.

In the type A and the type B, all DMRS antenna ports satisfy the QCL relationship. The type A and the type B may correspond to single-station transmissions or dynamic point selection (dynamic point selection, DPS) transmission and/or dynamic point blanking (dynamic point blanking, DPB) transmission. For example, for the type A or B, antenna ports 7 to 14 all satisfy the QCL relationship.

That the QCL indication information indicates that the QCL type of the DMRS antenna ports is the type C corresponds to NCJT. A QCL relationship of the DMRS antenna ports corresponding to the type C is different from a QCL relationship of the DMRS antenna ports corresponding to the type A or the type B. For example, for the type C, the antenna ports 7, 8, 11, and 13 satisfy a QCL relationship, and the antenna ports 9, 10, 12, and 14 satisfy a QCL relationship. However, any one of the antenna ports 7, 8, 11, and 13 and any one of the antenna ports 9, 10, 12, and 14 do not satisfy a QCL relationship. It should be noted that, for the type C, when rank (rank)=2, that is, when layer (layer)=2, the antenna port 7 belongs to one group, the antenna port 8 belongs to another group, and the antenna port 7 and the antenna port 8 do not satisfy a QCL relationship.

All DMRS antenna ports in single-station transmission are QCL-ed. In other words, the DMRS antenna ports satisfy a single QCL relationship. Therefore, that the QCL information indicates that the DMRS antenna ports satisfy the single QCL relationship, corresponds to the single-station transmission or DPS and/or DPB transmission.

DMRS antenna ports of two network devices for NCJT satisfy different QCL relationships. In other words, DMRS antenna ports of downlink data satisfy at least two QCL relationships. Therefore, that the QCL information indicates that the DMRS antenna ports satisfy a plurality of QCL relationships, corresponds to the NCJT.

Therefore, in this embodiment of this application, when grouping is used, the combination information can be indicated by using the indication information, and a DMRS port is indicated by using the combination information, so that the DMRS antenna port can be indicated when the DMRS antenna ports are grouped.

It should be noted that the example in the foregoing embodiment describes only the method for indicating a DMRS port during downlink transmission, but this embodiment of this application is not limited thereto. A person skilled in the art may definitely make various equivalent modifications or changes based on the example provided above. For example, a person skilled in the art understands that, in the embodiments of this application, a method for indicating a DMRS port during uplink transmission may be similarly obtained based on the descriptions of the foregoing embodiment of this application. For example, for the method for indicating a DMRS port during uplink transmission, a network device may configure grouping of DMRS ports of a terminal device by using signaling, or after accessing a network, a terminal device reports grouping of DMRS ports of the terminal device by using RRC signaling. The network device side uses, based on grouping information of the DMRS ports of the terminal device and by using DCI (which may alternatively be UL grant, for example, formats 0, 1, and 1A in LTE, or a corresponding format in NR) for scheduling uplink data, the method in this application to indicate a DMRS port used for uplink transmission. Such modifications and changes also fall within the scope of the embodiments of this application.

According to a third aspect, a network device is provided. The network device provided in this application has a function of implementing behavior of the network device in the foregoing method aspects, and includes a corresponding means (means) configured to perform steps or functions described in the foregoing method aspects. The steps or the functions may be implemented by software, hardware, or a combination of hardware and software.

In a possible design, the network device includes one or more processors and a transceiver unit. The one or more processors are configured to support the network device in implementing a corresponding function in the foregoing methods, for example, generating DCI, or generating indication information and QCL information. The transceiver unit is configured to support the network device in communicating with another device, to implement a transmission/reception function, for example, sending the DCI generated by the processor, or sending the indication information and the QCL information that are generated by the processor, and sending RRC signaling.

In this application, "/" may indicate "and/or".

Optionally, the network device may further include one or more memories. The memory is configured to: be coupled to the processor, and store a program instruction and data that are necessary for the network device. The one or more memories may be integrated with the processor, or may be separate from the processor. This is not limited in this application.

The network device may be a base station, a TRP, or the like, and the transceiver unit may be a transceiver or a transceiver circuit.

The network device may alternatively be a communications chip. The transceiver unit may be an input/output circuit or an interface of the communications chip.

In another possible design, the network device includes a transceiver, a processor, and a memory. The processor is configured to control the transceiver to send and receive a signal, the memory is configured to store a computer program, and the processor is configured to invoke the computer program from the memory and run the computer program, to enable the network device to perform the method performed by the network device according to any one of the first aspect, the second aspect, the possible implementations of the first aspect, or the possible implementations of the second aspect.

According to a fourth aspect, a terminal device is provided. The terminal device provided in this application has a function of implementing behavior of the terminal device in the foregoing method aspects, and includes a corresponding means (means) configured to perform steps or functions described in the foregoing method aspects. The steps or the functions may be implemented by software, hardware, or a combination of hardware and software.

In a possible design, the terminal device includes one or more processors and a transceiver unit. The transceiver unit is configured to support the terminal device in communicating with another device, to implement a transmission/reception function, for example, receiving DCI, or receiving indication information, QCL information, and RRC information. The one or more processors are configured to support the terminal device in implementing a corresponding function in the foregoing methods, for example, determining a DMRS port.

Optionally, the terminal device may further include one or more memories. The memory is configured to: be coupled to the processor, and store a program instruction and data that are necessary for the base station. The one or more memories may be integrated with the processor, or may be separate from the processor. This is not limited in this application.

The terminal device may be UE or the like, and the transceiver unit may be a transceiver or a transceiver circuit.

The terminal device may also be a communications chip. The transceiver unit may be an input/output circuit or an interface of the communications chip.

In another possible design, the terminal device includes a transceiver, a processor, and a memory. The processor is configured to control the transceiver to send and receive a signal, the memory is configured to store a computer program, and the processor is configured to invoke the computer program from the memory and run the computer program, to enable the terminal device to perform the method performed by the terminal device according to any one of the first aspect, the second aspect, the possible implementations of the first aspect, or the possible implementations of the second aspect.

According to a fifth aspect, a system is provided. The system includes the foregoing terminal device and network device.

According to a sixth aspect, a computer program product is provided. The computer program product includes a computer program (which may also be referred to as code or an instruction), and when the computer program is run, a computer is enabled to perform the method according to any one of the first aspect, the second aspect, the possible implementations of the first aspect, or the possible implementations of the second aspect.

According to a seventh aspect, a computer-readable medium is provided. The computer-readable medium stores a computer program (which may also be referred to as code or an instruction), and when the computer program is run, a computer is enabled to perform the method according to any one of the first aspect, the second aspect, the possible implementations of the first aspect, or the possible implementations of the second aspect.

DESCRIPTION OF EMBODIMENTS

The following describes the technical solutions of this application with reference to the accompanying drawings.

Embodiments of this application may be applied to various communications systems. Therefore, the following descriptions are not limited to a particular communications system. For example, the embodiments of this application are applicable to a long term evolution (long term evolution, LTE) system, a fifth generation (5th generation, 5G) system (which is also referred to as a new radio (new radio, NR) system sometimes), and various evolved or converged systems.

A network device in the embodiments of this application may be a device having a wireless transmission/reception function, including but not limited to: a base station, a relay station, an access point, a vehicle-mounted device, a wearable device, a network side device in a 5G network, a network device in a future evolved public land mobile network (public land mobile network, PLMN), an access point in a Wi-Fi system, user equipment (user Equipment, UE), and the like. For example, the network device may be a transmission point (TRP or TP) in the NR system, a gNodeB (gNB) in the NR system, or one antenna panel or a group of antenna panels (including a plurality of antenna panels) a gNodeB in the 5G system. This is not specifically limited in the embodiments of this application.

A terminal device in the embodiments of this application may be a device having a wireless transmission/reception function, including but not limited to: UE, an access terminal, a subscriber unit, a subscriber station, a mobile station, a mobile machine, a remote station, a remote terminal, a mobile device, a user terminal, a terminal, a wireless communications device, a user agent, or a user apparatus. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, an unmanned aerial vehicle device, a smart appliance, a terminal device in a future network, a terminal device in a future evolved PLMN, or the like. This is not limited in the embodiments of this application.

Figure 1:
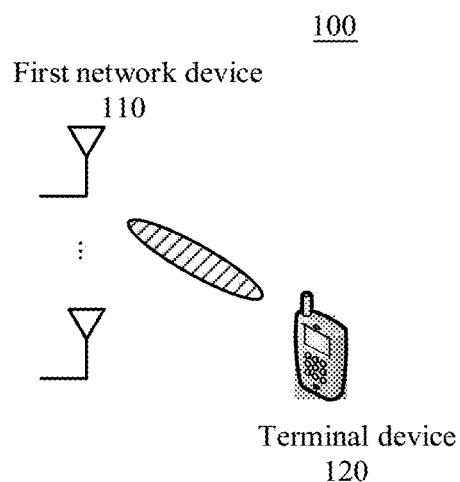
FIG. 1 is a schematic scenario diagram of a system to which embodiments of this application are applicable.

FIG. 1 is a schematic block diagram of a wireless communications system 100 to which the embodiments of this application are applicable. The wireless communications system includes at least one network device 110 and a terminal device 120 located in a coverage area of the network device. The wireless communications system 100 shown in FIG. 1 can support single-station transmission, such as dynamic point selection (dynamic point selection, DPS) transmission/dynamic point blanking (dynamic point blanking, DPB) transmission.

Figure 2:
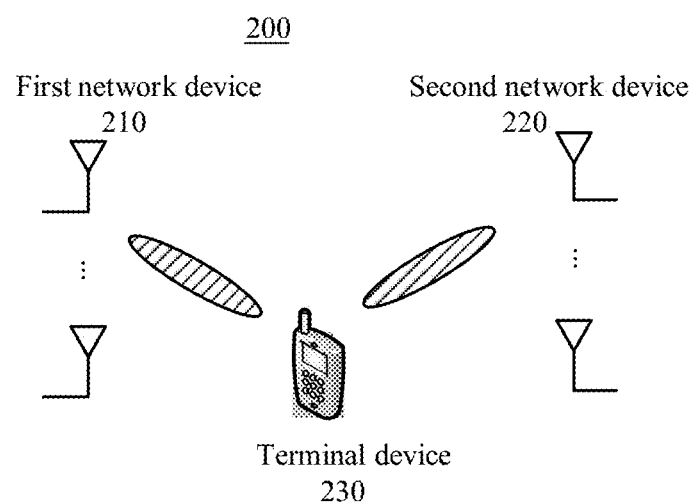
FIG. 2 is a schematic scenario diagram of another system to which embodiments of this application are applicable.

FIG. 2 is a schematic block diagram of another wireless communications system 200 to which the embodiments of this application are applicable. The wireless communications system 200 may include at least two network devices 210 and 220 such as a first network device 210 and a second network device 220, and one or more terminal devices 230. The terminal device 230 may be mobile or fixed. Both the first network device 210 and the second network device 220 may communicate with the terminal device 230 through a wireless air interface. The first network device 210 and the second network device 220 may provide communication coverage for a particular geographical area, and may communicate with a terminal device within the coverage area.

A person skilled in the art may clearly understand that for ease of description, various numbers such as "first" and "second" in this application are only for distinguishing, and are not intended to limit the embodiments of this application.

The wireless communications system 200 can support CoMP transmission. To be specific, the at least two network devices (transmission points) transmit downlink data to the terminal device through coordinated multipoint transmission/reception. In other words, the terminal device 230 may communicate with the first network device 210 or the second network device 220 in a same carrier. The coordinated multipoint transmission/reception may be implemented by using a technology such as space diversity and/or spatial multiplexing. This is not limited in this application.

The "coordinated multipoint transmission/reception" in this application includes but is not limited to joint transmission JT. The JT includes coherent JT and non-coherent JT (NCJT). A difference between the coherent JT and the NCJT lies in that beamforming is performed on different MIMO data streams from a plurality of coordinated TPs separately in the NCJT, but joint beamforming is performed on all MIMO data streams from a plurality of coordinated TPs in the coherent JT.

In the embodiments of this application, the first network device may be a serving network device, and the second network device may be a coordinating network device; or the first network device may be a coordinating network device, and the second network device is a serving network device.

For example, the first network device is a serving network device, and the second network device is a coordinating network device. There may be one or more second network devices. In addition, antenna ports of the first network device and antenna ports of the second network device satisfy different quasi co-location (Quasi-Co-Location, QCL) relationships. Alternatively, both the first network device and the second network device may be serving network devices. The embodiments of this application are not limited thereto.

For a definition of the QCL in the embodiments of this application, refer to that in LTE. To be specific, signals sent through QCL-ed antenna ports undergo same large-scale fading. The large-scale fading includes one or more of the following: delay spread, Doppler spread, Doppler shift, an average channel gain, an average delay, and the like. Alternatively, for the definition of the QCL in the embodiments of this application, refer to that in 5G. In the new radio NR system, a definition of QCL is similar to that in the LTE system, but spatial domain information is added. For example, signals sent through QCL-ed antenna ports undergo same large-scale fading. The large-scale fading includes one or more of the following parameters: delay spread, Doppler spread, Doppler shift, an average channel gain, an average delay, a spatial domain parameter, and the like. The spatial domain parameter may be, for example, one or more of an angle of departure (AOD), an angle of arrival (AOA), a channel correlation matrix, a power spread spectrum, a spatial filter, a spatial filtering parameter, or a spatial reception parameter.

In a scenario in which the coordinated multipoint transmission/reception is applied, the serving network device may send control signaling to the terminal device, and the coordinating network device may send data to the terminal device; or the serving network device may send control signaling to the terminal device, and the serving network device and the coordinating network device may both send data to the terminal device; or the serving network device and the coordinating network device may both send control signaling to the terminal device, and the serving network device and the coordinating network device may both send data to the terminal device. This is not particularly limited in the embodiments of this application. Communication may be performed between the serving network device and the coordinating network device, and may be performed between a plurality of coordinating network devices. For example, a control message is transferred through an X2 interface.

In other words, in the coordinated multipoint transmission/reception scenario, joint scheduling performed by the network devices may be supported, and separate scheduling performed by the network devices may also be supported. In joint scheduling performed by the network devices, DCI may be sent by one of the network devices, and data may be jointly sent by two of the network devices. In separate scheduling performed by the network devices, two network devices separately send DCI, and the two network devices jointly send data.

A network side device may transmit data to user equipment with reference to a mapping relationship between a codeword and a layer and a mapping relationship between a layer and an antenna port in the prior art. Because the terminal device does not know specific DMRS antenna ports used by a network device to send data, the network device needs to indicate, to the terminal device, a DMRS antenna port corresponding to a specific quantity of layers of data, so that the terminal device can correctly receive and demodulate a signal.

A concept of port grouping is used in LTE and 5G. LTE is used as an example. Eight antenna ports are supported in LTE. The eight antenna ports may be grouped into two groups, where antenna ports {7, 8, 11, and 13} form one group, and antenna ports {9, 10, 12, and 14} form the other group. Signals sent through the two groups of antenna ports may be distinguished through frequency division, and signals sent through the four antenna ports in each group of antenna ports may be distinguished through code division. For another example, in 5G new radio (NR), a DMRS antenna port group (DMRS group) may alternatively be configured by using higher layer signaling. For example, 12 antenna ports (for example, DMRS antenna ports 1000 to 1011) are grouped into one group or two groups through higher layer signaling configuration. For example, the antenna ports {1000, 1002, 1004, 1006, 1008, and 1010} form one group, and the antenna ports {1001, 1003, 1005, 1007, 1009, and 1011} form the other group. Alternatively, the antenna ports {1000 to 1005} from one group, and the antenna ports {1006 to 1011} form the other group.

Because there is no concept of grouping in a scrambling code indication and a layer mapping indication of an antenna port in a single-station transmission (for example, DPS/DPB) scenario in existing LTE, after DMRS grouping is used, layer mapping of an antenna port either in an LTE system or in an NR system cannot be indicated according to a mapping table of the antenna port in the single-station transmission scenario in existing LTE.

The embodiments of this application provide a method for indicating a DMRS antenna port. A correspondence among indication information included in downlink control information DCI, a DMRS antenna port group, and layer information of downlink data is established (for example, specified in a protocol, preconfigured, or prestored), so that a DMRS antenna port can be indicated when grouping is used. For example, a network device sends indication information by using DCI. After obtaining the indication information, a terminal device can determine, based on the correspondence, a DMRS antenna port group and layer information of downlink data that are indicated in the indication information, so that the terminal device can determine a DMRS antenna port.

For ease of understanding and description, by way of example but not limitation, a solution of indicating a DMRS antenna port during downlink transmission in this application is used as an example for description below. A person skilled in the art may understand that, with reference to the solution of indicating a DMRS antenna port during downlink transmission, a correspondence among indication information, a DMRS antenna port, and layer information of uplink data that are for uplink transmission may be established, to indicate a DMRS port during uplink transmission. For example, for a method for indicating a DMRS port during uplink transmission, the network device side may configure grouping of DMRS ports of the terminal device by using signaling, or after accessing a network, the terminal device reports grouping of DMRS ports of the terminal device by using higher layer signaling such as RRC signaling. The network device side uses, based on grouping information of the DMRS ports of the terminal device and by using DCI (which may alternatively be uplink grant (UL grant), for example, formats (format) 0, 1, and 1A in LTE or a corresponding format in NR) for scheduling uplink data, the method in this application to indicate a DMRS port used for uplink transmission.

In this application, a port may also be referred to as an antenna port, a DMRS antenna port may also be referred to as a DMRS port, and unless otherwise specified, all ports in this specification are antenna ports; a port group may also be expressed as an antenna port group, a DMRS antenna port group, or a DMRS port group; in the embodiments of this application, a first group of ports may also be referred to as a first antenna port group. The embodiments of this application are not limited thereto.

In a 5G system, three data scheduling cases (case) are included. A first data scheduling case is single-DCI (which may also be referred to as single-PDCCH) single-cell transmission (which may also be referred to as single-station transmission) applied to the scenario shown in FIG. 1. To be specific, there is only one network device for sending DCI and downlink data. A second data scheduling case is single-DCI (which may also be referred to as single-PDCCH) joint transmission in a joint transmission scenario. To be specific, one of at least two network devices that perform joint transmission sends DCI, and the at least two network devices jointly send data. A third data scheduling case is multi-DCI (which may also be referred to as multi-PDCCH) joint transmission in a joint transmission scenario. To be specific, at least two network devices for joint scheduling separately send DCI, and the at least two network devices jointly send data.

Figure 3:
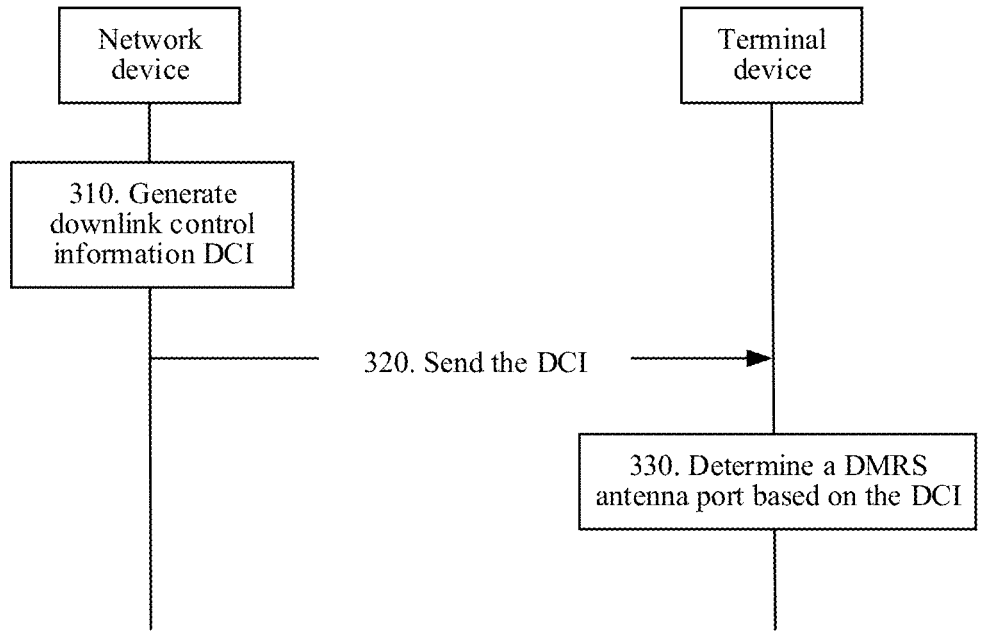
FIG. 3 is a schematic flowchart of an information transmission method according to an embodiment of this application.

FIG. 3 is a schematic flowchart of a communication method 300 according to an embodiment of this application. The method shown in FIG. 3 may be applied to the single-station transmission scenario shown in FIG. 1, or may be applied to the joint transmission scenario shown in FIG. 2. Specifically, the method 300 shown in FIG. 3 includes the following steps.

310. A network device generates downlink control information DCI.

Specifically, the DCI includes indication information. The indication information indicates at least one demodulation reference signal DMRS antenna port group and layer (layer) information of downlink data, the at least one DMRS antenna port group is one or more of a plurality of DMRS antenna port groups, and DMRS antenna ports in a same DMRS antenna port group satisfy a quasi co-location QCL relationship.

When the method is applied to the single-station transmission scenario, the network device may be the network device in FIG. 1. When the method is applied to the joint transmission scenario, the network device may be the first network device or the second network device that are in joint transmission in FIG. 2, or the network device may be a network device other than the first network device and the second network device. For example, the network device may be a serving network device when the first network device and the second network device are both coordinating network devices. This embodiment of this application is not limited thereto.

In a design, the DCI may be in a DCI format (format) 2D, or may be in another DCI format defined in a system.

The layer information of the downlink data includes: a total quantity of layers of the downlink data, or a quantity of layers that is corresponding to each DMRS antenna port group, or a total quantity of layers of the downlink data and a quantity of layers that is corresponding to some or all of the at least one DMRS antenna port group.

In this application, the total quantity of layers of the downlink data is a total quantity of layers of downlink data scheduled by using the DCI that is generated by the network device. That is, one piece of DCI corresponds to one total quantity of layers.

In the single-station transmission scenario and a single-DCI joint transmission scenario, a terminal device obtains only one piece of DCI, and a total quantity of layers of downlink data scheduled by using this piece of DCI is equal to a quantity of layers that is of downlink data and that is corresponding to the DCI obtained by the terminal device.

In the foregoing third data scheduling case, namely, multi-DCI (which may also be referred to as multi-PDCCH) joint transmission, the terminal device receives DCI sent by at least two network devices, and each piece of DCI corresponds to one total quantity of layers. A quantity of layers that is of downlink data and that is obtained by the terminal device is a sum of total quantities of layers of downlink data that are corresponding to all of the at least two pieces of DCI.

Optionally, in another embodiment, the indication information in the DCI further indicates one or more of the following information:

a scrambling identity corresponding to the at least one DMRS antenna port group; or an orthogonal cover code OCC used for a downlink DMRS pilot and/or the downlink data; or an antenna port that is occupied by the downlink data and that is in the at least one DMRS antenna port group.

It should be understood that, in this embodiment of this application, the indication information included in the DCI may be an entry of one or more lists, the one or more lists are applicable to one codeword and/or two codewords, and the one or more lists include: the indication information and content corresponding to the indication information (or referred to as content indicated in the indication information). Specifically, the one or more lists may include:

the indication information, the at least one DMRS antenna port group corresponding to the indication information, and the quantity of layers that is corresponding to each DMRS antenna port group; or the indication information, the total quantity of layers of the downlink data corresponding to the indication information, and the at least one DMRS antenna port group; or the indication information, the total quantity of layers of the downlink data corresponding to the indication information, the at least one DMRS antenna port group, and the quantity of layers that is corresponding to some or all of the at least one DMRS antenna port group; or the indication information, the at least one DMRS antenna port group corresponding to the indication information, the quantity of layers that is corresponding to each DMRS antenna port group, and one or more of the following information: the scrambling identity corresponding to the at least one DMRS antenna port group, the orthogonal cover code OCC used for the downlink DMRS pilot and/or the downlink data, or the antenna port that is occupied by the downlink data and that is in the at least one DMRS antenna port group; or the indication information, the total quantity of layers of the downlink data corresponding to the indication information, the at least one DMRS antenna port group, and one or more of the following information: the scrambling identity corresponding to the at least one DMRS antenna port group, the orthogonal cover code OCC used for the downlink DMRS pilot and/or the downlink data, or the antenna port that is occupied by the downlink data and that is in the at least one DMRS antenna port group; or the indication information, the total quantity of layers of the downlink data corresponding to the indication information, the at least one DMRS antenna port group, the quantity of layers that is corresponding to some or all of the at least one DMRS antenna port group, and one or more of the following information: the scrambling identity corresponding to the at least one DMRS antenna port group, the orthogonal cover code OCC used for the downlink DMRS pilot and/or the downlink data, or the antenna port that is occupied by the downlink data and that is in the at least one DMRS antenna port group.

It should be understood that, for ease of description, in this embodiment of this application, the content corresponding to the indication information (which may also be referred to as content related to or indicated in the indication information) may be referred to as "combination information". In other words, the list in this embodiment of this application may include a plurality of pieces of indication information and combination information corresponding thereto.

To be specific, the list in this embodiment of this application includes a one-to-one correspondence between a plurality of pieces of indication information and a plurality of pieces of combination information. In this embodiment of this application, the correspondence between the plurality of pieces of indication information and the plurality of pieces of combination information may be indicated by using the list, or may be indicated in another manner. This embodiment of this application is not limited thereto.

It can be learned from the foregoing descriptions that in this embodiment of this application, the combination information corresponding to the indication information has a plurality of forms. The following describes in detail different forms of the combination information with reference to specific tables. Details are not described herein again.

That the combination information corresponding to the indication information has a plurality of forms is described above. In this embodiment of this application, the correspondence (for example, a list) between the indication information and the combination information may be specified in a protocol, or may be prestored or preconfigured. In other words, the network device and the terminal device may obtain the one-to-one correspondence between the plurality of pieces of indication information and the plurality of pieces of combination information in advance.

Specifically, the network device may send the DCI on a PDCCH. The DCI includes indication information, which may be referred to as first indication information, in a plurality of pieces of indication information. Different values of the indication information may correspond to different combination information. Corresponding combination information may be indicated by using the first indication information in the DCI. The first indication information is one of the foregoing plurality of pieces of indication information. In this case, the terminal device may determine, in the plurality of pieces of combination information and by using the first indication information, the combination information corresponding to the first indication information, and then the terminal device determines, based on the combination information, layer information of downlink data and at least one of the plurality of DMRS antenna port groups, so that the terminal device may determine a specific DMRS antenna port.

In this embodiment of this application, antenna ports of the network device may be grouped into a plurality of DMRS antenna port groups, and the plurality of DMRS antenna port groups may be configured by the network device. Correspondingly, the method may further include: The network device sends group configuration information to the terminal device, where the group configuration information is used to configure the plurality of DMRS antenna port groups. For example, the network device may send the group configuration information by using higher layer signaling such as RRC signaling. The configuration information may include: a quantity of the DMRS port groups and/or a specific port included in each DMRS port group.

It should be understood that, in this embodiment of this application, the DMRS port group is a group of DMRS ports that have a QCL relationship.

Optionally, whether the network device enables the DMRS grouping may be configured for the terminal device by using signaling. For example, the network device may configure, by using higher layer RRC signaling, whether the terminal device uses the DMRS port grouping of the network device. For example, indication information DMRS-Port-Group in the RRC signaling is 'ON', indicating that the network device instructs the terminal device to use the DMRS grouping; or indication information DMRS-Port-Group in the RRC signaling is 'OFF', indicating that the network device instructs the terminal device not to use the DMRS grouping.

In a design, the plurality of groups may be specified in a protocol, prestored, or preconfigured. In other words, the network device and the terminal device may obtain the one-to-one correspondence between the plurality of pieces of indication information and the plurality of pieces of combination information in advance. In this case, the network device does not need to send the group configuration information. In another design, the network device may notify the terminal device of a determined group, or the network device and the terminal device determine a group through negotiation.

In an implementation, the plurality of DMRS antenna port groups are three DMRS antenna port groups, including a DMRS antenna port group 0, a DMRS antenna port group 1, and a DMRS antenna port group 2; or the plurality of DMRS antenna port groups are two DMRS antenna port groups, including a DMRS antenna port group 1 and a DMRS antenna port group 2.

The DMRS antenna port group 1 includes a part of antenna ports in ports of the network device, the DMRS antenna port group 2 includes another part of antenna ports in the ports of the network device, and the antenna ports in the DMRS antenna port group 1 or the antenna ports in the DMRS antenna port group 2 are a subset of the antenna ports in the DMRS antenna port group 0, where the subset may further be a proper subset. An intersection set between the antenna ports in the DMRS antenna port group 1 and the antenna ports in the DMRS antenna port group 2 is empty. A union set of the antenna ports in the DMRS antenna port group 1 and the antenna ports in the DMRS antenna port group 2 may be a subset of the antenna ports in the DMRS antenna port group 0.

The antenna ports in the DMRS antenna port group 1 satisfy a first QCL relationship, and the antenna ports in the DMRS antenna port group 2 satisfy a second QCL relationship. The first QCL relationship is different from the second QCL relationship.

A plurality of antenna ports of the network device may include, for example, eight antenna ports (for example, antenna ports 1000 to 1007) or 12 antenna ports (for example, antenna ports 1000 to 1011), and the plurality of antenna ports may be grouped into the foregoing plurality of antenna port groups.

The 12 antenna ports are used as an example. The DMRS antenna port group 1 (a DMRS group index 1) includes antenna ports {1000, 1002, 1004, 1006, 1008, and 1010}, and the DMRS antenna port group 2 (a DMRS group index 2) includes antenna ports {1001, 1003, 1005, 1007, 1009, and 1011}, and the DMRS antenna port group 0 (a DMRS group index 0) includes antenna ports {1000 to 1011}.

The foregoing grouping is merely an example. In an actual application, grouping may be flexibly performed based on a communications requirement. For example, the DMRS antenna port group 1 (the DMRS group index 1) includes the antenna ports {1000 to 1005}, the DMRS antenna port group 2 (the DMRS group index 2) includes the antenna ports {1006 to 1011}, and the DMRS antenna port group 0 (the DMRS group index 0) includes the antenna ports {1000 to 1011}. This embodiment of this application is not limited thereto.

The eight antenna ports are used as another example. The DMRS antenna port group 1 (a DMRS group index 1) includes antenna ports {1000, 1002, 1004, and 1006}, the DMRS antenna port group 2 (a DMRS group index 2) includes antenna ports {1001, 1003, 1005, and 1007}, and the DMRS antenna port group 0 (a DMRS group index 0) includes antenna ports {1000 to 1007}. Alternatively, the DMRS antenna port group 1 (a DMRS group index 1) includes antenna ports {1000 to 1003}, the DMRS antenna port group 2 (a DMRS group index 2) includes antenna ports {1004 to 1007}, the DMRS antenna port group 0 (a DMRS group index 0) includes antenna ports {1000 to 1007}, and so on. This embodiment of this application is not limited thereto.

In the foregoing example, a quantity of the antenna ports in the DMRS antenna port group 1 is equal to a quantity of the antenna ports in the DMRS antenna port group 2. Optionally, in this embodiment of this application, the quantity of the antenna ports in the DMRS antenna port group 1 may be not equal to the quantity of the antenna ports in the DMRS antenna port group 2.

The foregoing grouping case may be a result of grouping performed by the network device on the plurality of antenna ports based on a pilot pattern corresponding to the antenna port and in a plurality of manners such as frequency division, time division, code division, and port sequence division.

In this embodiment of this application, the DMRS antenna port group 0 may include all antenna ports. In the foregoing first data scheduling case in the 5G system, namely, the single-station transmission scenario, the combination information corresponding to the indication information in the DCI is used to indicate the layer information of the downlink data and one antenna port group (for example, the DMRS antenna port group 0). The antenna ports in the DMRS antenna port group 1 and the antenna ports in the DMRS antenna port group 2 correspond to different QCL relationships. In the foregoing second data scheduling case in the 5G system, namely, the single-DCI (which may also be referred to as single-PDCCH) joint transmission scenario, the combination information corresponding to the indication information in the DCI is used to indicate the layer information of the downlink data and two antenna port groups (for example, the DMRS antenna port group 1 and the DMRS antenna port group 2). In the third data scheduling case in the 5G system, the multi-DCI (which may also be referred to as multi-PDCCH) joint transmission scenario, each network device sends one piece of DCI, and each piece of DCI is used to indicate only one DMRS antenna port group. For example, a first network device and a second network device perform joint transmission. The first network device sends first DCI, and combination information corresponding to indication information in the first DCI is used to indicate first layer information and one antenna port group (for example, one of the DMRS antenna port group 1 and the DMRS antenna port group 2, for example, the DMRS antenna port group 1). The second network device sends second DCI, and combination information corresponding to indication information in the second DCI is used to indicate second layer information and one antenna port group (for example, the other one of the DMRS antenna port group 1 and the DMRS antenna port group 2, for example, the DMRS antenna port group 2).

In this embodiment of this application, a size of the indication information may be 2 or more bits, for example, 3 bits, 4 bits, or 5 bits. This is not limited in this embodiment of this application. A quantity of bits of the indication information is usually related to a quantity of the plurality of pieces of combination information. When the quantity of the plurality of pieces of combination information is greater than $2^{m-1}$ and less than or equal to $2^m$, the size of the indication information is m bits. For example, when the quantity of the plurality of pieces of combination information is greater than 4 and less than or equal to 8, the size of the indication information may be 3 bits; when the quantity of the plurality of pieces of combination information is greater than 8 and less than or equal to 16, the size of the indication information is 4 bits; or when the quantity of the plurality of pieces of combination information is greater than 16 and less than or equal to 32, the size of the indication information may be 5 bits.

In this embodiment of this application, "the correspondence between the indication information and the combination information" may also be referred to as "a mapping relationship between the indication information and the combination information". In this embodiment of this application, a one-to-one correspondence (a mapping relationship) between the plurality of pieces of combination information and the plurality of pieces of QCL indication information may be described in a list form. However, this embodiment of this application is not limited thereto. In this specification, the list form is used merely for easy and vivid description of the correspondence. In an actual application, the correspondence may be in a tabular form, and may be a string of characters, an array, a segment of code, or the like. This embodiment of this application is not limited thereto.

In the NR system, one piece of DCI usually corresponds to only one codeword CW unless it is indicated that one piece of DCI corresponds to two codewords CWs. In other words, in a default case, one piece of DCI corresponds to one codeword. In this case, the indication information in the DCI corresponds to one piece of combination information in the correspondence between the indication information and the combination information in a case of one codeword, and a total quantity of layers that is of downlink data and that is corresponding to one codeword is less than or equal to 4. When the network device indicates, by using signaling, that one piece of DCI corresponds to two codewords, the indication information in the DCI corresponds to one piece of combination information in the correspondence between the indication information and the combination information in a case of two codewords.

In an implementation, codeword quantity indication information may be designed to indicate that a quantity of codewords is 1 or 2. The codeword quantity indication information may be implicitly or explicitly notified to the terminal device. For example, the terminal device determines, based on the codeword quantity indication information from the network device, whether received first indication information corresponds to one codeword or two codewords. In another implementation, alternatively, the network device may not send codeword quantity indication information. For example, if the terminal device does not receive the codeword quantity indication information, the terminal determines that received first indication information corresponds to one codeword. If the terminal receives the codeword quantity indication information sent by the network device, the terminal determines that received first indication information corresponds to two codewords.

The following describes the correspondence between the indication information and the combination information in this embodiment of this application in detail with reference to specific examples. The indication information included in the list in this embodiment of this application may correspond to a plurality of forms of combination information. The foregoing simply describes only the indication information and a plurality of pieces of possible combination information corresponding to the indication information that are included in the list in this embodiment of this application. The following describes different forms of combination information in detail with reference to specific tables.

First, the correspondence (for example, in a form of a list) between the indication information and the combination information is described when there is one codeword and the plurality of DMRS antenna port groups include three antenna port groups: the DMRS antenna port group 1, the DMRS antenna port group 2, and the DMRS antenna port group 0.

For example, the correspondence (which may also be referred to as the mapping relationship) between the indication information and the combination information, namely, the one-to-one correspondence between the plurality of pieces of indication information and the plurality of pieces of combination information, is shown in Table 1.

TABLE 1

One codeword: Total quantity of layers
is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 2 layers, DMRS group index 0 |
| 4 | 2 layers, DMRS group index 1 |
| 5 | 2 layers, DMRS group index 2 |
| 6 | 2 layers, DMRS group index 1 DMRS group index 2 |
| 7 | 3 layers, DMRS group index 0 |
| 8 | 3 layers, DMRS group index 1 |
| 9 | 3 layers, DMRS group index 2 |
| 10 | 3 layers, DMRS group index 1 DMRS group index 2 |
| 11 | 3 layers, DMRS group index 2 DMRS group index 1 |
| 12 | 4 layers, DMRS group index 0 |
| 13 | 4 layers, DMRS group index 1 |
| 14 | 4 layers, DMRS group index 2 |
| 15 | 4 layers, DMRS group index 1 DMRS group index 2 |
| 16 | 4 layers, DMRS group index 2 DMRS group index 1 |

As shown in Table 1, Table 1 shows a case in which the combination information corresponding to the indication information is a total quantity of layers of the downlink data and at least one DMRS antenna port group. For example, when the value (value) of the indication information in the DCI is 1, content corresponding to the indication information (namely, the combination information corresponding to the indication information) is "1 layer, DMRS group index 0". "1 layer" indicates the total quantity of layers of the downlink data, namely, one layer, and "DMRS group index 0" is used to identify the at least one DMRS antenna port group, namely, the DMRS antenna port group 0. Therefore, when the value of the indication information is 1, the indication information is used to indicate the total quantity of layers of the downlink data being one layer and the DMRS antenna port group 0. It should be understood that a group identity in this embodiment of this application may also be referred to as a group number or a group index. This embodiment of this application is not limited thereto.

Table 1 shows combination information corresponding to each piece of indication information when values of the indication information are 0 to 16. It may be understood that the values of the indication information that correspond to the 17 pieces of combination information may alternatively be other specific values, provided that the network device and the terminal device have consistent understanding of the correspondence between the combination information and the values of the indication information.

It should be noted that, similar to Table 1, the following plurality of tables show combination information corresponding to each piece of indication information when values of the indication information are several consecutive integers from 0. It may be understood that the values of the indication information that correspond to the combination information may alternatively be other specific values, provided that the network device and the terminal device have consistent understanding of the correspondence between the combination information and the values of the indication information. This embodiment of this application is not limited thereto. To avoid repetition, the following tables are not described one by one again.

In Table 1, when the value of the indication information is 0, 3, 7, or 12, the foregoing first data scheduling case in the 5G system, namely, the single-station transmission scenario, may be corresponded. When the value of the indication information is 1, 2, 4, 5, 8, 9, 13, or 14, the foregoing third data scheduling case in the 5G system, namely, the multi-DCI (which may also be referred to as multi-PDCCH) joint transmission scenario, may be corresponded. In the third data scheduling case, each network device in joint transmission sends one piece of indication information, and values of indication information sent by different network devices are different. Further, antenna port groups corresponding to indication information sent by different network devices are also different. For example, a value of indication information sent by the first network device is 1, and a value of indication information sent by the second network device is 2. Alternatively, a value of indication information sent by the first network device is 4, and a value of indication information sent by the second network device is 5. Alternatively, a value of indication information sent by the first network device is 8, a value of indication information sent by the second network device is 9, and so on. This embodiment of this application is not limited thereto. That the value of the indication information is 6, 10, 11, 15, or 16 corresponds to the foregoing second data scheduling case in the 5G system, namely, the single-DCI (which may also be referred to as single-PDCCH) joint transmission scenario.

It can be learned from Table 1 that, the total quantity of layers and a corresponding antenna port group number are indicated in each piece of combination information. The terminal device may determine a specific antenna port number according to a preset rule. For example, antenna ports that is corresponding to an antenna port group may be selected according to a sequence of antenna port numbers in the antenna port group. In other words, assuming that a quantity of layers that is corresponding to an $i^{th}$ antenna port group in the plurality of antenna port groups is n, the downlink data occupies first n DMRS antenna ports in the $i^{th}$ antenna port group, where i is an integer greater than or equal to 1, and n is an integer greater than or equal to 1. For example, assuming that the DMRS antenna port group 1 (the DMRS group index 1) includes the antenna ports {1000, 1001, 1002, 1003, 1004, and 1005}, the DMRS antenna port group 2 (the DMRS group index 2) includes the antenna ports {1006, 1007, 1008, 1009, 1010, and 1011}, and the DMRS antenna port group 0 (the DMRS group index 0) includes the antenna ports {1000, 1001, 1002, 1003, 1004, 1005, 1006, 1007, 1008, 1009, 1010, and 1011}, when the value of the first indication information is 2, the value corresponds to the DMRS antenna port group 2 and the total quantity of layers of the downlink data being 1. According to the preset rule, a corresponding antenna port number is the first antenna port, namely, the antenna port 1006, in the DMRS antenna port group 2. For another example, when the value of the first indication information is 4, the value corresponds to the DMRS antenna port group 1 and the total quantity of layers of the downlink data being 2. According to the preset rule, corresponding antenna port numbers are the first and second antenna ports, namely, the antenna ports 1000 and 1001, in the DMRS antenna port group 1.

In the second data scheduling case in the 5G system, namely, the single-DCI (which may also be referred to as single-PDCCH) joint transmission scenario, for example, when the value of the indication information is 10, the combination information indicates a total quantity of layers and two antenna port groups. A specific quantity of layers of the data that is corresponding to each antenna port group, namely, a quantity of antenna ports that is corresponding to each antenna port group, may be determined according to the preset rule. For example, the preset rule is that, when the total quantity of layers of the data is 2, the two antenna port groups each correspond to one layer, and the two antenna port groups each correspond to one antenna port. For example, when the value of the indication information is 6, the total quantity of layers of the data is 2, and the value corresponds to the DMRS antenna port group 1 and the DMRS antenna port group 2. According to the preset rule, DMRS antenna ports are the antenna port 1000 in the DMRS antenna port group 1 and the antenna port 1006 in the DMRS antenna port group 2. The preset rule further includes that, when the total quantity of layers of the data is 3, the first antenna port group corresponds to one layer, and the second antenna port group corresponds to two layers. For example, when the value of the indication information is 10, the total quantity of layers of the data is 3, and the value corresponds to the DMRS antenna port group 1 and the DMRS antenna port group 2. According to the preset rule, DMRS antenna ports are the antenna port 1000 in the DMRS antenna port group 1 and the antenna ports 1006 and 1007 in the DMRS antenna port group 2. The preset rule further includes that, when the total quantity of layers of the data is 4, the first antenna port group corresponds to one layer, and the second antenna port group corresponds to three layers. For example, when the value of the indication information is 15, the total quantity of layers of the data is 4, and the DMRS antenna port group 1 and the DMRS antenna port group 2 are corresponded. According to the preset rule, DMRS antenna ports are the antenna port 1000 in the DMRS antenna port group 1 and the antenna ports 1006, 1007, and 1008 in the DMRS antenna port group 2. For another example, when the value of the indication information is 16, the total quantity of layers of the data is 4, and the value corresponds to the DMRS antenna port group 2 and the DMRS antenna port group 1. According to the preset rule, DMRS antenna ports are the antenna port 1006 in the DMRS antenna port group 2 and the antenna ports 1000, 1001, and 1002 in the DMRS antenna port group 1. The preset rule further includes that, when the total quantity of layers of the data is 4, the first antenna port group corresponds to two layers, and the second antenna port group corresponds to two layers. For example, when the value of the indication information is 16, the total quantity of layers of the data is 4, and the value corresponds to the DMRS antenna port group 1 and the DMRS antenna port group 2. According to the preset rule, DMRS antenna ports are the antenna ports 1006 and 1007 in the DMRS antenna port group 2 and the antenna ports 1000 and 1001 in the DMRS antenna port group 1.

In this embodiment of this application, the preset rule is merely an example, and this embodiment of this application is not limited thereto. For example, when the value of the indication information is 10, in other words, when the corresponding total quantity of layers of the data is 3, the preset rule may be set as: the first antenna port group corresponds to two layers, and the second antenna port group corresponds to one layer. For another example, when the value of the indication information is 15 or 16, in other words, when the corresponding total quantity of layers of the data is 4, the preset rule may be set as: the first antenna port group corresponds to three layers, and the second antenna port group corresponds to one layer.

Alternatively, the preset correspondence (which may also be referred to as the mapping relationship), between the plurality of pieces of combination information and the plurality of pieces of indication information, shown in Table 1 in this embodiment of this application may be transformed into Table 2. Specifically, cases in which values of the indication information are 10 and 11 in Table 1 may be combined into a case, to be specific, correspond to a case in which a value of the indication information is 10 in Table 2. As shown in Table 2, that the value of the indication information is 10 corresponds to the total quantity of layers of the data being 3, and the DMRS antenna port groups 1 and 2. It may be set, by default according to the preset rule, that the antenna port group 1 corresponds to one layer, and the antenna port group 2 corresponds to two layers. In addition, optionally, for the case corresponding to the value of the indication information being 11 in Table 1, in an actual application, for Table 2, the network device may indicate, by using an instruction (which may be referred to as, for example, a reverse instruction), that when the value of the indication information is 10, the antenna port group 1 corresponds to two layers, and the antenna port group 2 corresponds to one layer. In an actual application, the network device may further implement Table 2 by configuring QCL information of a DMRS group. For example, the QCL relationship of the DMRS antenna port group 1 is configured to correspond to the first network device, and the QCL relationship of the DMRS antenna port group 2 is configured to correspond to the second network device. Then, the QCL relationship of the DMRS antenna port group 1 may be reconfigured to correspond to the second network device, and the QCL relationship of the DMRS antenna port group 2 may be configured to correspond to the first network device, to implement a "reverse" effect, so that the cases in which the values of the indication information are 10 and 11 in Table 1 are combined into the case in which the value of the indication information is 10 in Table 2.

TABLE 2

One codeword: Total quantity of layers
is less than or equal to 4
(One codeword: ≤4 layers)

| Value (value) of indication information | Combination information (message) |
| --- | --- |
| 0 | 1 layer, DMRS group index 0 |
| 1 | 1 layer, DMRS group index 1 |
| 2 | 1 layer, DMRS group index 2 |
| 3 | 2 layers, DMRS group index 0 |
| 4 | 2 layers, DMRS group index 1 |
| 5 | 2 layers, DMRS group index 2 |
| 6 | 2 layers, DMRS group index 1 DMRS group index 2 |
| 7 | 3 layers, DMRS group index 0 |
| 8 | 3 layers, DMRS group index 1 |
| 9 | 3 layers, DMRS group index 2 |
| 10 | 3 layers, DMRS group index 1 DMRS group index 2 |
| 11 | 4 layers, DMRS group index 0 |
| 12 | 4 layers, DMRS group index 1 |
| 13 | 4 layers, DMRS group index 2 |
| 14 | 4 layers, DMRS group index 1 DMRS group index 2 |

As shown in Table 1 and Table 2, cases in which values of the indication information are 15 and 16 in Table 1 may be combined into a case in which a value of the indication information is 14 in Table 2. As shown in Table 2, that the value of the indication information is 14 corresponds to the total quantity of layers of the data being 4, and the DMRS antenna port groups 1 and 2. It may be set, by default according to the preset rule, that the first antenna port group, namely, the DMRS antenna port group 1, corresponds to two layers, and the second antenna port group, namely, the DMRS antenna port group 2, corresponds to two layers. In addition, optionally, when the total quantity of layers of the data is 4, correspondingly, the first antenna port group corresponds to one layer, and the second antenna port group corresponds to three layers; or the first antenna port group corresponds to three layers, and the DMRS antenna port group 2 corresponds to one layer. For Table 2, in an actual application, the network device may indicate, by using an instruction, that when the value of the indication information is 14, the value of the indication information is 14, the DMRS antenna port group 1 corresponds to one layer, and the DMRS antenna port group 2 corresponds to three layers; or the DMRS antenna port group 1 corresponds to three layers, and the DMRS antenna port group 2 corresponds to one layer.

It can be learned from Table 1 and Table 2 that, a quantity of values of the indication information in Table 1 is 17 (the values are 0 to 16), and $2^4 < 17 < 2^5$. Therefore, the size of the indication information is 5 bits. In Table 2, a quantity of values of the indication information is 15 (the values are 0 to 14), and $2^3 < 15 < 2^4$. Therefore, the size of the indication information is 4 bits. Therefore, indication of the DMRS antenna port by using Table 2 can reduce signaling overheads and save network resources.

In this application, for ease of description, 0, 1, 2, 3, . . . , 16, and the like are used as examples of the value of the indication information for description. A person skilled in the art may understand that during product implementation, the value may alternatively be represented in another form such as binary, octal, decimal, or hexadecimal. A representation form of the value is not limited in this application.

It has been described above that, for the second data scheduling case in the 5G system, in Table 1, the combination information indicates the antenna port group number, and the quantity of layers that is corresponding to each antenna port group may be determined according to the preset rule.

In another implementation manner, with reference to a case shown in Table 3, for the second data scheduling case in the 5G system, in other words, when values of the indication information are 10 and 11 or 15 to 17, combination information corresponding to the indication information is a total quantity of layers of the downlink data, at least one DMRS antenna port group, and a quantity of layers that is corresponding to all of the at least one DMRS antenna port group. The terminal device may determine an occupied DMRS antenna port that is in each antenna port group according to the preset rule and based on a quantity of layers that is corresponding to each antenna port group.

For example, for the preset rule, refer to the foregoing descriptions of Table 1. For example, antenna ports whose quantity is corresponding to a quantity of layers in an antenna port group may be selected according to a sequence of antenna port numbers in the antenna port group. To avoid repetition, details are not described herein again.

It should be noted that, when the value of the indication information is 6, the second data scheduling case is also corresponded. When the value of the indication information is 6, a corresponding total quantity of layers of the downlink data is 2, and two antenna port groups are corresponded. In this case, one antenna port group may correspond to one layer by default. Therefore, in Table 3, the combination information corresponding to the value of the indication information being 6 does not explicitly indicate a layer corresponding to each antenna port group. Optionally, the combination information corresponding to the value of the indication information being 6 may be replaced with the following form:

2 layers, DMRS group index 1, 1 layer
DMRS group index 2, 1 layer.

TABLE 3

One codeword: Total quantity of layers
is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 2 layers, DMRS group index 0 |
| 4 | 2 layers, DMRS group index 1 |
| 5 | 2 layers, DMRS group index 2 |
| 6 | 2 layers, DMRS group index 1 DMRS group index 2 |
| 7 | 3 layers, DMRS group index 0 |
| 8 | 3 layers, DMRS group index 1 |
| 9 | 3 layers, DMRS group index 2 |
| 10 | 3 layers, DMRS group index 1, 1 layer DMRS group index 2, 2 layers |
| 11 | 3 layers, DMRS group index 1, 2 layers DMRS group index 2, 1 layer |
| 12 | 4 layers, DMRS group index 0 |
| 13 | 4 layers, DMRS group index 1 |
| 14 | 4 layers, DMRS group index 2 |
| 15 | 4 layers, DMRS group index 1, 1 layer DMRS group index 2, 3 layers |
| 16 | 4 layers, DMRS group index 1, 2 layers DMRS group index 2, 2 layers |
| 17 | 4 layers, DMRS group index 1, 3 layers DMRS group index 2, 1 layer |

It should be understood that, in Table 3, the combination information corresponding to the value of the indication information being 11 may be replaced with the following form:

3 layers, DMRS group index 2, 1 layer
DMRS group index 1, 2 layers.

To be specific, similar the case of the combination information corresponding to the value of the indication information being 10, the first port group corresponds to one layer, the second port group corresponds to two layers, and a difference lies only in that a sequence of the two port groups when the indication information is 11 is opposite to that of the two port groups when the indication information is 10. Similarly, when the value of the indication information is 17, a type of the corresponding combination information may also be transformed. This embodiment of this application is not limited thereto.

Alternatively, the preset correspondence (which may also be referred to as the mapping relationship), between the plurality of pieces of combination information and the plurality of pieces of indication information, shown in Table 3 in this embodiment of this application may be transformed into Table 3-1. Specifically, cases in which values of the indication information are 10 and 11 in Table 3 may be combined into a case, to be specific, correspond to a case in which a value of the indication information is 10 in Table 3-1, and Cases in which values of the indication information are 15 and 17 in Table 3 may be combined into a case, to be specific, correspond to a case in which a value of the indication information is 14 in Table 3-1. As shown in Table 3-1, when the value of the indication information is 10, a corresponding total quantity of layers of the data is 3, the antenna port group 1 corresponds to one layer, and the antenna port group 2 corresponds to two layers. In addition, optionally, for the case corresponding to the value of the indication information being 11 in Table 3, in other words, the antenna port group 1 corresponds to one layer and the antenna port group 2 corresponds to two layers, in an actual application, for Table 3-1, the network device may indicate, by using an instruction (which may be referred to as, for example, a reverse instruction), that when the value of the indication information is 10, the antenna port group 1 corresponds to two layers, and the antenna port group 2 corresponds to one layer. In an actual application, the network device may further implement Table 3-1 by configuring QCL information of a DMRS group. For example, the QCL relationship of the DMRS antenna port group 1 is configured to correspond to the first network device, and the QCL relationship of the DMRS antenna port group 2 is configured to correspond to the second network device. Then, the QCL relationship of the DMRS antenna port group 1 may be reconfigured to correspond to the second network device, and the QCL relationship of the DMRS antenna port group 2 may be configured to correspond to the first network device, to implement a "reverse" effect, so that the cases in which the values of the indication information are 10 and 11 in Table 3 are combined into the case in which the value of the indication information is 10 in Table 3-1.

Similarly, the cases in which the values of the indication information are 15 and 17 in Table 3 are combined into the case in which the value of the indication information is 14 in Table 3-1 in a similar manner in which the cases in which the values of the indication information are 10 and 11 in Table 3 are combined into the case in which the value of the indication information is 10 in Table 3-1. To avoid repetition, details are not described herein again.

TABLE 3-1

One codeword: Total quantity of layers
is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 2 layers, DMRS group index 0 |
| 4 | 2 layers, DMRS group index 1 |
| 5 | 2 layers, DMRS group index 2 |
| 6 | 2 layers, DMRS group index 1 DMRS group index 2 |
| 7 | 3 layers, DMRS group index 0 |
| 8 | 3 layers, DMRS group index 1 |
| 9 | 3 layers, DMRS group index 2 |
| 10 | 3 layers, DMRS group index 1, 1 layer DMRS group index 2, 2 layers |
| 11 | 4 layers, DMRS group index 0 |
| 12 | 4 layers, DMRS group index 1 |
| 13 | 4 layers, DMRS group index 2 |
| 14 | 4 layers, DMRS group index 1, 1 layer DMRS group index 2, 3 layers |
| 15 | 4 layers, DMRS group index 1, 2 layers DMRS group index 2, 2 layers |

It can be learned from Table 3 and Table 3-1 that, a quantity of values of the indication information in Table 3-1 is 16 (the values are 0 to 15), and $2^4$=16. Therefore, the size of the indication information is 4 bits. In Table 3, a quantity of values of the indication information is 18 (the values are 0 to 17), and $2^4$<18<$2^5$. Therefore, the size of the indication information is 5 bits. Therefore, compared with indication by using Table 3, indication of the DMRS antenna port by using Table 3-1 can reduce signaling overheads and save network resources.

Optionally, to save storage resources, as shown in Table 4, for the second data scheduling case in the 5G system, in other words, when the values of the indication information are 10 and 11 or 15 to 17 in Table 3, the combination information corresponding to the indication information is a total quantity of layers of the downlink data, at least one DMRS antenna port group, and a quantity of layers that is corresponding to some of the at least one DMRS antenna port group. In other words, the indication information may indicate only the total quantity of layers of the downlink data and a quantity of layers that is corresponding to one antenna port group, and a quantity of layers that is corresponding to the other group may be obtained by calculating a difference between the total quantity of layers and the quantity of layers that is corresponding to the antenna port group.

TABLE 4

One codeword: Total quantity of layers is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 2 layers, DMRS group index 0 |
| 4 | 2 layers, DMRS group index 1 |
| 5 | 2 layers, DMRS group index 2 |
| 6 | 2 layers, DMRS group index 1 DMRS group index 2 |
| 7 | 3 layers, DMRS group index 0 |
| 8 | 3 layers, DMRS group index 1 |
| 9 | 3 layers, DMRS group index 2 |
| 10 | 3 layers, DMRS group index 1, 1 layer DMRS group index 2 |
| 11 | 3 layers, DMRS group index 1, 2 layers DMRS group index 2 |
| 12 | 4 layers, DMRS group index 0 |
| 13 | 4 layers, DMRS group index 1 |
| 14 | 4 layers, DMRS group index 2 |
| 15 | 4 layers, DMRS group index 1, 1 layer DMRS group index 2 |
| 16 | 4 layers, DMRS group index 1, 2 layers DMRS group index 2 |
| 17 | 4 layers, DMRS group index 1, 3 layers DMRS group index 2 |

Similar to transformation of Table 3 into Table 3-1, Table 4 may be correspondingly transformed. To be specific, cases in which values of the indication information are 10 and 11 in Table 4 are combined, and cases in which values of the indication information are 15 to 17 in Table 4 are combined. To avoid repetition, details are not described herein again.

It should be noted that in Table 4, that the value of the indication information is 6 also corresponds to the second data scheduling case. When the value of the indication information is 6, a corresponding total quantity of layers of the downlink data is 2, and the indication information corresponds to two antenna port groups. In this case, one antenna port group may correspond to one layer by default. Therefore, in Table 4, the combination information corresponding to the value of the indication information being 6 does not explicitly indicate a layer corresponding to each antenna port group. Optionally, the combination information corresponding to the value of the indication information being 6 may be replaced with the following form:

2 layers, DMRS group index 1, 1 layer
DMRS group index 2.

The combination information in Table 1 to Table 4 above all explicitly indicate the total quantity of layers of the downlink data. Optionally, in this embodiment of this application, the total quantity of layers of the downlink data may be implicitly indicated. For example, the network device may indicate the total quantity of layers of the downlink data by indicating the quantity of layers that is corresponding to each antenna port group. Correspondingly, Table 1, Table 3, and Table 4 may be evolved into Table 5. In other words, combination information corresponding to the indication information in Table 5 is at least one DMRS antenna port group and a quantity of layers that is corresponding to each DMRS antenna port group.

It should be understood that the following provides descriptions by using an example in which the combination information explicitly indicates the total quantity of layers of the downlink data. This embodiment of this application is not limited thereto, and all tables below may be transformed into a form shown in Table 5.

TABLE 5

One codeword: Total quantity of layers is less than or equal to 4
(One codeword: ≤4 layers)

| Value (value) of indication information | Combination information (message) |
|---|---|
| 0 | DMRS group index 0, 1 layer |
| 1 | DMRS group index 1, 1 layer |
| 2 | DMRS group index 2, 1 layer |
| 3 | DMRS group index 0, 2 layers |
| 4 | DMRS group index 1, 2 layers |
| 5 | DMRS group index 2, 2 layers |
| 6 | DMRS group index 1, 1 layer DMRS group index 2, 1 layer |
| 7 | DMRS group index 0, 3 layers |
| 8 | DMRS group index 1, 3 layers |
| 9 | DMRS group index 2, 3 layers |
| 10 | DMRS group index 1, 1 layer DMRS group index 2, 2 layers |
| 11 | DMRS group index 1, 2 layers DMRS group index 2, 1 layer |
| 12 | DMRS group index 0 |
| 13 | DMRS group index 1 |
| 14 | DMRS group index 2 |
| 15 | DMRS group index 1, 1 layer DMRS group index 2, 3 layers |
| 16 | DMRS group index 1, 2 layers DMRS group index 2, 2 layers |
| 17 | DMRS group index 1, 3 layers DMRS group index 2, 1 layer |

Similar to transformation of Table 3 into Table 3-1, Table 5 may be correspondingly transformed. To be specific, cases in which values of the indication information are 10 and 11 in Table 5 are combined, and cases in which values of the indication information are 15 to 17 in Table 5 are combined. To avoid repetition, details are not described herein again.

The correspondence between the indication information and the combination information in Table 1 to Table 5 may support the three data scheduling cases in 5G. In an actual application, Table 1 to Table 5 may be divided into a plurality of sub-tables. Table 3 is used as an example, and may be divided into Table 6 and Table 7. Specifically, the network device may indicate, to the terminal device by using higher layer signaling such as RRC signaling, a specific table used to determine the combination information corresponding to the indication information. For example, Table 6 is used in the first or third data scheduling case, and Table 7 is used in the second data scheduling case. In the third data scheduling case, a quantity of pieces of DCI that need to be detected by the terminal device may be configured by using higher layer signaling, to determine that Table 6 is used. In the second data scheduling case, a QCL type, a quantity of QCL relationships indicated in the DCI, or a format (format) of the DCI configured by using higher layer signaling may be used to determine to use Table 7. Optionally, the three data scheduling cases may alternatively be distinguished by using another method. This is not limited in this embodiment of this application. For example, whether the network device enables DMRS grouping is used to determine a table used to determine the combination information corresponding to the indication information. For example, the network device may configure, by using higher layer RRC signaling, whether the terminal device uses the DMRS port grouping of the network device. When indication information DMRS-Port-Group in the received RRC signaling sent by the network device is 'ON', indicating that the network device instructs the terminal device to use the DMRS grouping, the terminal device uses Table 6 and/or Table 7; or when indication information DMRS-Port-Group in the RRC signaling is 'OFF', indicating that the network device instructs the terminal device not to use the DMRS grouping, the terminal device uses Table 6-1.

TABLE 6

One codeword: Total quantity of layers
is less than or equal to 4
(One codeword: ≤4 layers)

| Value (value) of indication information | Combination information (message) |
| --- | --- |
| 0 | 1 layer, DMRS group index 0 |
| 1 | 1 layer, DMRS group index 1 |
| 2 | 1 layer, DMRS group index 2 |
| 3 | 2 layers, DMRS group index 0 |
| 4 | 2 layers, DMRS group index 1 |
| 5 | 2 layers, DMRS group index 2 |
| 6 | 3 layers, DMRS group index 0 |
| 7 | 3 layers, DMRS group index 1 |
| 8 | 3 layers, DMRS group index 2 |
| 9 | 4 layers, DMRS group index 0 |
| 10 | 4 layers, DMRS group index 1 |
| 11 | 4 layers, DMRS group index 2 |

As shown in Table 6, each piece of combination information in the correspondence that is between the indication information and the combination information and that is shown in Table 6 is used to indicate the total quantity of layers of the downlink data and one of the plurality of DMRS antenna port groups.

When the value of the indication information is 0, 3, 6, or 9 in Table 6, Table 6 may be applied to the foregoing first data scheduling case in the 5G system, namely, the single-station transmission scenario. When the value of the indication information is another value, Table 6 may be applied to the foregoing third data scheduling case in the 5G system, namely, the multi-DCI (which may also be referred to as multi-PDCCH) joint transmission scenario.

TABLE 7

One codeword: Total quantity of layers
is less than or equal to 4
(One codeword: ≤4 layers)

| Value (value) of indication information | Combination information (message) |
| --- | --- |
| 0 | 1 layer, DMRS group index 0, 1 layer DMRS group index 2 |
| 1 | 2 layers, DMRS group index 1 |
| 2 | 3 layers, DMRS group index 1, 1 layer DMRS group index 2, 2 layers |
| 3 | 3 layers, DMRS group index 1, 2 layers DMRS group index 2, 1 layer |
| 4 | 4 layers, DMRS group index 1, 1 layer DMRS group index 2, 3 layers |
| 5 | 4 layers, DMRS group index 1, 2 layers DMRS group index 2, 2 layers |
| 6 | 4 layers, DMRS group index 1, 3 layers DMRS group index 2, 1 layer |

As shown in Table 7, each piece of combination information in the correspondence that is between the indication information and the combination information and that is shown in Table 7 is used to indicate the total quantity of layers of the downlink data and two of the plurality of DMRS antenna port groups. In any two of the at least two DMRS antenna port groups, an antenna port in one DMRS antenna port group and an antenna port in the other DMRS antenna port group do not satisfy the QCL relationship.

The two DMRS antenna port groups may be the foregoing DMRS antenna port group 1 and DMRS antenna port group 2. In other words, an antenna port in the DMRS antenna port group 1 and an antenna port in the DMRS antenna port group 2 do not satisfy the QCL relationship.

It should be noted that, in Table 7, when the value of the indication information is 1, the corresponding total quantity of layers of the downlink data is 2, and two antenna port groups are corresponded. In this case, one antenna port group may correspond to one layer by default. Therefore, in Table 7, the combination information corresponding to the value of the indication information being 1 does not explicitly indicate a layer corresponding to each antenna port group. Optionally, the combination information corresponding to the value of the indication information being 1 may be replaced with the following form:

2 layers, DMRS group index 1, 1 layer
DMRS group index 2, 1 layer.

Table 7 may be applied to the foregoing second data scheduling case in the 5G system, namely, the single-DCI (which may also be referred to as single-PDCCH) joint transmission scenario.

It should be understood that, in this embodiment of this application, similar to transformation of Table 1 into Table 2 to Table 5, Table 6 and Table 7 may be correspondingly transformed. It should be further understood that, similar to transformation of Table 3 into Table 3-1, Table 7 may be correspondingly transformed. To be specific, in Table 7, cases in which values of the indication information are 2 and 3 are combined, and cases in which values of the indication information are 4 to 6 are combined. In this case, the indication information has only four values, and the size of the indication information can be reduced to 2 bits, thereby reducing signaling overheads. Refer to the foregoing descriptions for a specific transformation manner. To avoid repetition, details are not described herein again.

Quantities of values of the indication information in Table 6 and Table 7 are relatively small. Therefore, the size of the indication information is relatively small, thereby reducing signaling overheads. For example, the indication information in Table 6 is of 4 bits, and the indication information in Table 7 is of 3 bits. A quantity of bits of the indication information may have different values based on a specific configuration of higher layer signaling. For example, the network device may indicate, to the terminal device by using higher layer signaling such as RRC signaling, a specific table used to determine the combination information corresponding to the indication information. For example, Table 6 is used in the first or third data scheduling case, and the indication information is of 4 bits; and Table 7 is used in the second data scheduling case, and the indication information is of 3 bits. In the third data scheduling case, a quantity of pieces of DCI that need to be detected by the terminal device may be configured by using higher layer signaling, to determine that Table 6 is used and the indication information is of 4 bits. In the second data scheduling case, based on the QCL type or a quantity of QCL relationships, it may be determined that Table 7 is used, and the indication information is of 3 bits. Optionally, the three data scheduling cases may alternatively be distinguished by using another method. This is not limited in this application.

Further, for Table 6, corresponding to different application scenarios, Table 6 may further be divided into two tables. For example, Table 6 may be divided into Table 6-1 and Table 6-2. Table 6-1 may correspond to the first data scheduling case in the 5G system, and Table 6-2 may correspond to the third data scheduling case in the 5G system.

Optionally, whether the network device enables DMRS grouping is used to determine a table used to determine the combination information corresponding to the indication information. For example, the network device may configure, by using higher layer RRC signaling, whether the terminal device uses the DMRS port grouping of the network device. When indication information DMRS-Port-Group in the received RRC signaling sent by the network device is 'ON', indicating that the network device instructs the terminal device to use the DMRS grouping, the terminal device uses Table 6 or Table 6-2 and/or Table 7; or when indication information DMRS-Port-Group in the RRC signaling is 'OFF', indicating that the network device instructs the terminal device not to use the DMRS grouping, the terminal device uses Table 6-1.

Quantities of values of the indication information in Table 6-1 and Table 6-2 are relatively small. Therefore, the size of the indication information is relatively small, thereby reducing signaling overheads. For example, the indication information in Table 6-1 is of 2 bits, and the indication information in Table 6-2 is of 3 bits.

TABLE 6-1

One codeword: Total quantity of layers
is less than or equal to 4
(One codeword: ≤4 layers)

| Value (value) of indication information | Combination information (message) |
|---|---|
| 0 | 1 layer, DMRS group index 0 |
| 1 | 2 layers, DMRS group index 0 |

TABLE 6-1-continued

One codeword: Total quantity of layers
is less than or equal to 4
(One codeword: ≤4 layers)

| Value (value) of indication information | Combination information (message) |
|---|---|
| 2 | 3 layers, DMRS group index 0 |
| 3 | 4 layers, DMRS group index 0 |

TABLE 6-2

One codeword: Total quantity of layers
is less than or equal to 4
(One codeword: ≤4 layers)

| Value (value) of indication information | Combination information (message) |
|---|---|
| 0 | 1 layer, DMRS group index 1 |
| 1 | 1 layer, DMRS group index 2 |
| 2 | 2 layers, DMRS group index 1 |
| 3 | 2 layers, DMRS group index 2 |
| 4 | 3 layers, DMRS group index 1 |
| 5 | 3 layers, DMRS group index 2 |
| 6 | 4 layers, DMRS group index 1 |
| 7 | 4 layers, DMRS group index 2 |

It should be understood that, the foregoing describes, with reference to Table 1 to Table 7, the correspondence between the indication information and the combination information in this embodiment of this application when there is one codeword and the plurality of DMRS antenna port groups include three antenna port groups: the DMRS antenna port group 1, the DMRS antenna port group 2, and the DMRS antenna port group 0.

Optionally, the plurality of DMRS antenna port groups in this embodiment of this application may include two antenna port groups. For example, when there is one codeword and the plurality of DMRS antenna port groups include two antenna port groups: the DMRS antenna port group 1 and the DMRS antenna port group 2, the correspondence between the indication information and the combination information in this embodiment of this application is shown in Table 8.

TABLE 8

One codeword: Total quantity of layers
is less than or equal to 4
(One codeword: ≤4 layers)

| Value (value) of indication information | Combination information (message) |
|---|---|
| 0 | 1 layer, DMRS group index 1 |
| 1 | 1 layer, DMRS group index 2 |
| 2 | 2 layers, DMRS group index 1 |
| 3 | 2 layers, DMRS group index 2 |
| 4 | 2 layers, DMRS group index 1 DMRS group index 2 |
| 5 | 3 layers, DMRS group index 1 |
| 6 | 3 layers, DMRS group index 2 |
| 7 | 3 layers, DMRS group index 1 DMRS group index 2 |
| 8 | 3 layers, DMRS group index 2 DMRS group index 1 |
| 9 | 4 layers, DMRS group index 1 |
| 10 | 4 layers, DMRS group index 2 |

TABLE 8-continued

One codeword: Total quantity of layers
is less than or equal to 4
(One codeword: ≤4 layers)

| Value (value) of indication information | Combination information (message) |
| --- | --- |
| 11 | 4 layers, DMRS group index 1 DMRS group index 2 |
| 12 | 4 layers, DMRS group index 2 DMRS group index 1 |

Compared with Table 1, the DMRS antenna port group 0 (the DMRS group index 0) is not set in Table 8. In Table 8, for the first data scheduling case in 5G, mapping may be performed based on the DMRS group index 1. Specifically, when the value of the indication information is 0, 2, 5, or 9 in Table 8, the foregoing first data scheduling case in the 5G system, namely, the single-station transmission scenario, may be corresponded. When the value of the indication information is 0 to 3, 5, 6, 9, or 10, the foregoing third data scheduling case in the 5G system, namely, the multi-DCI (which may also be referred to as multi-PDCCH) joint transmission scenario, may be corresponded. When the value of the indication information is 7, 8, 11, or 12, the foregoing second data scheduling case in the 5G system, namely, the single-DCI (which may also be referred to as single-PDCCH) joint transmission scenario, is corresponded.

Because the DMRS group index 0 is removed from Table 8, a quantity of pieces of the indication information can be reduced, and control signaling overheads can be reduced.

Optionally, whether the network device enables DMRS grouping is used to determine whether Table 6-1 or Table 8 is used to determine the combination information corresponding to the indication information. For example, the network device may configure, by using higher layer RRC signaling, whether the terminal device uses the DMRS port grouping of the network device. When indication information DMRS-Port-Group in the received RRC signaling sent by the network device is 'ON', indicating that the network device instructs the terminal device to use the DMRS grouping, the terminal device uses Table 8; or when indication information DMRS-Port-Group in the RRC signaling is 'OFF', indicating that the network device instructs the terminal device not to use the DMRS grouping, the terminal device uses Table 6-1.

For an antenna port corresponding to each piece of indication information in Table 8, refer to the method for determining an antenna port in Table 1 described above. To avoid repetition, details are not described herein again.

It should be understood that, in this embodiment of this application, similar to transformation of Table 1 into Table 2 to Table 7, Table 8 may be correspondingly transformed. It should be further understood that, similar to transformation of Table 3 into Table 3-1, Table 8 may be correspondingly transformed. To be specific, in Table 8, cases in which values of the indication information are 8 and 9 are combined, and cases in which values of the indication information are 12 to 14 are combined. To avoid repetition, details are not described herein again.

Table 1 to Table 8 may correspond to a single-user multiple-input multiple-output (single user multiple input multiple output, SU-MIMO) scenario. In a multi-user multiple-input multiple-output (Multi user multiple input multiple output, MU-MIMO) scenario, as shown in Table 9, when values of the indication information are 3 to 14 or 1 to 24, the corresponding combination information is a total quantity of layers of the downlink data, at least one DMRS antenna port group, and one or more of the following information: a scrambling identity corresponding to the at least one DMRS antenna port group, an orthogonal cover code OCC used for a downlink DMRS pilot and/or the downlink data, or an antenna port that is occupied by the downlink data and that is in the at least one DMRS antenna port group.

For example, when the value of the indication information is 11, the combination information is (1 layer, DMRS group index 0, the third port in the group, n_SCID=0 (OCC=4)). "1 layer" indicates the total quantity of layers of the downlink data, namely, one layer; "DMRS group index 0" indicates a group identity of the at least one DMRS antenna port group, and corresponds to the DMRS antenna port group 0; "the third port in the group" indicates that data on this layer corresponds to the third antenna port in the DMRS antenna port group 0, for example, when the DMRS antenna port group 0 includes antenna ports {1000 to 1003}, the third antenna port is the antenna port 1002; "n_SCID=0" indicates that a scrambling identity corresponding to the DMRS antenna port group 0 is 0; and "OCC=4" indicates that the orthogonal cover code OCC used for the downlink DMRS pilot and/or the downlink data is 4. Therefore, that the value of the indication information is 11 may indicate that the quantity of layers of the downlink data is 1, and correspond to the third port in the DMRS antenna port group 0, such as the antenna port 1002, the scrambling identity corresponding to the DMRS antenna port group 0 is 0, and the OCC used for the downlink DMRS pilot and/or the downlink data is 4.

It should be understood that, Table 9 shows that, when the value of the indication information is 3 to 14 or 19 to 24, the corresponding combination information may indicate the antenna port occupied by the downlink data. For example, Table 9 shows that, when the quantity of layers is 1, the DMRS antenna port occupied by the downlink data is the first antenna port in the group. For example, when the indication information is 3, the corresponding combination information is: 1 layer, DMRS group index 0, the first port in the group, n_SCID=0 (OCC=2), and the combination information indicates a case in which the downlink data occupies the first antenna port in the DMRS antenna port group 0. This embodiment of this application is not limited thereto. For example, when the quantity of layers is 1, the combination information may indicate that data on this layer occupies the second antenna port, the third antenna port, the last antenna port, or the like in the DMRS antenna port group 0.

Similarly, Table 9 shows that, when the quantity of layers is 2, the combination information (for example, combination information corresponding to the value of the indication information being 19) indicates that DMRS antenna ports occupied by the downlink data are the first and second antenna ports in the DMRS antenna port group 0, or the combination information (for example, combination information corresponding to the value of the indication information being 23) indicates that DMRS antenna ports occupied by the downlink data are the third and fourth antenna ports in the DMRS antenna port group 0. However, this embodiment of this application is not limited thereto. For example, when the quantity of layers is 2, the combination information may indicate that data on these two layers occupies corresponding antenna ports, for example, the second and third antenna ports, or the second and fourth antenna ports, or the first and fourth antenna ports, or the first and third antenna ports in the DMRS antenna port group 0. This embodiment of this application is not limited thereto.

TABLE 9

One codeword: Total quantity of layers
is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 1 layer, DMRS group index 0, the first port in the group, n_SCID = 0 (OCC = 2) |
| 4 | 1 layer, DMRS group index 0, the first port in the group, n_SCID = 1 (OCC = 2) |
| 5 | 1 layer, DMRS group index 0, the second port in the group, n_SCID = 0 (OCC = 2) |
| 6 | 1 layer, DMRS group index 0, the second port in the group, n_SCID = 1 (OCC = 2) |
| 7 | 1 layer, DMRS group index 0, the first port in the group, n_SCID = 0 (OCC = 4) |
| 8 | 1 layer, DMRS group index 0, the first port in the group, n_SCID = 1 (OCC = 4) |
| 9 | 1 layer, DMRS group index 0, the second port in the group, n_SCID = 0 (OCC = 4) |
| 10 | 1 layer, DMRS group index 0, the second port in the group, n_SCID = 1 (OCC = 4) |
| 11 | 1 layer, DMRS group index 0, the third port in the group, n_SCID = 0 (OCC = 4) |
| 12 | 1 layer, DMRS group index 0, the third port in the group, n_SCID = 1 (OCC = 4) |
| 13 | 1 layer, DMRS group index 0, the fourth port in the group, n_SCID = 0 (OCC = 4) |
| 14 | 1 layer, DMRS group index 0, the fourth port in the group, n_SCID = 1 (OCC = 4) |
| 15 | 2 layers, DMRS group index 0 |
| 16 | 2 layers, DMRS group index 1 |
| 17 | 2 layers, DMRS group index 2 |
| 18 | 2 layers, DMRS group index 1 the DMRS group index 2 |
| 19 | 2 layers, DMRS group index 0, the first and second ports, n_SCID = 0 (OCC = 2) |
| 20 | 2 layers, DMRS group index 0, the first and second ports, n_SCID = 1 (OCC = 2) |
| 21 | 2 layers, DMRS group index 0, the first and second ports, n_SCID = 0 (OCC = 4) |
| 22 | 2 layers, DMRS group index 0, the first and second ports, n_SCID = 1 (OCC = 4) |
| 23 | 2 layers, DMRS group index 0, the third and fourth ports, n_SCID = 0 (OCC = 4) |
| 24 | 2 layers, DMRS group index 0, the third and fourth ports, n_SCID = 1 (OCC = 4) |
| 25 | 3 layers, DMRS group index 0 |
| 26 | 3 layers, DMRS group index 1 |
| 27 | 3 layers, DMRS group index 2 |
| 28 | 3 layers, DMRS group index 1 DMRS group index 2 |

TABLE 9-continued

One codeword: Total quantity of layers
is less than or equal to 4
(One codeword: ≤4 layers)

| Value (value) of indication information | Combination information (message) |
|---|---|
| 29 | 3 layers, DMRS group index 2 DMRS group index 1 |
| 30 | 4 layers, DMRS group index 0 |
| 31 | 4 layers, DMRS group index 1 |
| 32 | 4 layers, DMRS group index 2 |
| 33 | 4 layers, DMRS group index 1 DMRS group index 2 |
| 34 | 4 layers, DMRS group index 2 DMRS group index 1 |

That the value of the indication information is 0, 15, 25, or 30 in Table 9 may correspond to the foregoing first data scheduling case in the 5G system, namely, the single-station transmission scenario. That the value of the indication information is 3 to 14 or 19 to 24 corresponds to a single-station MU transmission scenario in the foregoing first data scheduling case in the 5G system. That the value of the indication information is 1, 2, 16, 17, 26, 27, 31, or 32 may correspond to the foregoing third data scheduling case in the 5G system, namely, the multi-DCI (which may also be referred to as multi-PDCCH) joint transmission scenario. That the value of the indication information is 18, 28, 29, 33, or 34 corresponds to the foregoing second data scheduling case in the 5G system, namely, the single-DCI (which may also be referred to as single-PDCCH) joint transmission scenario.

Table 9 shows combination information corresponding to each piece of indication information when values of the indication information are 0 to 34. It may be understood that the values of the indication information that correspond to the 35 pieces of combination information may alternatively be other specific values, provided that the network device and the terminal device have consistent understanding of the correspondence between the combination information and the values of the indication information.

It should be understood that, in this embodiment of this application, similar to transformation of Table 1 into Table 2 to Table 8, Table 9 may be correspondingly transformed. For example, similar to transformation of Table 1 into Table 2, Table 9 may be transformed into Table 9-1. Similar to transformation of Table 1 into Table 2 above, the cases in which the values of the indication information are 28 and 29 in Table 9 may be combined into a case in which a value of the indication information is 28 in Table 9-1. As shown in Table 9-1, that the value of the indication information is 28 corresponds to the total quantity of layers of the data being 3, and the antenna port groups 1 and 2. It may be set, by default according to the preset rule, that the antenna port group 1 corresponds to one layer, and the antenna port group 2 corresponds to two layers. In addition, optionally, for the case corresponding to the value of the indication information being 29 in Table 9, in an actual application, for Table 9-1, the network device may indicate, by using an instruction (which may be referred to as, for example, a reverse instruction), that when the value of the indication information is 29, the antenna port group 1 corresponds to two layers, and the antenna port group 2 corresponds to one layer. In an actual application, the network device may further implement Table 9-1 by configuring QCL information of a DMRS group. For example, the QCL relationship of the DMRS antenna port group 1 is configured to correspond to the first network device, and the QCL relationship of the DMRS antenna port group 2 is configured to correspond to the second network device. Then, the QCL relationship of the DMRS antenna port group 1 may be reconfigured to correspond to the second network device, and the QCL relationship of the DMRS antenna port group 2 may be configured to correspond to the first network device, to implement a "reverse" effect, so that the cases in which the values of the indication information are 28 and 29 in Table 9 are combined into the case in which the value of the indication information is 28 in Table 9-1.

Similarly, the cases in which the values of the indication information are 33 and 34 in Table 9 may be combined into a case, to be specific, a case in which a value of the indication information is 32 in Table 9-1. To avoid repetition, details are not described herein again.

TABLE 9-1

One codeword: Total quantity of layers
is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 1 layer, DMRS group index 0, the first port in the group, n_SCID = 0 (OCC = 2) |
| 4 | 1 layer, DMRS group index 0, the first port in the group, n_SCID = 1 (OCC = 2) |
| 5 | 1 layer, DMRS group index 0, the second port in the group, n_SCID = 0 (OCC = 2) |
| 6 | 1 layer, DMRS group index 0, the second port in the group, n_SCID = 1 (OCC = 2) |
| 7 | 1 layer, DMRS group index 0, the first port in the group, n_SCID = 0 (OCC = 4) |
| 8 | 1 layer, DMRS group index 0, the first port in the group, n_SCID = 1 (OCC = 4) |
| 9 | 1 layer, DMRS group index 0, the second port in the group, n_SCID = 0 (OCC = 4) |
| 10 | 1 layer, DMRS group index 0, the second port in the group, n_SCID = 1 (OCC = 4) |
| 11 | 1 layer, DMRS group index 0, the third port in the group, n_SCID = 0 (OCC = 4) |
| 12 | 1 layer, DMRS group index 0, the third port in the group, n_SCID = 1 (OCC = 4) |
| 13 | 1 layer, DMRS group index 0, the fourth port in the group, n_SCID = 0 (OCC = 4) |
| 14 | 1 layer, DMRS group index 0, the fourth port in the group, n_SCID = 1 (OCC = 4) |
| 15 | 2 layers, DMRS group index 0 |
| 16 | 2 layers, DMRS group index 1 |
| 17 | 2 layers, DMRS group index 2 |
| 18 | 2 layers, DMRS group index 1 DMRS group index 2 |
| 19 | 2 layers, DMRS group index 0, the first and second ports, n_SCID = 0 (OCC = 2) |
| 20 | 2 layers, DMRS group index 0, the first and second ports, n_SCID = 1 (OCC = 2) |
| 21 | 2 layers, DMRS group index 0, the first and second ports, n_SCID = 0 (OCC = 4) |
| 22 | 2 layers, DMRS group index 0, the first and second ports, n_SCID = 1 (OCC = 4) |
| 23 | 2 layers, DMRS group index 0, the third and fourth ports, n_SCID = 0 (OCC = 4) |
| 24 | 2 layers, DMRS group index 0, the third and fourth ports, n_SCID = 1 (OCC = 4) |
| 25 | 3 layers, DMRS group index 0 |
| 26 | 3 layers, DMRS group index 1 |
| 27 | 3 layers, DMRS group index 2 |
| 28 | 3 layers, DMRS group index 1 DMRS group index 2 |
| 29 | 4 layers, DMRS group index 0 |
| 30 | 4 layers, DMRS group index 1 |
| 31 | 4 layers, DMRS group index 2 |
| 32 | 4 layers, DMRS group index 1 DMRS group index 2 |

It should be understood that, in this embodiment of this application, Table 9 may be transformed into Table 9-2, and Table 9-1 may be transformed into Table 9-3. Compared with Table 9 and Table 9-1, Table 9-2 and Table 9-3 include only a case in which OCC=2, and do not include a case in which OCC=4.

Compared with Table 9 and Table 9-1, in Table 9-2 and Table 9-3, because the case in which OCC=4 does not exist, a quantity of pieces of the indication information can be reduced, storage space occupied by the table can be reduced, a quantity of bits of the indication information in the DCI can be reduced, and signaling overheads can be reduced.

TABLE 9-2

One codeword: Total quantity of layers is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 1 layer, DMRS group index 0, the first port in the group, n_SCID = 0 (OCC = 2) |
| 4 | 1 layer, DMRS group index 0, the first port in the group, n_SCID = 1 (OCC = 2) |
| 5 | 1 layer, DMRS group index 0, the second port in the group, n_SCID = 0 (OCC = 2) |
| 6 | 1 layer, DMRS group index 0, the second port in the group, n_SCID = 1 (OCC = 2) |
| 7 | 2 layers, DMRS group index 0 |
| 8 | 2 layers, DMRS group index 1 |
| 9 | 2 layers, DMRS group index 2 |
| 10 | 2 layers, DMRS group index 1 DMRS group index 2 |

TABLE 9-2-continued

One codeword: Total quantity of layers is less than or equal to 4
(One codeword: ≤4 layers)

| Value (value) of indication information | Combination information (message) |
|---|---|
| 11 | 2 layers, DMRS group index 0, the first and second ports, n_SCID = 0 (OCC = 2) |
| 12 | 2 layers, DMRS group index 0, the first and second ports, n_SCID = 1 (OCC = 2) |
| 13 | 3 layers, DMRS group index 0 |
| 14 | 3 layers, DMRS group index 1 |
| 15 | 3 layers, DMRS group index 2 |
| 16 | 3 layers, DMRS group index 1 DMRS group index 2 |
| 17 | 3 layers, DMRS group index 2 DMRS group index 1 |
| 18 | 4 layers, DMRS group index 0 |
| 19 | 4 layers, DMRS group index 1 |
| 20 | 4 layers, DMRS group index 2 |
| 21 | 4 layers, DMRS group index 1 DMRS group index 2 |
| 22 | 4 layers, DMRS group index 2 DMRS group index 1 |

TABLE 9-3

One codeword: Total quantity of layers is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 1 layer, DMRS group index 0, the first port in the group, n_SCID = 0 (OCC = 2) |
| 4 | 1 layer, DMRS group index 0, the first port in the group, n_SCID = 1 (OCC = 2) |
| 5 | 1 layer, DMRS group index 0, the second port in the group, n_SCID = 0 (OCC = 2) |
| 6 | 1 layer, DMRS group index 0, the second port in the group, n_SCID = 1 (OCC = 2) |
| 7 | 2 layers, DMRS group index 0 |
| 8 | 2 layers, DMRS group index 1 |
| 9 | 2 layers, DMRS group index 2 |
| 10 | 2 layers, DMRS group index 1 DMRS group index 2 |
| 11 | 2 layers, DMRS group index 0, the first and second ports, n_SCID = 0 (OCC = 2) |
| 12 | 2 layers, DMRS group index 0, the first and second ports, n_SCID = 1 (OCC = 2) |
| 13 | 3 layers, DMRS group index 0 |
| 14 | 3 layers, DMRS group index 1 |
| 15 | 3 layers, DMRS group index 2 |
| 16 | 3 layers, DMRS group index 1 DMRS group index 2 |
| 17 | 4 layers, DMRS group index 0 |
| 18 | 4 layers, DMRS group index 1 |
| 19 | 4 layers, DMRS group index 2 |
| 20 | 4 layers, DMRS group index 1 DMRS group index 2 |

For another example, similar to transformation of Table 1 into Table 3, Table 9 may be transformed into Table 10. To be specific, when the value of the indication information is 28, 32, or 33, combination information may further be set to indicate quantities of layers that are corresponding to both of the two DMRS antenna port groups. As shown in Table 10, in the second data scheduling case in the 5G system, it is recorded that, when the value of the indication information is 28, 32, or 33, the corresponding combination information may further indicate the quantity of layers that is corresponding to each antenna port group.

It should be understood that, in Table 10, when the value of the indication information is 28, the corresponding total quantity of layers of data is 3, the antenna port group 1 corresponds to one layer, and the antenna port group 2 corresponds to two layers. For Table 10, when the total quantity of layers of the data is 3, the antenna port group 1 corresponds to two layers, and the antenna port group 2 corresponds to one layer, in an actual application, the network device may indicate, by using an instruction (which may be referred to as, for example, a reverse instruction), that when the value of the indication information is 28, the antenna port group 1 corresponds to two layers, and the antenna port group 2 corresponds to one layer. In an actual application, the network device may further implement Table 10 by configuring QCL information of a DMRS group. For example, the QCL relationship of the DMRS antenna port group 1 is configured to correspond to the first network device, and the QCL relationship of the DMRS antenna port group 2 is configured to correspond to the second network device. Then, the QCL relationship of the DMRS antenna port group 1 may be reconfigured to correspond to the second network device, and the QCL relationship of the DMRS antenna port group 2 may be configured to correspond to the first network device, to implement a "reverse" effect, so that when the value of the indication information is 28 in Table 10, the combination information indicates that the antenna port group 1 corresponds to two layers, and the antenna port group 2 corresponds to one layer. A case in which the value of the indication information is 32 is similar. To avoid repetition, details are not described herein again.

It should be understood that, refer to the descriptions above for other tables obtained after Table 9 may be correspondingly transformed based on the transformation of Table 1 into Table 2 to Table 8. To avoid repetition, details are not described herein again.

TABLE 10

One codeword: Total quantity of layers is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 1 layer, DMRS group index 0, the first port in the group, n_SCID = 0 (OCC = 2) |
| 4 | 1 layer, DMRS group index 0, the first port in the group, n_SCID = 1 (OCC = 2) |
| 5 | 1 layer, DMRS group index 0, the second port in the group, n_SCID = 0 (OCC = 2) |
| 6 | 1 layer, DMRS group index 0, the second port in the group, n_SCID = 1 (OCC = 2) |
| 7 | 1 layer, DMRS group index 0, the first port in the group, n_SCID = 0 (OCC = 4) |
| 8 | 1 layer, DMRS group index 0, the first port in the group, n_SCID = 1 (OCC = 4) |

TABLE 10-continued

One codeword: Total quantity of layers is less than or equal to 4
(One codeword: ≤4 layers)

| Value (value) of indication information | Combination information (message) |
|---|---|
| 9 | 1 layer, DMRS group index 0, the second port in the group, n_SCID = 0 (OCC = 4) |
| 10 | 1 layer, DMRS group index 0, the second port in the group, n_SCID = 1 (OCC = 4) |
| 11 | 1 layer, DMRS group index 0, the third port in the group, n_SCID = 0 (OCC = 4) |
| 12 | 1 layer, DMRS group index 0, the third port in the group, n_SCID = 1 (OCC = 4) |
| 13 | 1 layer, DMRS group index 0, the fourth port in the group, n_SCID = 0 (OCC = 4) |
| 14 | 1 layer, DMRS group index 0, the fourth port in the group, n_SCID = 1 (OCC = 4) |
| 15 | 2 layers, DMRS group index 0 |
| 16 | 2 layers, DMRS group index 1 |
| 17 | 2 layers, DMRS group index 2 |
| 18 | 2 layers, DMRS group index 1 |
| 19 | 2 layers, DMRS group index 0, the first and second ports, n_SCID = 0 (OCC = 2) |
| 20 | 2 layers, DMRS group index 0, the first and second ports, n_SCID = 1 (OCC = 2) |
| 21 | 2 layers, DMRS group index 0, the first and second ports, n_SCID = 0 (OCC = 4) |
| 22 | 2 layers, DMRS group index 0, the first and second ports, n_SCID = 1 (OCC = 4) |
| 23 | 2 layers, DMRS group index 0, the third and fourth ports, n_SCID = 0 (OCC = 4) |
| 24 | 2 layers, DMRS group index 0, the third and fourth ports, n_SCID = 1 (OCC = 4) |
| 25 | 3 layers, DMRS group index 0 |
| 26 | 3 layers, DMRS group index 1 |
| 27 | 3 layers, DMRS group index 2 |
| 28 | 3 layers, DMRS group index 1, 1 layer DMRS group index 2, 2 layers |
| 29 | 4 layers, DMRS group index 0 |
| 30 | 4 layers, DMRS group index 1 |
| 31 | 4 layers, DMRS group index 2 |
| 32 | 4 layers, DMRS group index 1, 1 layer DMRS group index 2, 3 layers |
| 33 | 4 layers, DMRS group index 1, 2 layers DMRS group index 2, 2 layers |

It should be understood that, in this embodiment of this application, Table 10 may be transformed into Table 10-1. Compared with Table 10, Table 10-1 include only a case in which OCC=2, and do not include a case in which OCC=4. Because the case in which OCC=4 does not exist, a quantity of pieces of the indication information can be reduced, storage space occupied by Table 10-1 can be reduced, a quantity of bits of the indication information in the DCI can be reduced, and signaling overheads can be reduced.

TABLE 10-1

One codeword: Total quantity of layers is less than or equal to 4
(One codeword: ≤4 layers)

| Value (value) of indication information | Combination information (message) |
|---|---|
| 0 | 1 layer, DMRS group index 0 |
| 1 | 1 layer, DMRS group index 1 |
| 2 | 1 layer, DMRS group index 2 |
| 3 | 1 layer, DMRS group index 0, the first port in the group, n_SCID = 0 (OCC = 2) |
| 4 | 1 layer, DMRS group index 0, the first port in the group, n_SCID = 1 (OCC = 2) |
| 5 | 1 layer, DMRS group index 0, the second port in the group, n_SCID = 0 (OCC = 2) |
| 6 | 1 layer, DMRS group index 0, the second port in the group, n_SCID = 1 (OCC = 2) |
| 7 | 2 layers, DMRS group index 0 |
| 8 | 2 layers, DMRS group index 1 |
| 9 | 2 layers, DMRS group index 2 |
| 10 | 2 layers, DMRS group index 1 DMRS group index 2 |
| 11 | 2 layers, DMRS group index 0, the first and second ports, n_SCID = 0 (OCC = 2) |
| 12 | 2 layers, DMRS group index 0, the first and second ports, n_SCID = 1 (OCC = 2) |
| 13 | 3 layers, DMRS group index 0 |
| 14 | 3 layers, DMRS group index 1 |
| 15 | 3 layers, DMRS group index 2 |
| 16 | 3 layers, DMRS group index 1, 1 layer DMRS group index 2, 2 layers |
| 17 | 4 layers, DMRS group index 0 |
| 18 | 4 layers, DMRS group index 1 |
| 19 | 4 layers, DMRS group index 2 |
| 20 | 4 layers, DMRS group index 1, 1 layer DMRS group index 2, 3 layers |
| 21 | 4 layers, DMRS group index 1, 2 layers DMRS group index 2, 2 layers |

The foregoing describes, with reference to the descriptions of Table 1 to Table 10, the correspondence between the indication information and the combination information in this embodiment of this application when there is one codeword and the plurality of DMRS antenna port groups include three or two antenna port groups.

The following describes the correspondence between the indication information and the combination information in this embodiment of this application when there are two codewords.

For example, the correspondence (which may also be referred to as the mapping relationship) between the indication information and the combination information, namely, the one-to-one correspondence between the plurality of pieces of indication information and the plurality of pieces of combination information, is shown in Table 11.

TABLE 11

| Two codewords (two codewords) | |
|---|---|
| Value (value) of indication information | Combination information (message) |
| 0 | 5 layers, DMRS group index 0 |
| 1 | 5 layers, DMRS group index 1 |
| 2 | 5 layers, DMRS group index 2 |

TABLE 11-continued

Two codewords
(two codewords)

| Value (value) of indication information | Combination information (message) |
|---|---|
| 3 | 5 layers, DMRS group index 1, 1 layer DMRS group index 2, 4 layers |
| 4 | 5 layers, DMRS group index 1, 2 layers DMRS group index 2, 3 layers |
| 5 | 5 layers, DMRS group index 1, 3 layers DMRS group index 2, 2 layers |
| 6 | 5 layers, DMRS group index 1, 4 layers DMRS group index 2, 1 layer |
| 7 | 6 layers, DMRS group index 0 |
| 8 | 6 layers, DMRS group index 1 |
| 9 | 6 layers, DMRS group index 2 |
| 10 | 6 layers, DMRS group index 1, 1 layer DMRS group index 2, 5 layers |
| 11 | 6 layers, DMRS group index 1, 2 layers DMRS group index 2, 4 layers |
| 12 | 6 layers, DMRS group index 1, 3 layers; DMRS group index 2, 3 layers |
| 13 | 6 layers, DMRS group index 1, 4 layers DMRS group index 2, 2 layers |
| 14 | 6 layers, DMRS group index 1, 2 layers DMRS group index 2, 4 layers |
| 15 | 6 layers, DMRS group index 1, 5 layers DMRS group index 2, 1 layer |
| 16 | 7 layers, DMRS group index 0 |
| 17 | 7 layers, DMRS group index 1 |
| 18 | 7 layers, DMRS group index 2 |
| 19 | 7 layers, DMRS group index 1, 1 layer DMRS group index 2, 6 layers |
| 20 | 7 layers, DMRS group index 1, 2 layers DMRS group index 2, 5 layers |
| 21 | 7 layers, DMRS group index 1, 3 layers DMRS group index 2, 4 layers |
| 22 | 7 layers, DMRS group index 1, 4 layers DMRS group index 2, 3 layers |
| 23 | 7 layers, DMRS group index 1, 5 layers DMRS group index 2, 2 layers |
| 24 | 7 layers, DMRS group index 1, 6 layers DMRS group index 2, 1 layer |
| 25 | 8 layers, DMRS group index 0 |
| 26 | 8 layers, DMRS group index 1 |
| 27 | 8 layers, DMRS group index 2 |
| 28 | 8 layers, DMRS group index 1, 1 layer DMRS group index 2, 7 layers |
| 29 | 8 layers, DMRS group index 1, 2 layers DMRS group index 2, 6 layers |
| 30 | 8 layers, DMRS group index 1, 3 layers DMRS group index 2, 5 layers |
| 31 | 8 layers, DMRS group index 1, 4 layers DMRS group index 2, 4 layers |
| 32 | 8 layers, DMRS group index 1, 5 layers DMRS group index 2, 3 layers |
| 33 | 8 layers, DMRS group index 1, 6 layers DMRS group index 2, 2 layers |
| 34 | 8 layers, DMRS group index 1, 7 layers DMRS group index 2, 1 layer |

As shown in Table 11, when the value (value) of the indication information in the DCI is 1, the combination information corresponding to the indication information is "5 layers, DMRS group index 1". In other words, the total quantity of layers of the downlink data is 5, and corresponds to the DMRS antenna port group 1.

That the value of the indication information is 0, 7, 16, or 25 in Table 11 may correspond to the foregoing first data scheduling case in the 5G system, namely, the single-station transmission scenario. That the value of the indication information is 1, 2, 8, 9, 17, 18, 26, or 27 may correspond to the foregoing third data scheduling case in the 5G system, namely, the multi-DCI (which may also be referred to as multi-PDCCH) joint transmission scenario. That the value of the indication information is 3 to 6, 10 to 15, 19 to 24, or 28 to 34 corresponds to the foregoing second data scheduling case in the 5G system, namely, the single-DCI (which may also be referred to as single-PDCCH) joint transmission scenario.

It should be understood that, similar to the method for determining a specific antenna port number according to the preset rule in Table 1, the terminal device may determine a specific DMRS antenna port based on Table 11. To avoid repetition, details are not described herein again.

It should be understood that, Table 11 is for the second data scheduling case in the 5G system, namely, the single-DCI (which may also be referred to as single-PDCCH) joint transmission scenario. A quantity of layers of the data corresponding to each antenna port group is indicated. Optionally, the quantity of layers of the data corresponding to each antenna port group may alternatively not be indicated in Table 11, and the network device and the terminal device may determine, according to a preset rule similar to that shown in Table 1, a quantity of layers that is corresponding to each port group. For brevity, details are not described herein again.

It should be understood that Table 11 may be correspondingly transformed based on the transformation of Table 1 into Table 2 to Table 10 or based on a form of another table in the foregoing descriptions. For example, the combination information in Table 11 may be transformed to include the total quantity of layers of the downlink data and at least one DMRS antenna port group, and the quantity of layers that is corresponding to each DMRS antenna port group is not explicitly indicated. The terminal device may determine, according to the preset rule, the quantity of layers and a specific antenna port that are corresponding to each DMRS antenna port group. The combination information in Table 11 may alternatively be transformed to include at least one DMRS antenna port group and a quantity of layers that is corresponding to each DMRS antenna port group, but the total quantity of layers of the downlink data is not explicitly indicated. The combination information in Table 11 may alternatively be transformed to include the total quantity of layers of the downlink data, the at least one DMRS antenna port group, and a quantity of layers that is corresponding to some or all of the at least one DMRS antenna port group. Refer to the foregoing descriptions for a specific form of a table obtained after Table 11 is transformed. To avoid repetition, details are not described herein again.

The foregoing describes, separately for one codeword and two codewords, the correspondence between the indication information and the combination information in this embodiment of this application. In addition, the correspondence that is between the indication information and the combination information and that is corresponding to one codeword and the correspondence that is between the indication information and the combination information and that is corresponding to two codewords may be represented by using one or more lists. For example, as shown in Table 12, Table 12 is obtained by combining Table 3 and Table 11 together. In this case, the terminal device and the network device each may store a list, and determine a DMRS antenna port based on the list, so that storage space can be saved.

TABLE 12

| One codeword: Total quantity of layers is less than or equal to 4 (One codeword: ≤4 layers) | | Two codewords (two codewords) | |
|---|---|---|---|
| Value (value) of indication information | Combination information (message) | Value (value) of indication information | Combination information (message) |
| 0 | 1 layer, DMRS group index 0 | 0 | 5 layers, DMRS group index 0 |
| 1 | 1 layer, DMRS group index 1 | 1 | 5 layers, DMRS group index 1 |
| 2 | 1 layer, DMRS group index 2 | 2 | 5 layers, DMRS group index 2 |
| 3 | 2 layers, DMRS group index 0 | 3 | 5 layers, DMRS group index 1, 1 layer DMRS group index 2, 4 layers |
| 4 | 2 layers, DMRS group index 1 | 4 | 5 layers, DMRS group index 1, 2 layers DMRS group index 2, 3 layers |
| 5 | 2 layers, DMRS group index 2 | 5 | 5 layers, DMRS group index 1, 3 layers DMRS group index 2, 2 layers |
| 6 | 2 layers, DMRS group index 1 DMRS group index 2 | 6 | 5 layers, DMRS group index 1, 4 layers DMRS group index 2, 1 layer |
| 7 | 3 layers, DMRS group index 0 | 7 | 6 layers, DMRS group index 0 |
| 8 | 3 layers, DMRS group index 1 | 8 | 6 layers, DMRS group index 1 |
| 9 | 3 layers, DMRS group index 2 | 9 | 6 layers, DMRS group index 2 |
| 10 | 3 layers, DMRS group index 1, 1 layer DMRS group index 2, 2 layers | 10 | 6 layers, DMRS group index 1, 1 layer DMRS group index 2, 5 layers |
| 11 | 3 layers, DMRS group index 1, 2 layers DMRS group index 2, 1 layer | 11 | 6 layers, DMRS group index 1, 2 layers DMRS group index 2, 4 layers |
| 12 | 4 layers, DMRS group index 0 | 12 | 6 layers, DMRS group index 1, 3 layers DMRS group index 2, 3 layers |
| 13 | 4 layers, DMRS group index 1 | 13 | 6 layers, DMRS group index 1, 4 layers DMRS group index 2, 2 layers |
| 14 | 4 layers, DMRS group index 2 | 14 | 6 layers, DMRS group index 1, 2 layers DMRS group index 2, 4 layers |
| 15 | 4 layers, DMRS group index 1, 1 layer DMRS group index 2, 3 layers | 15 | 6 layers, DMRS group index 1, 5 layers DMRS group index 2, 1 layer |
| 16 | 4 layers, DMRS group index 1, 2 layers DMRS group index 2, 2 layers | 16 | 7 layers, DMRS group index 0 |
| 17 | 4 layers, DMRS group index 1, 3 layers | 17 | 7 layers, DMRS group index 1 |
| | DMRS group index 2, 1 layer | 18 | 7 layers, DMRS group index 2 |
| | | 19 | 7 layers, DMRS group index 1, 1 layer DMRS group index 2, 6 layers |
| | | 20 | 7 layers, DMRS group index 1, 2 layers DMRS group index 2, 5 layers |
| | | 21 | 7 layers, DMRS group index 1, 3 layers DMRS group index 2, 4 layers |
| | | 22 | 7 layers, DMRS group index 1, 4 layers DMRS group index 2, 3 layers |
| | | 23 | 7 layers, DMRS group index 1, 5 layers DMRS group index 2, 2 layers |
| | | 24 | 7 layers, DMRS group index 1, 6 layers DMRS group index 2, 1 layer |
| | | 25 | 8 layers, DMRS group index 0 |
| | | 26 | 8 layers, DMRS group index 1 |
| | | 27 | 8 layers, DMRS group index 2 |
| | | 28 | 8 layers, DMRS group index 1, 1 layer DMRS group index 2, 7 layers |
| | | 29 | 8 layers, DMRS group index 1, 2 layers DMRS group index 2, 6 layers |
| | | 30 | 8 layers, DMRS group index 1, 3 layers DMRS group index 2, 5 layers |
| | | 31 | 8 layers, DMRS group index 1, 4 layers DMRS group index 2, 4 layers |
| | | 32 | 8 layers, DMRS group index 1, 5 layers DMRS group index 2, 3 layers |
| | | 33 | 8 layers, DMRS group index 1, 6 layers DMRS group index 2, 2 layers |

TABLE 12-continued

| One codeword: Total quantity of layers is less than or equal to 4 (One codeword: ≤4 layers) | | Two codewords (two codewords) | |
| --- | --- | --- | --- |
| Value (value) of indication information | Combination information (message) | Value (value) of indication information | Combination information (message) |
| | | 34 | 8 layers, DMRS group index 1, 7 layers DMRS group index 2, 1 layer |

It should be noted that, the examples in the foregoing embodiment are merely intended to help a person skilled in the art to understand the embodiments of this application, rather than limiting the embodiments of this application to the specific values or specific scenarios shown in the examples. Apparently, a person skilled in the art can make various equivalent modifications or changes based on the examples provided above. For example, in the embodiments of this application, various variations, divisions, or combinations may be performed on the foregoing Table 1 to Table 12, and such modifications or changes also fall within the scope of the embodiments of this application.

For example, the foregoing table may be transformed into a form in which values of the indication information in a same scenario are consecutive. Table 1 is used as an example. In the first data scheduling case in the 5G system, it can be learned from Table 1 that the values of the indication information are discrete (the values of the indication information are 0, 3, 7, or 12 separately). For ease of distinguishing, the first data scheduling case may be set to correspond to four consecutive rows in a table. For example, combination information corresponding to values of the indication information being 0, 1, 2, and 3 corresponds to the values of the indication information being 0, 3, 7, and 12 respectively in Table 1. Similarly, the third data scheduling case and the second data scheduling case in the 5G system each may be set to correspond to several consecutive rows. For example, in the third data scheduling case, combination information corresponding to values of the indication information being 4 to 11 corresponds to the values of the indication information being 1, 2, 4, 5, 8, 9, 13, and 14 respectively in Table 1. In the second data scheduling case, combination information corresponding to values of the indication information being 12 to 17 corresponds to the values of the indication information being 6, 10, 11, 15, 16, and 17 respectively in Table 1.

320. The network device sends the DCI to the terminal device.

Correspondingly, the terminal device receives the DCI.

330. The terminal device determines a DMRS antenna port based on the DCI.

Specifically, the terminal device may determine, based on first indication information in the DCI and the correspondence (for example, one of the foregoing Table 1 to Table 12) between the indication information and the combination information, combination information corresponding to the first indication information, so that the terminal device determines, based on the combination information, the total quantity of layers of the downlink data and the at least one of the plurality of DMRS antenna port groups, and then the terminal device may determine a specific DMRS antenna port.

For example, the DMRS antenna port group 1 includes the antenna ports {1000 to 1003}, the DMRS antenna port group 2 includes the antenna ports {1004 to 1007}, and the correspondence between the indication information and the combination information is shown in Table 3. When a value of the first indication information is 10, the terminal device may determine that the first indication information corresponds to the total quantity of layers of the downlink data being 3, where the DMRS antenna port group 1 corresponds to one layer, and the DMRS antenna port group 2 corresponds to two layers. In this way, the terminal device may determine, according to the preset rule, that DMRS antenna ports are the first antenna port such as the antenna port 1000 in the DMRS antenna port group 1, and the first and second antenna ports such as the antenna ports 1004 and 1005 in the DMRS antenna port group 2.

Specifically, refer to the descriptions of Table 1 to Table 12 above for a method for determining the DMRS antenna port by the terminal device based on the first indication information after obtaining the first indication information. To avoid repetition, details are not described herein again.

After the terminal device determines the DMRS antenna port, the terminal device may perform processing, such as demodulation, on data based on a DMRS of the DMRS antenna port. It should be understood that, after determining the DMRS antenna port, the terminal device may perform corresponding processing according to a stipulation in an existing standard. A specific action performed by the terminal device after determining the DMRS antenna port is not limited in this embodiment of this application.

In an example in which the correspondence between the indication information and the combination information is the foregoing Table 10, for the foregoing three data scheduling cases, the following describes, by using specific examples, that the terminal device determines the DMRS antenna port based on the DCI.

In the first data scheduling case, namely, the single-DCI (which may also be referred to as single-PDCCH) single-cell transmission scenario, and the second data scheduling case, namely, the single-DCI (which may also be referred to as single-PDCCH) joint transmission scenario, the terminal device obtains only one piece of DCI. In the third data scheduling case, namely, the multi-DCI (which may also be referred to as multi-PDCCH) joint transmission scenario, the terminal device obtains DCI respectively sent by two network devices that perform joint transmission.

In the first data scheduling case, for example, the value of the first indication information in the DCI that is sent by the network device and that is obtained by the terminal device is 15. In this case, based on combination information (for example, 2 layers, DMRS group index 0) corresponding to the first indication information, the terminal device may determine that the DMRS antenna ports are the first two antenna ports such as the antenna ports 1000 and 1001 in the DMRS antenna port group 0.

In the second data scheduling case, for example, the value of the first indication information in the DCI that is sent by the network device and that is obtained by the terminal device is 33. In this case, based on the combination information (4 layers: DMRS group index 1, 2 layers; DMRS group index 2, 2 layers) corresponding to the first indication information, the terminal device may determine that the DMRS antenna ports are the first and second antenna ports such as the antenna ports 1000 and 1001 in the DMRS antenna port group 1 and the first and second antenna ports such as the antenna ports 1004 and 1005 in the DMRS antenna port group 2. In addition, the terminal device may determine that the antenna ports 1000 and 1001 satisfy the first QCL relationship, and may correspond to one network device; and that the antenna ports 1004 and 1005 satisfy the second QCL relationship, and may correspond to another network device.

In the third data scheduling case, the terminal device receives the first DCI sent by the first network device and the second DCI sent by the second network device. The first indication information in the first DCI is used to indicate a total quantity of layers of downlink data sent by the first network device and the DMRS antenna port group 1, and the second indication information in the second DCI is used to indicate a total quantity of layers of downlink data sent by the second network device and the DMRS antenna port group 2. The DMRS antenna port group 1 includes an antenna port used by the first network device to send the downlink data, and the DMRS antenna port group 2 includes an antenna port used by the second network device to send the downlink data. The antenna ports in the DMRS antenna port group 1 satisfy the first QCL relationship, and the antenna ports in the DMRS antenna port group 2 satisfy the second QCL relationship. For example, in this case, the terminal device receives that a value of the first indication information in the first DCI sent by the first network device is 26, and receives that a value of the second indication information in the second DCI sent by the second network device is 27. Therefore, based on Table 10, the terminal device may determine the DMRS antenna ports such as the antenna ports 1000 to 1002 based on the combination information (3 layers, DMRS group index 1) corresponding to the first indication information, and determine the DMRS antenna ports such as the antenna ports 1004 to 1006 based on the combination information (3 layers, DMRS group index 2) corresponding to the second indication information. In addition, the terminal device may determine that the antenna ports 1000 to 1002 corresponding to the first network device satisfy the first QCL relationship, and that the antenna ports 1004 to 1006 corresponding to the second network device satisfy the second QCL relationship.

Therefore, in this embodiment of this application, when grouping is used, the indication information is used to indicate the combination information, and the combination information is used to indicate the quantity of layers of the downlink data and the at least one DMRS antenna port group, so that the terminal device can obtain the DMRS antenna port, thereby indicating the DMRS antenna port when grouping is used, and improving network performance.

The foregoing describes the communication method in the embodiments of this application in the 5G system, for example, the NR system. The following describes a communication method in the embodiments of this application in an LTE system.

For ease of understanding and description, the following describes a correspondence that is between indication information and combination information and that is used to indicate a DMRS antenna port in the communication method in existing LTE.

In a single-station transmission scenario, for SU-MIMO, an existing correspondence between indication information and combination information may be shown in Table 13. Table 13 corresponds to Table (table) 5.3.3.1.5C-1 in the existing LTE standard 36.212.

TABLE 13

Antenna port, scrambling identity, and indication of quantity of layers (Antenna port(s), scrambling identity and number of layers indication)

| One codeword (one codeword: codeword 0 enabled, and codeword 1 disabled) | | Two codewords (two codewords: codeword 0 enabled, and codeword 1 enabled) | |
|---|---|---|---|
| Value (value) of indication information | Combination information (message) | Value (value) of indication information | Combination information (message) |
| 0 | 1 layer, port 7, n_SCID = 0 | 0 | 2 layers, ports 7 and 8, n_SCID = 0 |
| 1 | 1 layer, port 7, n_SCID = 1 | 1 | 2 layers, ports 7 and 8, n_SCID = 1 |
| 2 | 1 layer, port 8, n_SCID = 0 | 2 | 3 layers, ports 7 to 9 |
| 3 | 1 layer, port 8, n_SCID = 1 | 3 | 4 layers, ports 7 to 10 |
| 4 | 2 layers, ports 7 and 8 | 4 | 5 layers, ports 7 to 11 |
| 5 | 3 layers, ports 7 to 9 | 5 | 6 layers, ports 7 to 12 |
| 6 | 4 layers, ports 7 to 10 | 6 | 7 layers, ports 7 to 13 |
| 7 | Reserved | 7 | 8 layers, ports 7 to 14 |

For MU-MIMO, an existing correspondence between indication information and combination information may be shown in Table 14. Table 14 corresponds to Table (table) 5.3.3.1.5C-2 in the existing LTE standard 36.212.

TABLE 14

Antenna port, scrambling identity, and indication of quantity of layers (Antenna port(s), scrambling identity and number of layers indication)

| One codeword (one codeword: codeword 0 enabled, and codeword 1 disabled) | | Two codewords (two codewords: codeword 0 enabled, and codeword 1 enabled) | |
|---|---|---|---|
| Value (value) of indication information | Combination information (message) | Value (value) of indication information | Combination information (message) |
| 0 | 1 layer, port 7, n_SCID = 0 (OCC = 2) | 0 | 2 layers, ports 7 and 8, n_SCID = 0 (OCC = 2) |
| 1 | 1 layer, port 7, n_SCID = 1 (OCC = 2) | 1 | 2 layers, ports 7 and 8, n_SCID = 1 (OCC = 2) |
| 2 | 1 layer, port 8, n_SCID = 0 (OCC = 2) | 2 | 2 layers, ports 7 and 8, n_SCID = 0 (OCC = 4) |
| 3 | 1 layer, port 8, n_SCID = 1 (OCC = 2) | 3 | 2 layers, ports 7 and 8, n_SCID = 1 (OCC = 4) |
| 4 | 1 layer, port 7, n_SCID = 0 (OCC = 4) | 4 | 2 layers, ports 11 and 13, n_SCID = 0 (OCC = 4) |
| 5 | 1 layer, port 7, n_SCID = 1 (OCC = 4) | 5 | 2 layers, ports 11 and 13, n_SCID = 1 (OCC = 4) |

TABLE 14-continued

Antenna port, scrambling identity, and indication of quantity of layers
(Antenna port(s), scrambling identity and number of layers indication)

| | One codeword (one codeword: codeword 0 enabled, and codeword 1 disabled) | | Two codewords (two codewords: codeword 0 enabled, and codeword 1 enabled) | |
|---|---|---|---|---|
| Value (value) of indication information | Combination information (message) | Value (value) of indication information | Combination information (message) |
| 6 | 1 layer, port 8, n_SCID = 0 (OCC = 4) | 6 | 3 layers, ports 7 to 9 |
| 7 | 1 layer, port 8, n_SCID = 1 (OCC = 4) | 7 | 4 layers, ports 7 to 10 |
| 8 | 1 layer, port 11, n_SCID = 0 (OCC = 4) | 8 | 5 layers, ports 7 to 11 |
| 9 | 1 layer, port 11, n_SCID = 1 (OCC = 4) | 9 | 6 layers, ports 7 to 12 |
| 10 | 1 layer, port 13, n_SCID = 0 (OCC = 4) | 10 | 7 layers, ports 7 to 13 |
| 11 | 1 layer, port 13, n_SCID = 1 (OCC = 4) | 11 | 8 layers, ports 7 to 14 |
| 12 | 2 layers, ports 7 and 8 | 12 | Reserved |
| 13 | 3 layers, ports 7 to 9 | 13 | Reserved |
| 14 | 4 layers, ports 7 to 10 | 14 | Reserved |
| 15 | Reserved | 15 | Reserved |

In a single-station transmission scenario in LTE, the network device may send one codeword or two codewords. When one codeword is sent, the DMRS antenna port may be indicated based on the correspondence for one codeword in Table 13 or Table 14, and when two codewords are sent, the DMRS antenna port may be indicated based on the correspondence for two codewords in Table 13 or Table 14.

In LTE, for a joint transmission scenario, a grouping concept may be used. Specifically, two codewords (codeword, CW) may be scheduled in one piece of DCI, and each CW corresponds to one network device (which may also be referred to as a transmission point TRP) for joint transmission. A DMRS grouping case is shown in Table 15, one codeword corresponds to one DMRS antenna port group, and antenna ports in different groups meet different QCL relationships.

In other words, in the single-station transmission scenario, there is one network device that sends data to the terminal device, and the network device may send one codeword or two codewords. In the joint transmission scenario, there are two network devices that jointly send data to the terminal device, and each of the two network devices that perform joint transmission sends only one codeword.

TABLE 15

| | DMRS to layer mapping | |
|---|---|---|
| Layer (Rank) | First group of DMRS antenna ports (CW1) | Second group of DMRS antenna ports (CW2) |
| 1 | N/A | |
| 2 | 7 | 8 |
| 3 | 7 | 9 and 10 |

TABLE 15-continued

| | DMRS to layer mapping | |
|---|---|---|
| Layer (Rank) | First group of DMRS antenna ports (CW1) | Second group of DMRS antenna ports (CW2) |
| 4 | 7 and 8 | 9 and 10 |
| 5 | 7 and 8 | 9, 10, and 12 |
| 6 | 7, 8, and 11 | 9, 10, and 12 |
| 7 | 7, 8, and 11 | 9, 10, 12, and 14 |
| 8 | 7, 8, 11, and 13 | 9, 10, 12, and 14 |

Because the grouping concept is not used in the antenna port, scrambling identity, and indication of quantity of layers shown in Table 13 and Table 14 in the existing LTE scenario, after the DMRS grouping in Table 15 is used, the DMRS antenna port cannot be indicated based on Table 13 and Table 14 in the case of NCJT.

Specifically, it can be learned from Table 15 that in the joint transmission scenario, when the quantity of layers of the downlink data is 3, corresponding DMRS antenna ports are antenna ports 7, 9, and 10. However, it can be learned from Table 13 and Table 14 that, in the case of two codewords, when the quantity of layers of the downlink data is 3, corresponding DMRS antenna ports are antenna ports 7 to 9. Similarly, when the quantities of layers are 5, 6, 7, and 8, corresponding antenna ports in Table 15 all do not correspond to corresponding antenna ports in the foregoing Table 13 and Table 14. Therefore, after grouping is used, the DMRS antenna port cannot be indicated based on the foregoing Table 13 and Table 14.

In this embodiment of this application, the existing Table 13 and Table 14 are improved. Specifically, the existing table may be improved when the quantities of layers of the downlink data are 3, 5, 6, 7, and 8. This resolves the foregoing problem, and can indicate the DMRS antenna port in the joint transmission scenario. The following describes a DMRS indication method in an embodiment of this application in detail with reference to FIG. 4.

Figure 4:
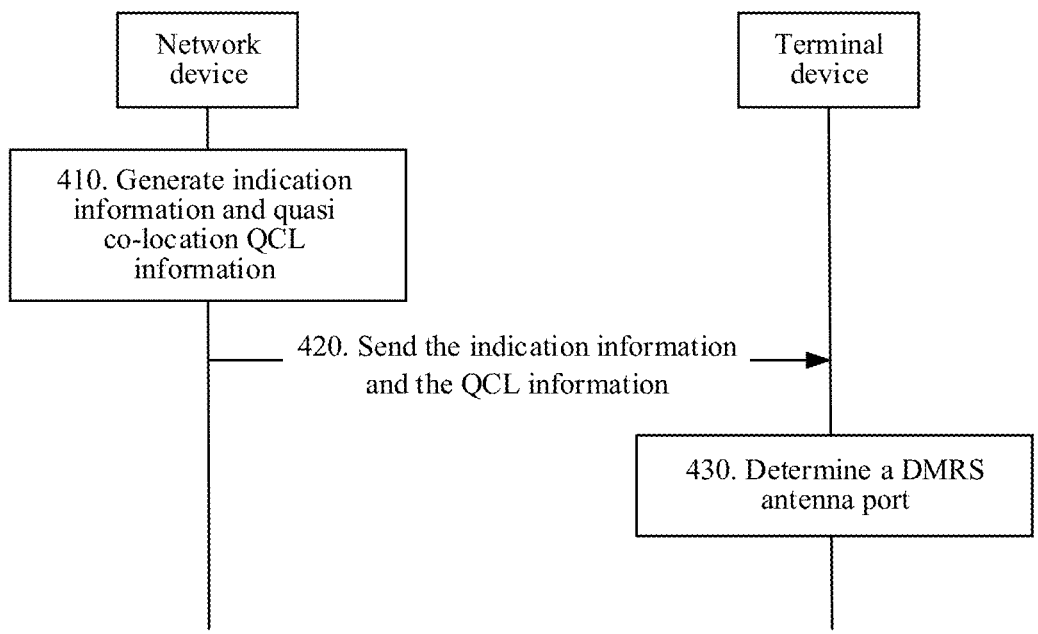
FIG. 4 is a schematic flowchart of an information transmission method according to another embodiment of this application.

FIG. 4 is a schematic flowchart of a communication method 400 according to an embodiment of this application. The method shown in FIG. 4 may be applied to the joint transmission scenario shown in FIG. 2. Specifically, the method 400 shown in FIG. 4 includes the following steps.

410. A network device generates indication information and quasi co-location QCL information.

Specifically, the QCL information is used to indicate a QCL type of a demodulation reference signal DMRS antenna port or a quantity of QCL relationships that DMRS antenna ports satisfy. The indication information indicates a total quantity N of layers of downlink data and N non-sequentially numbered DMRS antenna ports corresponding to sequentially numbered layers, or indicates a total quantity N of layers of downlink data and N sequentially numbered DMRS antenna ports corresponding to sequentially numbered layers, where N is an integer not less than 1.

In this embodiment of this application, the N non-sequentially numbered DMRS antenna ports corresponding to the sequentially numbered layers indicate that the N layers are numbered and sorted according to a sequence, that is, the first layer, the second layer, the third layer, . . . , and an $N^{th}$ layer, and numbers of DMRS antenna ports corresponding to the first layer to the $N^{th}$ layer are not arranged according to a sequence. The N sequentially numbered DMRS antenna ports corresponding to the sequentially numbered layers indicate that numbers of DMRS antenna ports corresponding to the first layer to the $N^{th}$ layer are sequentially arranged, where N is an integer greater than or equal to 1.

For example, if N is 5, the N non-sequentially numbered DMRS antenna ports corresponding to the sequentially numbered layers may be antenna ports 7, 8, 9, 10, and 12; and the N sequentially numbered DMRS antenna ports corresponding to the sequentially numbered layers may be antenna ports 7 to 11.

It should be understood that, in this embodiment of this application, for ease of description, "the total quantity N of layers of downlink data and the N non-sequentially numbered DMRS antenna ports corresponding to the sequentially numbered layers" that are indicated by the indication information in the foregoing may be referred to as "first combination information". "The total quantity N of layers of downlink data and the N sequentially numbered DMRS antenna ports corresponding to the sequentially numbered layers" that are indicated by the indication information in the foregoing may be referred to as "second combination information".

It should be understood that, in this embodiment of this application, the indication information may be one of one or more lists, and the one or more lists include a correspondence between the indication information and the first combination information and/or the second combination information. In other words, the list in this embodiment of this application includes a plurality of pieces of indication information and combination information (namely, the first information and/or the second combination information) corresponding thereto. The list in this embodiment of this application may indicate a correspondence between the indication information and the combination information. In this embodiment of this application, the correspondence between the indication information and the combination information may be specified in a protocol, or may be prestored or preconfigured. In other words, the network device and a terminal device may obtain the correspondence between the indication information and the combination information in advance.

In this embodiment of this application, "the correspondence between the indication information and the combination information" may also be referred to as "a mapping relationship between the indication information and the combination information". In this embodiment of this application, the correspondence (the mapping relationship) between the indication information and the combination information may be described in a tabular (which may also be referred to as a list) form. However, this embodiment of this application is not limited thereto. In this specification, the tabular form is used merely for easy and vivid description of the correspondence. In an actual application, the correspondence may be in the tabular form, or may be a string of characters or a segment of code. This embodiment of this application is not limited thereto.

In this embodiment of this application, in the correspondence between the indication information and the combination information, first indication information may correspond to only the first combination information or only the second combination information, or first indication information may correspond to the first combination information and the second combination information. The following separately provides descriptions by using examples.

A case in which the first indication information in the correspondence between the indication information and the combination information in this embodiment of this application corresponds to the first combination information and the second combination information is first described.

For example, when there are two codewords in this embodiment of this application, correspondences between the indication information and the combination information are shown in Table 16 and Table 17. Table 16 is a table obtained after Table 13 is improved in this embodiment of this application. Table 17 is a table obtained after Table 14 is improved in this embodiment of this application.

TABLE 16

Antenna port, scrambling identity, and indication of quantity of layers (Antenna port(s), scrambling identity and number of layers indication)

| One codeword (one codeword: codeword 0 enabled, and codeword 1 disabled) | | Two codewords (two codewords: codeword 0 enabled, and codeword 1 enabled) | |
|---|---|---|---|
| Value (value) of indication information | Combination information (message) | Value (value) of indication information | Combination information (message) |
| 0 | 1 layer, port 7, n_SCID = 0 | 0 | 2 layers, ports 7 and 8, n_SCID = 0 |
| 1 | 1 layer, port 7, n_SCID = 1 | 1 | 2 layers, ports 7 and 8, n_SCID = 1 |
| 2 | 1 layer, port 8, n_SCID = 0 | 2 | 3 layers, ports 7 to 9, and condition 1 3 layers, ports 7, 9, and 10, and condition 2 |
| 3 | 1 layer, port 8, n_SCID = 1 | 3 | 4 layers, ports 7 to 10 |
| 4 | 2 layers, ports 7 and 8 | 4 | 5 layers, ports 7 to 11, and condition 1 5 layers, ports 7,8, 9, 10, and 12, and condition 2 |
| 5 | 3 layers, ports 7 to 9 | 5 | 6 layers, ports 7 to 12, and condition 1 6 layers, ports 7, 8, 11, 9, 10, and 12, and condition 2 |
| 6 | 4 layers, ports 7 to 10 | 6 | 7 layers, ports 7 to 13, and condition 1 7 layers, ports 7, 8, 11, 9, 10, 12, and 14, and condition 2 |
| 7 | Reserved | 7 | 8 layers, ports 7 to 14, and condition 1 8 layers, ports 7, 8, 11, 13, 9, 10, 12, and 14, and condition 2 |

TABLE 17

Antenna port, scrambling identity, and indication of quantity of layers
(Antenna port(s), scrambling identity and number of layers indication)

| One codeword (one codeword: codeword 0 enabled, and codeword 1 disabled) | | Two codewords (two codewords: codeword 0 enabled, and codeword 1 enabled) | |
|---|---|---|---|
| Value (value) of indication information | Combination information (message) | Value (value) of indication information | Combination information (message) |
| 0 | 1 layer, port 7, n_SCID = 0 (OCC = 2) | 0 | 2 layers, ports 7 and 8, n_SCID = 0 (OCC = 2) |
| 1 | 1 layer, port 7, n_SCID = 1 (OCC = 2) | 1 | 2 layers, ports 7 and 8, n_SCID = 1 (OCC = 2) |
| 2 | 1 layer, port 8, n_SCID = 0 (OCC = 2) | 2 | 2 layers, ports 7 and 8, n_SCID = 0 (OCC = 4) |
| 3 | 1 layer, port 8, n_SCID = 1 (OCC = 2) | 3 | 2 layers, ports 7 and 8, n_SCID = 1 (OCC = 4) |
| 4 | 1 layer, port 7, n_SCID = 0 (OCC = 4) | 4 | 2 layers, ports 11 and 13, n_SCID = 0 (OCC = 4) |
| 5 | 1 layer, port 7, n_SCID = 1 (OCC = 4) | 5 | 2 layers, ports 11 and 13, n_SCID = 1 (OCC = 4) |
| 6 | 1 layer, port 8, n_SCID = 0 (OCC = 4) | 6 | 3 layers, ports 7 to 9, and condition 1 3 layers, ports 7, 9, and 10, and condition 2 |
| 7 | 1 layer, port 8, n_SCID = 1 (OCC = 4) | 7 | 4 layers, ports 7 to 10 |
| 8 | 1 layer, port 11, n_SCID = 0 (OCC = 4) | 8 | 5 layers, ports 7 to 11, and condition 1 5 layers, ports 7, 8, 9, 10, and 12, and condition 2 |
| 9 | 1 layer, port 11, n_SCID = 1 (OCC = 4) | 9 | 6 layers, ports 7 to 12, and condition 1 6 layers, ports 7, 8, 11, 9, 10, and 12, and condition 2 |
| 10 | 1 layer, port 13, n_SCID = 0 (OCC = 4) | 10 | 7 layers, ports 7 to 13, and condition 1 7 layers, ports 7, 8, 11, 9, 10, 12, and 14, and condition 2 |
| 11 | 1 layer, port 13, n_SCID = 1 (OCC = 4) | 11 | 8 layers, ports 7 to 14, and condition 1 8 layers, ports 7, 8, 11, 13, 9, 10, 12, and 14, and condition 2 |
| 12 | 2 layers, ports 7 and 8 | 12 | Reserved |
| 13 | 3 layers, ports 7 to 9 | 13 | Reserved |
| 14 | 4 layers, ports 7 to 10 | 14 | Reserved |
| 15 | Reserved | 15 | Reserved |

As shown in Table 16, when there are two codewords, the first indication information may be a case in which the value of the indication information is 2, 4, 5, 6, or 7, in other words, corresponds to a case in which the quantity of layers of the downlink data is 3, 5, 6, 7, or 8.

As shown in Table 17, when there are two codewords, the first indication information may be a case in which the value of the indication information is 6, 8, 9, 10, or 11, in other words, corresponds to a case in which the quantity of layers of the downlink data is 3, 5, 6, 7, or 8.

It should be understood that, in this embodiment of this application, when the quantity of layers of the downlink data is 4, according to the grouping manner shown in Table 15, corresponding antenna ports coincide with the corresponding antenna ports when the quantity of layers of the downlink data in Table 13 or Table 14 in existing LTE is 4, and all are ports 7-10. Therefore, in Table 16 and Table 17 in this embodiment of this application, when the quantity of layers of the downlink data is 4, there is only one piece of corresponding combination information, namely, 4 layers, ports 7 to 10. In order to keep unity, in Table 16 and Table 17, when the quantity of layers of the downlink data is 4, to be specific, when the indication information in Table 16 is 3, or the indication information in Table 17 is 7, there may also be two pieces of corresponding combination information, that is, (the first combination information and condition 2; the second combination information and condition 1), provided that content of the two pieces of combination information is the same, and is 4 layers, ports 7 to 10.

As shown in Table 16, when the value of the indication information is 2, 4, 5, 6, or 7, or as shown in Table 17, when the value of the indication information is 6, 8, 9, 10, or 11, one piece of indication information may correspond to two pieces of combination information. When the QCL information satisfies the condition 2, the indication information may correspond to the first combination information, and the first indication information may satisfy a grouping requirement in Table 15, namely, correspond to an NCJT scenario. When the QCL information satisfies the condition 1, the indication information may correspond to the second combination information, and the second combination information may correspond to the combination information in existing Table 13 or Table 14, namely, correspond to a single-station transmission scenario.

Specifically, in this embodiment of this application, definitions of the condition 1 and the condition 2 are as follows. The condition 1 is single-station transmission, and condition 2 is NCJT. Alternatively, the condition 1 is that the QCL type of the DMRS antenna port is a type A or a type B, or DMRS antenna ports satisfy one QCL relationship; and the condition 2 is that the QCL type of the DMRS antenna port is a non-A or a non-B (which may also be referred to as a type C), or DMRS antenna ports satisfy at least two QCL relationships. For example, the at least two QCL relationships are two QCL relationships.

In an implementation, in this embodiment of this application, that the DMRS antenna ports satisfy one QCL relationship (which may also be referred to as a single QCL relationship) indicates that all DMRS antenna ports are QCL-ed (or satisfy the QCL relationship). That the DMRS antenna ports satisfy two QCL relationships indicates that all DMRS antenna ports may be grouped into two DMRS antenna port groups, antenna ports in each DMRS antenna port group are QCL-ed (or satisfy the QCL relationship), and an antenna port in one DMRS antenna port group and an antenna port in the other DMRS antenna port group do not satisfy the QCL relationship. Similarly, it can be deduced that, that the DMRS antenna ports satisfy three or more QCL relationships indicates that all DMRS antenna ports may be grouped into three or more DMRS antenna port groups, antenna ports in each DMRS antenna port group are QCL-ed (or satisfy the QCL relationship), and an antenna port in one DMRS antenna port group and an antenna port in another DMRS antenna port group do not satisfy the QCL relationship.

In other words, as shown in Table 16, when the value of the indication information is 2, 4, 5, 6, or 7, or as shown in Table 17, when the value of the indication information is 6, 8, 9, 10, or 11, one piece of indication information may correspond to two pieces of combination information. When the QCL information indicates that the QCL type of the DMRS antenna port is the type A or the type B, or when the QCL information indicates that the DMRS antenna ports satisfy one QCL relationship, the indication information indicates the total quantity N of layers of the downlink data and the N sequentially numbered DMRS antenna ports corresponding to the sequentially numbered layers (namely, the second combination information). When the QCL information indicates that the QCL type of the DMRS antenna port is the non-type-A QCL type or the non-type-B QCL type, or when the QCL information indicates that the DMRS antenna ports satisfy at least two QCL relationships, the indication information is used to indicate the total quantity N of layers of the downlink data and N non-sequentially numbered DMRS antenna ports corresponding to the sequentially numbered layers (namely, the first combination information).

Optionally, as shown in Table 16, when the value of the indication information is 2, 4, 5, 6, or 7, or as shown in Table 17, when the value of the indication information is 6, 8, 9, 10, or 11, the indication information is used to indicate that the total quantity of layers of the downlink data is 3, and the non-sequentially numbered DMRS antenna ports corresponding to the sequentially numbered layers are the antenna ports 7, 9, and 10 in sequence; or the indication information is used to indicate that the total quantity of layers of the downlink data is 5, and the non-sequentially numbered DMRS antenna ports corresponding to the sequentially numbered layers are the antenna ports 7, 8, 9, 10, and 12 in sequence; or the indication information is used to indicate that the total quantity of layers of the downlink data is 6, and the non-sequentially numbered DMRS antenna ports corresponding to the sequentially numbered layers are the antenna ports 7, 8, 11, 9, 10, and 12 in sequence; or the indication information is used to indicate that the total quantity of layers of the downlink data is 7, and the non-sequentially numbered DMRS antenna ports corresponding to the sequentially numbered layers are the antenna ports 7, 8, 11, 9, 10, 12, and 14 in sequence; or the indication information is used to indicate that the total quantity of layers of the downlink data is 8, and the non-sequentially numbered DMRS antenna ports corresponding to the sequentially numbered layers are the antenna ports 7, 8, 11, 13, 9, 10, 12, and 14 in sequence.

It should be understood that, in this embodiment of this application, the N non-sequentially numbered DMRS antenna ports that are indicated in the indication information and that are corresponding to the sequentially numbered layers include a first group of DMRS antenna ports corresponding to a first codeword and a second group of DMRS antenna ports corresponding to a second codeword.

For the first group of DMRS antenna ports corresponding to the first code word and the second group of DMRS antenna ports corresponding to the second code word, refer to the descriptions in Table 15.

For example, as shown in Table 15, the indication information is used to indicate that the total quantity of layers of the downlink data is 3, the first group of DMRS antenna ports corresponding to the first codeword include an antenna port 7, and the second group of DMRS antenna ports corresponding to the second codeword include antenna ports 9 and 10; or the indication information is used to indicate that the total quantity of layers of the downlink data is 5, the first group of DMRS antenna ports corresponding to the first codeword include antenna ports 7 and 8, and the second group of DMRS antenna ports corresponding to the second codeword include antenna ports 9, 10, and 12; or the indication information is used to indicate that the total quantity of layers of the downlink data is 6, the first group of DMRS antenna ports corresponding to the first codeword include antenna ports 7, 8, and 11, and the second group of DMRS antenna ports corresponding to the second codeword include antenna ports 9, 10, and 12; or the indication information is used to indicate that the total quantity of layers of the downlink data is 7, the first group of DMRS antenna ports corresponding to the first codeword include antenna ports 7, 8, and 11, and the second group of DMRS antenna ports corresponding to the second codeword include antenna ports 9, 10, 12, and 14; or the indication information is used to indicate that the total quantity of layers of the downlink data is 8, the first group of DMRS antenna ports corresponding to the first codeword include antenna ports 7, 8, 11, and 13, and the second group of DMRS antenna ports corresponding to the second codeword include antenna ports 9, 10, 12, and 14.

Optionally, in another embodiment, when the QCL information generated by the network device indicates that the QCL type of the DMRS antenna ports is the type A or the type B, or when the QCL information indicates that the DMRS antenna ports satisfy one QCL relationship, the QCL information satisfies the condition 1, and the first indication information indicates the total quantity N of layers of the downlink data and the N sequentially numbered DMRS antenna ports corresponding to the sequentially numbered layers (the second combination information); or when the QCL information indicates that the QCL type of the DMRS antenna ports is the non-type-A QCL type or the non-type-B QCL type, or when the QCL information indicates that the DMRS antenna ports satisfy at least two QCL relationships, the QCL information satisfies the condition 1, and the first indication information corresponds to the first combination information, where the QCL relationship between the DMRS antenna ports corresponding to the non-type A or the non-type B is different from the QCL relationship between the DMRS antenna ports corresponding to the type A or the type B.

In this embodiment of this application, a type of the non-type A or the non-type B may also be referred to as a type C.

Two QCL types, namely, the type A (Type-A) and the type B (Type-B), are defined in an existing LTE protocol. The type A defines a QCL configuration of one TP. To be specific, antenna ports (including a CRS, a DMRS, and a CSI-RS) of the TP are QCL-ed. The type B defines a QCL configuration of antenna ports of a plurality of TPs, and the QCL configuration of the antenna ports of the plurality of TPs may be indicated by using a PDSCH resource mapping and quasi co-location indicator (PDSCH RE mapping and quasi-co-location indicator, PQI) (2 bits) in DCI. The PQI is specifically used to indicate a quasi co-location relationship of one or more of a channel state information-reference signal (channel state information-reference signal, CSI-RS), a DMRS, a phase tracking reference signal (phase tracking reference signal, PTRS) (which may also be referred to as a phase compensation reference signal (phase compensation reference signal, PCRS) or a phase noise reference signal (phase noise reference signal for short)), and a synchronization signal block (SS block) (including one or more of a synchronization signal and a broadcast channel, where the synchronization signal includes a primary synchronization signal PSS and/or a secondary synchronization signal SSS) that are QCL-ed. In this embodiment of this application, the type-A may correspond to a case of a same antenna panel of a same network device in NR, and the type-B may correspond to a case of different antenna panels of a same network device in NR or a case of different network devices in NR.

In the type A and the type B, all DMRS antenna ports satisfy the QCL relationship. The type A and the type B may correspond to single-station transmissions or DPS transmission and/or DPB transmission. For example, for the type A or B, the antenna ports 7 to 14 all satisfy the QCL relationship.

That the QCL indication information indicates that the QCL type of the DMRS antenna ports is the type C corresponds to NCJT. A QCL relationship of the DMRS antenna ports corresponding to the type C is different from a QCL relationship of the DMRS antenna ports corresponding to the type A or the type B. For example, for the type C, the antenna ports 7, 8, 11, and 13 satisfy a QCL relationship, and the antenna ports 9, 10, 12, and 14 satisfy a QCL relationship. However, any one of the antenna ports 7, 8, 11, and 13 and any one of the antenna ports 9, 10, 12, and 14 do not satisfy the QCL relationship. It should be noted that, for the type C, when rank (rank)=2, that is, when layer (layer)=2, the antenna port 7 belongs to one group, the antenna port 8 belongs to another group, and the antenna port 7 and the antenna port 8 do not satisfy a QCL relationship. All DMRS antenna ports in single-station transmission are QCL-ed. In other words, the DMRS antenna ports satisfy a single QCL relationship. Therefore, that the QCL information indicates that the DMRS antenna ports satisfy the single QCL relationship corresponds to the single-station transmission or DPS/DPB transmission.

DMRS antenna ports of two network devices for NCJT satisfy different QCL relationships. In other words, DMRS antenna ports of downlink data satisfy at least two QCL relationships. Therefore, that the QCL information indicates that the DMRS antenna ports satisfy a plurality of QCL relationships, corresponds to the NCJT In a design, the QCL indication information may be a PQI. For example, that a value of the PQI is a "00" or "01" state corresponds to a single-cell transmission scenario or a DPS/DPB transmission scenario, and corresponding DMRS antenna ports satisfy one QCL relationship. That the value of the PQI is a "10" and "11" state corresponds to an NCJT scenario, and corresponding DMRS antenna ports satisfy two QCL relationships.

As shown in Table 16, the case in which the value of the indication information is 2, 4, 5, 6, or 7 corresponds to the case in which the quantity of layers of the downlink data is 3, 5, 6, 7, or 8. In addition, as shown in Table 17, the case in which the value of the indication information is 6, 8, 9, 10, or 11 corresponds to the case in which the quantity of layers of the downlink data is 3, 5, 6, 7, or 8. In the foregoing case, the indication information corresponds to two pieces of combination information and conditions corresponding to the two pieces of combination information, namely, "second combination information and condition 1; first combination information and condition 2". It should be understood that, in an actual application, in the foregoing case, content corresponding to the indication information may include two pieces of combination information and one condition. For example, the content corresponding to the indication information is changed to the following form: "second combination information and condition 1; first combination information" or "second combination information; first combination information and condition 2". In this case, when this condition is satisfied, the indication information corresponds to combination information corresponding to this condition, and when this condition is not satisfied, the indication information corresponds to the other piece of combination information.

Alternatively, in another embodiment, the first indication information in the correspondence between the indication information and the combination information in this embodiment of this application corresponds to the first combination information and the second combination information. For example, as shown in Table 18 and Table 19, Table 18 is a design obtained after transformation is performed based on Table 13. Table 19 is a design obtained after transformation is performed based on Table 14.

TABLE 18

Antenna port, scrambling identity, and indication of quantity of layers (Antenna port(s), scrambling identity and number of layers indication)

| One codeword (one codeword: codeword 0 enabled, and codeword 1 disabled) | | Two codewords (two codewords: codeword 0 enabled, and codeword 1 enabled) | | |
| --- | --- | --- | --- | --- |
| Value (value) of indication information | Combination information (message) | Value (value) of indication information | Combination information (message) Condition 1 | Combination information (message) Condition 2 |
| 0 | 1 layer, port 7, n_SCID = 0 | 0 | 2 layers, ports 7 and 8, n_SCID = 0 | 2 layers, ports 7 and 8, n_SCID = 0 |
| 1 | 1 layer, port 7, n_SCID = 1 | 1 | 2 layers, ports 7 and 8, n_SCID = 1 | 2 layers, ports 7 and 8, n_SCID = 1 |

TABLE 18-continued

Antenna port, scrambling identity, and indication of quantity of layers
(Antenna port(s), scrambling identity and number of layers indication)

| One codeword (one codeword: codeword 0 enabled, and codeword 1 disabled) | | Two codewords (two codewords: codeword 0 enabled, and codeword 1 enabled) | | |
|---|---|---|---|---|
| Value (value) of indication information | Combination information (message) | Value (value) of indication information | Combination information (message) Condition 1 | Combination information (message) Condition 2 |
| 2 | 1 layer, port 8, n_SCID = 0 | 2 | 3 layers, ports 7 to 9 | 3 layers, ports 7, 9, and 10 |
| 3 | 1 layer, port 8, n_SCID = 1 | 3 | 4 layers, ports 7 to 10 | 4 layers, ports 7 to 10 |
| 4 | 2 layers, ports 7 and 8 | 4 | 5 layers, ports 7 to 11 | 5 layers, ports 7, 8, 9, 10, and 12 |
| 5 | 3 layers, ports 7 to 9 | 5 | 6 layers, ports 7 to 12 | 6 layers, ports 7, 8, 11, 9, 10, and 12 |
| 6 | 4 layers, ports 7 to 10 | 6 | 7 layers, ports 7 to 13 | 7 layers, ports 7, 8, 11, 9, 10, 12, and 14 |
| 7 | Reserved | 7 | 8 layers, ports 7 to 14 | 8 layers, ports 7, 8, 11, 13, 9, 10, 12, and 14 |

TABLE 19

Antenna port, scrambling identity, and indication of quantity of layers
(Antenna port(s), scrambling identity and number of layers indication)

| One codeword (one codeword: codeword 0 enabled, and codeword 1 disabled) | | Two codewords (two codewords: codeword 0 enabled, and codeword 1 enabled) | | |
|---|---|---|---|---|
| Value (value) of indication information | Combination information (message) | Value (value) of indication information | Combination information (message) Condition 1 | Combination information (message) Condition 2 |
| 0 | 1 layer, port 7, n_SCID = 0 (OCC = 2) | 0 | 2 layers, ports 7 and 8, n_SCID = 0 (OCC = 2) | 2 layers, ports 7 and 8, n_SCID = 0 (OCC = 2) |
| 1 | 1 layer, port 7, n_SCID = 1 (OCC = 2) | 1 | 2 layers, ports 7 and 8, n_SCID = 1 (OCC = 2) | 2 layers, ports 7 and 8, n_SCID = 1 (OCC = 2) |
| 2 | 1 layer, port 8, n_SCID = 0 (OCC = 2) | 2 | 2 layers, ports 7 and 8, n_SCID = 0 (OCC = 4) | 2 layers, ports 7 and 8, n_SCID = 0 (OCC = 4) |
| 3 | 1 layer, port 8, n_SCID = 1 (OCC = 2) | 3 | 2 layers, ports 7 and 8, n_SCID = 1 (OCC = 4) | 2 layers, ports 7 and 8, n_SCID = 1 (OCC = 4) |
| 4 | 1 layer, port 7, n_SCID = 0 (OCC = 4) | 4 | 2 layers, ports 11 and 13, n_SCID = 0 (OCC = 4) | 2 layers, ports 11 and 13, n_SCID = 0 (OCC = 4) |
| 5 | 1 layer, port 7, n_SCID = 1 (OCC = 4) | 5 | 2 layers, ports 11 and 13, n_SCID = 1 (OCC = 4) | 2 layers, ports 11 and 13, n_SCID = 1 (OCC = 4) |
| 6 | 1 layer, port 8, n_SCID = 0 (OCC = 4) | 6 | 3 layers, ports 7 to 9 | 3 layers, ports 7, 9, and 10 |
| 7 | 1 layer, port 8, n_SCID = 1 (OCC = 4) | 7 | 4 layers, ports 7 to 10 | 4 layers, ports 7 to 10 |
| 8 | 1 layer, port 11, n_SCID = 0 (OCC = 4) | 8 | 5 layers, ports 7 to 11 | 5 layers, ports 7, 8, 9, 10, and 12 |
| 9 | 1 layer, port 11, n_SCID = 1 (OCC = 4) | 9 | 6 layers, ports 7 to 12 | 6 layers, ports 7, 8, 11, 9, 10, and 12 |
| 10 | 1 layer, port 13, n_SCID = 0 (OCC = 4) | 10 | 7 layers, ports 7 to 13 | 7 layers, ports 7, 8, 11, 9, 10, 12, and 14 |
| 11 | 1 layer, port 13, n_SCID = 1 (OCC = 4) | 11 | 8 layers, ports 7 to 14 | 8 layers, ports 7, 8, 11, 13, 9, 10, 12, and 14 |
| 12 | 2 layers, ports 7 and 8 | 12 | Reserved | Reserved |
| 13 | 3 layers, ports 7 to 9 | 13 | Reserved | Reserved |
| 14 | 4 layers, ports 7 to 10 | 14 | Reserved | Reserved |
| 15 | Reserved | 15 | Reserved | Reserved |

As shown in Table 18 and Table 19, when there are two codewords, each piece of indication information corresponds to two pieces of combination information (the second combination information and the first combination information). When the condition 1 is satisfied, the indication information corresponds to the first column of combination information, and content of the first column of combination information is the same as that of Table 13 and Table 14. When the condition 2 is satisfied, the indication information corresponds to the second column of combination information. In addition, in Table 18, when the value of the indication information is 2, 4, 5, 6, or 7, in other words, when the corresponding quantity of layers of the downlink data is 3, 5, 6, 7, or 8, two pieces of combination information (the second combination information in the first column and the first combination information in the second column) corresponding to each piece of indication information are different.

In Table 19, when the value of the indication information is 6, 8, 9, 10, or 11, in other words, when the corresponding quantity of layers of the downlink data is 3, 5, 6, 7, or 8, two pieces of combination information (the second combination information in the first column and the first combination information in the second column) corresponding to each piece of indication information are different.

In this embodiment of this application, when the value of the indication information is 2, 4, 5, 6, or 7 in Table 18, or the value of the indication information is 6, 8, 9, 10, or 11 in Table 19, for a method of determining that the indication information corresponds to the first combination information or the second combination information, refer to the descriptions of related parts in Table 16 and Table 17 above. Details are not described herein again.

In a design, a correspondence between the indication information and the first combination information/second combination information may be represented by using a plurality of tables. For example, Table 15 and/or Table 16 each are/is divided into two or more lists.

For example, Table 15 may be divided into two tables: Table 13 and Table 20. In Table 20 and Table 13, when the value of the indication information is 2, 4, 5, 6, or 7, combination information is different.

Table 16 may be divided into two tables: Table 14 and Table 21. In Table 21 and Table 14, when the value of the indication information is 6, 8, 9, 10, or 11, combination information is different.

TABLE 20

Antenna port, scrambling identity, and indication of quantity of layers
(Antenna port(s), scrambling identity and number of layers indication)

| One codeword (one codeword: codeword 0 enabled, and codeword 1 disabled) | | Two codewords (two codewords: codeword 0 enabled, and codeword 1 enabled) | |
|---|---|---|---|
| Value (value) of indication information | Combination information (message) | Value (value) of indication information | Combination information (message) |
| 0 | 1 layer, port 7, n_SCID = 0 | 0 | 2 layers, ports 7 and 8, n_SCID = 0 |
| 1 | 1 layer, port 7, n_SCID = 1 | 1 | 2 layers, ports 7 and 8, n_SCID = 1 |
| 2 | 1 layer, port 8, n_SCID = 0 | 2 | 3 layers, ports 7, 9, and 10 |
| 3 | 1 layer, port 8, n_SCID = 1 | 3 | 4 layers, ports 7 to 10 |
| 4 | 2 layers, ports 7 and 8 | 4 | 5 layers, ports 7, 8, 9, 10, and 12 |
| 5 | 3 layers, ports 7 to 9 | 5 | 6 layers, ports 7, 8, 11, 9, 10, and 12 |
| 6 | 4 layers, ports 7 to 10 | 6 | 7 layers, ports 7, 8, 11, 9, 10, 12, and 14 |
| 7 | Reserved | 7 | 8 layers, ports 7, 8, 11, 13, 9, 10, 12, and 14 |

TABLE 21

Antenna port, scrambling identity, and indication of quantity of layers
(Antenna port(s), scrambling identity and number of layers indication)

| One codeword (one codeword: codeword 0 enabled, and codeword 1 disabled) | | Two codewords (two codewords: codeword 0 enabled, and codeword 1 enabled) | |
|---|---|---|---|
| Value (value) of indication information | Combination information (message) | Value (value) of indication information | Combination information (message) |
| 0 | 1 layer, port 7, n_SCID = 0 (OCC = 2) | 0 | 2 layers, ports 7 and 8, n_SCID = 0 (OCC = 2) |
| 1 | 1 layer, port 7, n_SCID = 1 (OCC = 2) | 1 | 2 layers, ports 7 and 8, n_SCID = 1 (OCC = 2) |
| 2 | 1 layer, port 8, n_SCID = 0 (OCC = 2) | 2 | 2 layers, ports 7 and 8, n_SCID = 0 (OCC = 4) |
| 3 | 1 layer, port 8, n_SCID = 1 (OCC = 2) | 3 | 2 layers, ports 7 and 8, n_SCID = 1 (OCC = 4) |
| 4 | 1 layer, port 7, n_SCID = 0 (OCC = 4) | 4 | 2 layers, ports 11 and 13, n_SCID = 0 (OCC = 4) |
| 5 | 1 layer, port 7, n_SCID = 1 (OCC = 4) | 5 | 2 layers, ports 11 and 13, n_SCID = 1 (OCC = 4) |
| 6 | 1 layer, port 8, n_SCID = 0 (OCC = 4) | 6 | 3 layers, ports 7, 9, and 10 |
| 7 | 1 layer, port 8, n_SCID = 1 (OCC = 4) | 7 | 4 layers, ports 7 to 10 |
| 8 | 1 layer, port 11, n_SCID = 0 (OCC = 4) | 8 | 5 layers, ports 7, 8, 9, 10, and 12 |
| 9 | 1 layer, port 11, n_SCID = 1 (OCC = 4) | 9 | 6 layers, ports 7, 8, 11, 9, 10, and 12 |
| 10 | 1 layer, port 13, n_SCID = 0 (OCC = 4) | 10 | 7 layers, ports 7, 8, 11, 9, 10, 12, and 14 |
| 11 | 1 layer, port 13, n_SCID = 1 (OCC = 4) | 11 | 8 layers, ports 7, 8, 11, 13, 9, 10, 12, and 14 |
| 12 | 2 layers, ports 7 and 8 | 12 | Reserved |
| 13 | 3 layers, ports 7 to 9 | 13 | Reserved |
| 14 | 4 layers, ports 7 to 10 | 14 | Reserved |
| 15 | Reserved | 15 | Reserved |

Specifically, in an actual application, the network device uses one of the foregoing tables to indicate the DMRS antenna port. For example, when the condition 1 is satisfied, the network device may use Table 13 or 14 to indicate the DMRS antenna port. When the condition 2 is satisfied, the network device may use Table 20 or 21 to indicate the DMRS antenna port. To avoid repetition, details are not described herein again.

It should be noted that, the examples of the foregoing embodiment are merely intended to help a person skilled in the art to understand this embodiment of this application, rather than limiting this embodiment of this application to the specific values or scenarios shown in the examples. Apparently, a person skilled in the art can make various equivalent modifications or changes based on the examples provided above. For example, in the embodiments of this application, various variations, divisions, or combinations may be performed on the foregoing Table 13 to Table 21, and such modifications or changes also fall within the scope of the embodiments of this application.

For example, in Table 14, when there are two codewords, the indication information includes four reserved bits, in other words, the values of the indication information are 12 to 15. In this embodiment of this application, Table 14 may be transformed. In an NCJT scenario, the quantity of layers of the downlink data is 3, 5, 6, 7, and 8, and combination information in four of the five cases respectively correspond to cases in which the values of the indication information are 12 to 15. In addition, for the other case in the five cases, a form of Table 17 is reserved. For example, as shown in Table 22, when the values of the indication information are 6, 8, 9, and 10, corresponding combination information in Table 22 is the same as that in Table 14. Cases in which the values of the indication information are 12 to 15 correspond to the cases in which the quantity of layers of the downlink data is 3, 5, 6, and 7 layers in the NCJT scenario. When the value of the indication information is 11, corresponding combination information in Table 22 corresponds to that in Table 17 when the value of the indication information is 11.

TABLE 22

Antenna port, scrambling identity, and indication of quantity of layers (Antenna port(s), scrambling identity and number of layers indication)

| Value (value) of indication information | Combination information (message) | Value (value) of indication information | Combination information (message) |
|---|---|---|---|
| \multicolumn{2}{c}{One codeword (one codeword: codeword 0 enabled, and codeword 1 disabled)} | \multicolumn{2}{c}{Two codewords (two codewords: codeword 0 enabled, and codeword 1 enabled)} |
| 0 | 1 layer, port 7, n_SCID = 0 (OCC = 2) | 0 | 2 layers, ports 7 and 8, n_SCID = 0 (OCC = 2) |
| 1 | 1 layer, port 7, n_SCID = 1 (OCC = 2) | 1 | 2 layers, ports 7 and 8, n_SCID = 1 (OCC = 2) |
| 2 | 1 layer, port 8, n_SCID = 0 (OCC = 2) | 2 | 2 layers, ports 7 and 8, n_SCID = 0 (OCC = 4) |
| 3 | 1 layer, port 8, n_SCID = 1 (OCC = 2) | 3 | 2 layers, ports 7 and 8, n_SCID = 1 (OCC = 4) |
| 4 | 1 layer, port 7, n_SCID = 0 (OCC = 4) | 4 | 2 layers, ports 11 and 13, n_SCID = 0 (OCC = 4) |
| 5 | 1 layer, port 7, n_SCID = 1 (OCC = 4) | 5 | 2 layers, ports 11 and 13, n_SCID = 1 (OCC = 4) |
| 6 | 1 layer, port 8, n_SCID = 0 (OCC = 4) | 6 | 3 layers, ports 7 to 9 |
| 7 | 1 layer, port 8, n_SCID = 1 (OCC = 4) | 7 | 4 layers, ports 7 to 10 |
| 8 | 1 layer, port 11, n_SCID = 0 (OCC = 4) | 8 | 5 layers, ports 7 to 11 |
| 9 | 1 layer, port 11, n_SCID = 1 (OCC = 4) | 9 | 6 layers, ports 7 to 12 |
| 10 | 1 layer, port 13, n_SCID = 0 (OCC = 4) | 10 | 7 layers, ports 7 to 13 |
| 11 | 1 layer, port 13, n_SCID = 1 (OCC = 4) | 11 | 8 layers, ports 7 to 14, and condition 1 8 layers, ports 7, 8, 11, 13, 9, 10, 12, and 14, and condition 2 |
| 12 | 2 layers, ports 7 and 8 | 12 | 3 layers, ports 7, 9, and 10 |
| 13 | 3 layers, ports 7 to 9 | 13 | 5 layers, ports 7, 8, 9, 10, and 12 |
| 14 | 4 layers, ports 7 to 10 | 14 | 6 layers, ports 7, 8, 11, 9, 10, and 12 |
| 15 | Reserved | 15 | 7 layers, ports 7, 8, 11, 9, 10, 12, and 14 |

420. The network device sends the indication information and the QCL information to a terminal device.

The QCL information includes a QCL type of the DMRS antenna port and/or a quantity of QCL relationships that the DMRS antenna ports satisfy.

In a design, the network device sends the indication information and the QCL information by using downlink control information DCI, for example, in a DCI format 2D or another DCI format.

In another design, the network device sends the QCL information by using higher layer signaling such as RRC signaling. The network device sends the first indication information by using downlink control information DCI.

Correspondingly, the terminal device receives the first indication information and the QCL information from the network device.

430. The terminal device determines a DMRS antenna port.

The terminal device determines, based on the QCL information and the indication information, whether the indication information is used to indicate the total quantity N of layers of the downlink data and the N non-sequentially numbered DMRS antenna ports corresponding to the sequentially numbered layers or is used to indicate the total quantity N of layers of the downlink data and the N sequentially numbered DMRS antenna ports corresponding to the sequentially numbered layers includes, and determines, based on the determined indication information, a DMRS antenna port occupied by the downlink data.

Specifically, for a process of determining the DMRS antenna port by the terminal device, refer to the foregoing descriptions of the indication information and the combination information. To avoid repetition, details are not described herein again.

Table 17 is used as an example, the QCL information indicates that the DMRS antenna ports satisfy a plurality of QCL relationships, and the value of the indication information is 6. In this case, the terminal device may determine, based on the QCL information, that the condition 2 is satisfied. Therefore, the terminal device determines, based on the QCL information and the indication information, that the combination information is 5 layers, ports 7, 8, 9, 10, and 12. Therefore, the terminal device determines the DMRS antenna ports 7, 8, 9, 10, and 12 occupied by the downlink data. In addition, the terminal device may determine, based on a grouping status, that the antenna ports 7 and 8 satisfy a first QCL relationship, and the antenna ports 9, 10 and 12 satisfy a second QCL relationship, so that the terminal device may accurately demodulate data based on the DMRSs transmitted through the antenna ports 7, 8, 9, 10, and 12, thereby improving network performance.

In this embodiment of this application, an existing antenna port indication method is improved when antenna ports are grouped, so that a DMRS antenna port is indicated when DMRS antenna ports are grouped.

It should be noted that the example in the foregoing embodiment describes only the method for indicating a DMRS port during downlink transmission, but this embodiment of this application is not limited thereto. A person skilled in the art may definitely make various equivalent modifications or changes based on the example provided above. For example, a person skilled in the art understands that, in the embodiments of this application, a method for indicating a DMRS port during uplink transmission may be similarly obtained based on the descriptions of the foregoing embodiment of this application. For example, for the method for indicating a DMRS port during uplink transmission, a network device may configure grouping of DMRS ports of a terminal device by using signaling, or after accessing a network, a terminal device reports grouping of DMRS ports of the terminal device by using RRC signaling. The network device side uses, based on grouping information of the DMRS ports of the terminal device and by using DCI (which may alternatively be UL grant, for example, formats 0, 1, and 1A in LTE, or a corresponding format in NR) for scheduling uplink data, the method in this application to indicate a DMRS port used for uplink transmission. Such modifications and changes also fall within the scope of the embodiments of this application.

The foregoing describes, with reference to FIG. 1 to FIG. 4, the information transmission interaction solutions in the embodiments of this application. The following further describes, with reference to FIG. 5 to FIG. 7, communications apparatuses provided in the embodiments of this application.

Figure 5:
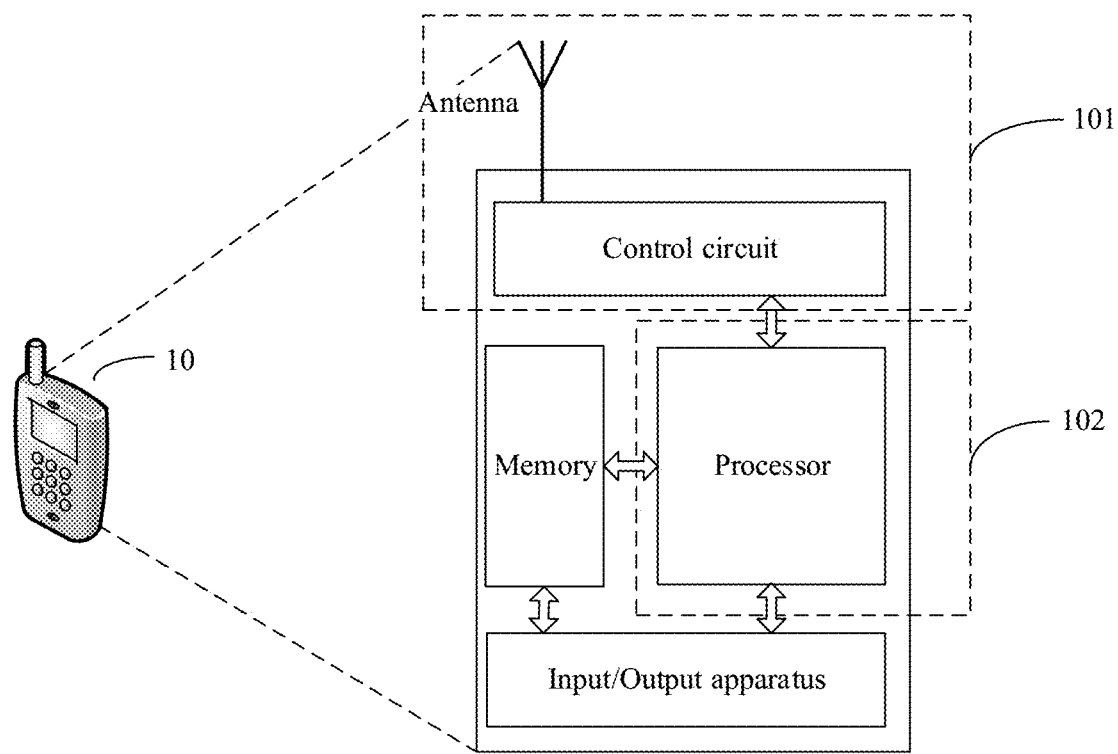
FIG. 5 is a schematic block diagram of a terminal device according to an embodiment of this application.

FIG. 5 is a schematic structural diagram of a terminal device according to an embodiment of this application. The terminal device may be applicable to the system shown in FIG. 1 or FIG. 2. For ease of description, FIG. 5 shows only main means of the terminal device. As shown in FIG. 5, the terminal device 10 includes a processor, a memory, a control circuit, an antenna, and an input/output apparatus. The processor is mainly configured to: process a communication protocol and communication data, control the entire terminal device, execute a software program, and process data of the software program, for example, is configured to support the terminal device in performing an action described in the foregoing method embodiments, for example, determining information about a DMRS antenna port based on received downlink control information DCI, and demodulating a signal. The memory is mainly configured to store software program and data, for example, store the correspondence between the indication information and the combination information that is described in the foregoing embodiments. The control circuit is mainly configured to perform conversion between a baseband signal and a radio frequency signal and process the radio frequency signal. The control circuit, together with an antenna, may also be referred to as a transceiver that is mainly configured to send and receive a radio frequency signal in an electromagnetic wave form. The input/output apparatus, such as a touchscreen, a display, or a keyboard, is mainly configured to receive data input by a user and output data to the user.

After the terminal device is powered on, the processor may read a software program in a storage unit, explain and execute an instruction of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 5 shows only one memory and one processor. Actually, the terminal device may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data, and the central processing unit is mainly configured to: control the entire terminal device, execute the software program, and process the data of the software program. The processor in FIG. 5 may integrate functions of the baseband processor and the central processing unit. A person skilled in the art may understand that, alternatively, the baseband processor and the central processing unit may be independent processors, and interconnected by using a technology such as a bus. A person skilled in the art may understand that the terminal device may include a plurality of baseband processors to adapt to different network standards, the terminal device may include a plurality of central processing units to improve a processing capability of the terminal device, and means of the terminal device may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

In this embodiment of the present invention, the antenna and the control circuit that have the transmission/reception function may be considered as a transceiver unit 101 of the terminal device 10, for example, configured to support the terminal device in performing the reception function shown in FIG. 3 and FIG. 4. A processor having a processing function is considered as a processing unit 102 of the terminal device 10. As shown in FIG. 5, the terminal device 10 includes the transceiver unit 101 and the processing unit 102. The transceiver unit may also be referred to as a transceiver, a transceiver machine, a transceiver apparatus, or the like. Optionally, a device configured to implement the reception function in the transceiver unit 101 may be considered as a receiving unit, and a device configured to implement the transmission function in the transceiver unit 101 may be considered as a sending unit. In other words, the transceiver unit 101 includes the receiving unit and the sending unit. The receiving unit may also be referred to as a receiver, an input port, a receiver circuit, or the like. The sending unit may be referred to as a transmitter, a transmitter machine, a transmitter circuit, or the like.

The processor 102 may be configured to execute an instruction stored in the memory, to control the transceiver unit 101 to receive a signal and/or send a signal, to complete a function of the terminal device in the foregoing method embodiments. In an implementation, it may be considered that the function of the transceiver unit 101 is implemented by using a transceiver circuit or a transceiver-dedicated chip.

Figure 6:
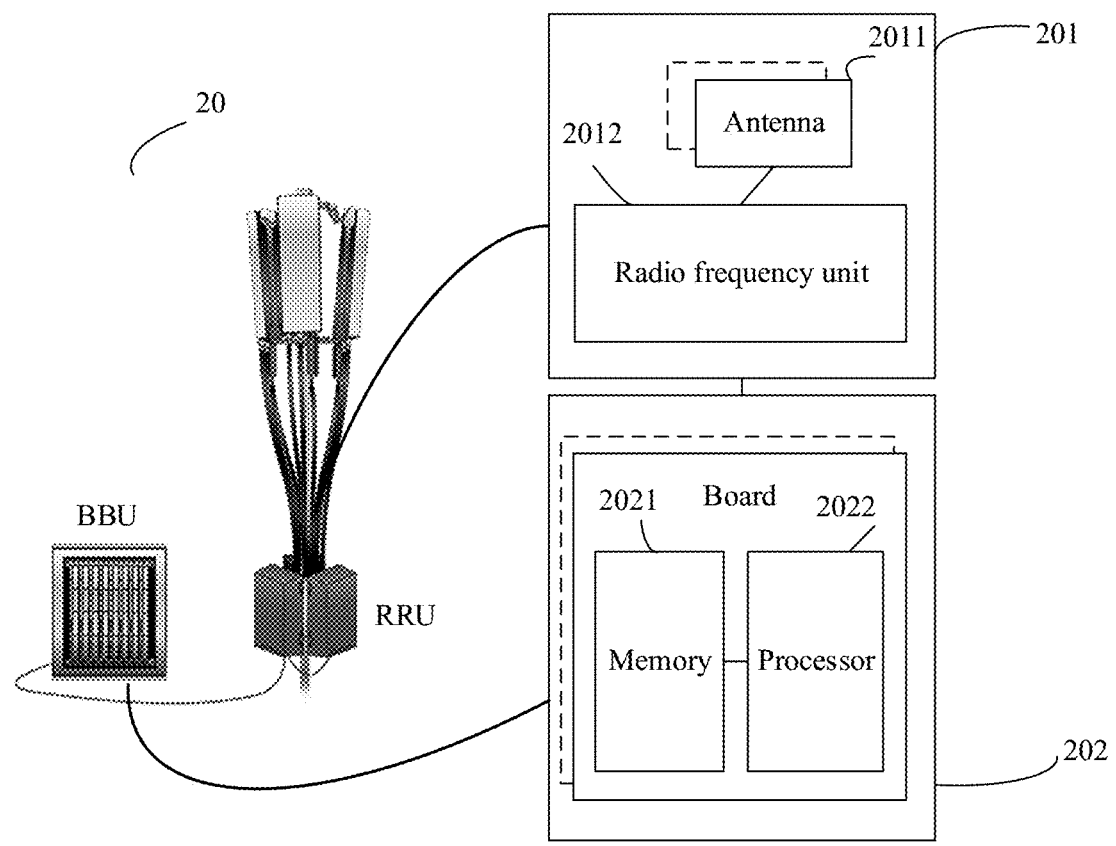
FIG. 6 is a schematic block diagram of a network device according to an embodiment of this application.

FIG. 6 is a schematic structural diagram of a network device according to an embodiment of this application, for example, may be a schematic structural diagram of a base station. As shown in FIG. 6, the base station may be applied to the system shown in FIG. 1 or FIG. 2, to perform a function of the network device in the foregoing method embodiments. The base station 20 includes one or more radio frequency units such as remote radio units (remote radio unit, RRU) 201 and one or more baseband units (baseband unit, BBU) (which may also be referred to as digital units (digital unit, DU)) 202. The RRU 201 may be referred to as a transceiver unit, a transceiver, a transceiver circuit, a transceiver machine, or the like, and may include at least one antenna 2011 and radio frequency unit 2012. The RRU 201 is mainly configured to: send and receive a radio frequency signal and perform conversion between a radio frequency signal and a baseband signal, for example, configured to send the signaling message in the foregoing embodiments to a terminal device. The BBU 202 is mainly configured to perform baseband processing, control the base station, and the like. The RRU 201 and the BBU 202 may be physically disposed together, or may be physically separated, namely, a distributed base station.

The BBU 202 is a control center of the base station, or may be referred to as a processing unit, and is mainly configured to complete baseband processing functions such as channel coding, multiplexing, modulation, and spectrum spreading. For example, the BBU (the processing unit) may be configured to control the base station to perform an operation procedure of the network device in the foregoing method embodiments.

In an example, the BBU 202 may include one or more boards, and a plurality of boards may jointly support a radio access network (such as an LTE network) having single access standard, or may separately support radio access networks (for example, an LTE network, a 5G network, or another network) having different access standards. The BBU 202 further includes a memory 2021 and a processor 2022. The memory 2021 is configured to store a necessary instruction and data. For example, the memory 2021 stores a correspondence between the indication information and the combination information in the foregoing embodiments. The processor 2022 is configured to control the base station to perform a necessary action, for example, is configured to control the base station to perform an operation procedure related to the network device in the foregoing method embodiments. The memory 2021 and the processor 2022 may serve the one or more boards. In other words, a memory and a processor may be independently disposed on each board. Alternatively, the plurality of boards may share a same memory and a same processor. In addition, each board may further be provided with a necessary circuit.

Figure 7:
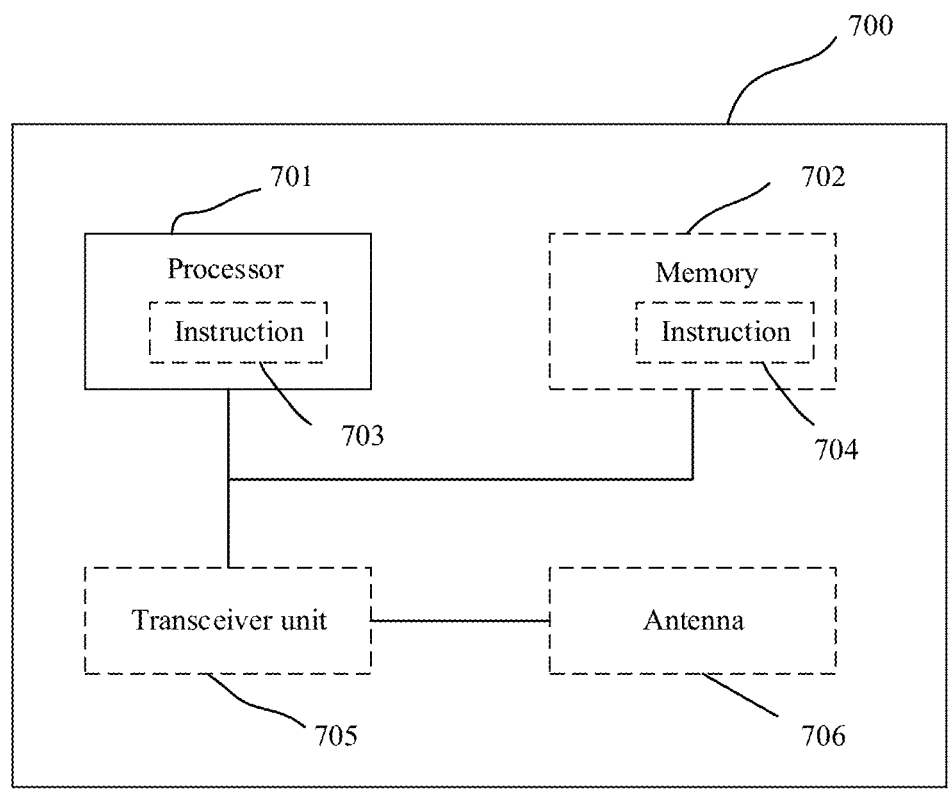
FIG. 7 is a schematic block diagram of a communications apparatus according to an embodiment of this application.

FIG. 7 is a schematic structural diagram of a communications apparatus 700. The apparatus 700 may be configured to implement a method described in the foregoing method embodiments. Refer to the descriptions in the foregoing method embodiments. The communications apparatus 700 may be a chip, a network device (such as a base station), a terminal device, another network device, or the like.

The communications apparatus 700 includes one or more processors 701. The processor 701 may be a general-purpose processor, a special-purpose processor, or the like, for example, may be a baseband processor or a central processing unit. The baseband processor may be configured to process a communication protocol and communication data, and the central processing unit may be configured to: control the communications apparatus (such as the base station, the terminal device, or the chip), execute a software program, and process data of the software program. The communications apparatus may include a transceiver unit, configured to input (receive) and output (send) a signal. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 700 includes one or more processors 701, and the one or more processors 701 may implement the methods performed by the network device or the terminal device in the embodiments shown in FIG. 3 and FIG. 4.

In a possible design, the communications apparatus 700 includes a means (means) that is configured to generate downlink control information DCI, and a means (means) that is configured to send the DCI. Functions of the means for generating the DCI and the means for sending the DCI may be implemented by using the one or more processors. For example, the DCI may be generated by using the one or more processors, and the DCI may be sent by using a transceiver, or an input/output circuit, or an interface of a chip. For the DCI, refer to related descriptions in the foregoing method embodiments.

In a possible design, the communications apparatus 700 includes a means (means) that is configured to generate indication information and QCL information, and a means (means) that is configured to send the indication information and the QCL information. For the indication information and the QCL information, refer to related descriptions in the foregoing method embodiments. For example, the indication information and the QCL information may be generated by using the one or more processors, and the indication information and the QCL information may be sent by using a transceiver, or an input/output circuit, or an interface of a chip. With reference to the descriptions in the foregoing method embodiments, the indication information and the QCL information may be sent by using the DCI, or the QCL information may be sent by using higher layer signaling such as RRC signaling, and the indication information may be sent by using the DCI.

In a possible design, the communications apparatus 700 includes a means (means) that is configured to receive the downlink control information DCI, and a means (means) that is configured to determine a DMRS antenna port. For the DCI and how to determine the DMRS antenna port, refer to related descriptions in the foregoing method embodiments. For example, the DCI may be received by using a transceiver, an input/output circuit, or an interface of a chip, and the DMRS antenna port is determined based on the DCI by using the one or more processors, to demodulate a received signal.

In a possible design, the communications apparatus 700 includes a means (means) that is configured to receive the indication information and the QCL information, and a means (means) that is configured to determine the DMRS antenna port. For the indication information and the QCL information, and how to determine the DMRS antenna port based on the indication information and the QCL information, refer to related descriptions in the foregoing method embodiments. For example, the indication information and the QCL information may be received by using a transceiver, an input/output circuit, or an interface of a chip, and the DMRS antenna port is determined based on the indication information and the QCL information by using the one or more processors, to demodulate a received signal.

Optionally, in addition to the methods in the embodiments shown in FIG. 3 and FIG. 4, the processor 701 may further implement another function.

Optionally, in a design, the processor 701 may further include an instruction 703. The instruction may be run on the processor, so that the communications apparatus 700 is enabled to perform a method described in the foregoing method embodiments.

In still another possible design, the communications apparatus 700 may further include a circuit, and the circuit may implement a function in the foregoing method embodiments.

In still another possible design, the communications apparatus 700 may include one or more memories 702. The memory stores an instruction 704, and the instruction may be run on the processor, so that the communications apparatus 700 is enabled to perform a method described in the foregoing embodiments. Optionally, the memory may also store data. Optionally, the processor may also store an instruction and/or data. For example, the one or more memories 702 may store a correspondence between indication information and combination information described in the foregoing embodiments, or a parameter related to the combination information, or a related parameter or table in the foregoing embodiments. The processor and the memory may be disposed separately, or may be integrated together.

In still another possible design, the communications apparatus 700 may further include a transceiver unit 705 and an antenna 706. The processor 701 may be referred to as a processing unit, and controls the communications apparatus (the terminal or the base station). The transceiver unit 705 may be referred to as a transceiver, a transceiver circuit, a transceiver machine, or the like, and is configured to implement a transmission/reception function of the communications apparatus by using the antenna 706.

An embodiment of this application further provides a communications system, including the foregoing network device and one or more terminal devices.

It should be understood that in the embodiment of this application, the processor may be a central processing unit (Central Processing Unit, "CPU" for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logic circuit in the processor, or by using instructions in a form of software. The steps of the methods disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor. To avoid repetition, details are not described herein again.

It should be further understood that the numbers such as first, second, third, and fourth included in this specification are merely for distinguishing purposes for ease of description, and are not intended to limit the scope of the embodiments of the present invention.

The term "and/or" in this specification describes only an association relationship for describing associated objects and represents that three relationships may exist. For example, A and/or B may represent the following three cases: Only A exists, both A and B exist, and only B exists.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

A person of ordinary skill in the art may be aware that, in combination with illustrative logical blocks (illustrative logical block) and steps (step) described in the embodiments disclosed in this specification, functions may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions (programs). When the computer program instruction (program) is loaded and executed on a computer, the procedure or functions according to the embodiments of the present invention are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:

receiving indication information and quasi co-location (QCL) information, wherein the indication information indicates a total quantity N of layers of downlink data and N demodulation reference signal (DMRS) antenna ports, and the QCL information indicates a QCL type, wherein N is a positive integer; and determining, based on the QCL information and the indication information, the total quantity N of layers of downlink data and a DMRS antenna port occupied by the downlink data, wherein the QCL information indicates a QCL type C, and at least one of the following occurs:

there is a correspondence between the indication information and one of a plurality of pieces of combination information, the correspondence satisfies one of correspondences between the indication information and the combination information in the following Table A, and the combination information comprises the total quantity N of layers of downlink data and information about the N DMRS antenna ports, wherein Table A is:

| Two codewords (Two codewords: Codeword 0 enabled, Codeword 1 enabled) | |
| --- | --- |
| Value (value) of indication information | Combination information (message) |
| 0 | 2 layers, ports 7 and 8, n_SCID = 0 |
| 1 | 2 layers, ports 7 and 8, n_SCID = 1 |
| 2 | 3 layers, ports 7, 9, and 10 |
| 3 | 4 layers, ports 7 to 10 |
| 4 | 5 layers, ports 7, 8, 9, 10, and 12 |
| 5 | 6 layers, ports 7, 8, 11, 9, 10, and 12 |
| 6 | 7 layers, ports 7, 8, 11, 9, 10, 12, and 14 |
| 7 | 8 layers, ports 7, 8, 11, 13, 9, 10, 12, and 14 | or there is a correspondence between the indication information and one of a plurality of pieces of combination information, the correspondence satisfies one of correspondences between the indication information and the combination information in the following Table B, and the combination information comprises the total quantity N of layers of downlink data and information about the N DMRS antenna ports, wherein Table B is:

| Two codewords (Two codewords: Codeword 0 enabled, Codeword 1 enabled) | |
| --- | --- |
| Value (value) of indication information | Combination information (message) |
| 0 | 2 layers, ports 7 and 8, n_SCID = 0 (OCC = 2) |
| 1 | 2 layers, ports 7 and 8, n_SCID = 1 (OCC = 2) |
| 2 | 2 layers, ports 7 and 8, n_SCID = 0 (OCC = 4) |
| 3 | 2 layers, ports 7 and 8, n_SCID = 1 (OCC = 4) |
| 4 | 2 layers, ports 11 and 13, n_SCID = 0 (OCC = 4) |
| 5 | 2 layers, ports 11 and 13, n_SCID = 1 (OCC = 4) |
| 6 | 3 layers, ports 7, 9, and 10 |
| 7 | 4 layers, ports 7 to 10 |

-continued

| Two codewords (Two codewords: Codeword 0 enabled, Codeword 1 enabled) | |
|---|---|
| Value (value) of indication information | Combination information (message) |
| 8 | 5 layers, ports 7, 8, 9, 10, and 12 |
| 9 | 6 layers, ports 7, 8, 11, 9, 10, and 12 |
| 10 | 7 layers, ports 7, 8, 11, 9, 10, 12, and 14 |
| 11 | 8 layers, ports 7, 8, 11, 13, 9, 10, 12, and 14 |
| 12 | Reserved |
| 13 | Reserved |
| 14 | Reserved |
| 15 | Reserved | or
the indication information indicating a total quantity N of layers of downlink data and N DMRS antenna ports comprises:
   the indication information indicating that the total quantity of layers of downlink data is 3, and the DMRS antenna ports are antenna ports 7, 9, and 10 in sequence; or
   the indication information indicating that the total quantity of layers of downlink data is 5, and the DMRS antenna ports are antenna ports 7, 8, 9, 10, and 12 in sequence; or
   the indication information indicating that the total quantity of layers of downlink data is 6, and the DMRS antenna ports are antenna ports 7, 8, 11, 9, 10, and 12 in sequence; or
   the indication information indicating that the total quantity of layers of downlink data is 7, and the DMRS antenna ports are antenna ports 7, 8, 11, 9, 10, 12, and 14 in sequence; or
   the indication information indicating that the total quantity of layers of downlink data is 8, and the DMRS antenna ports are antenna ports 7, 8, 11, 13, 9, 10, 12, and 14 in sequence.

2. The method according to claim 1, wherein the indication information is configured by higher layer signaling.

3. The method according to claim 1, wherein the N DMRS antenna ports indicated by the indication information are N non-sequentially numbered DMRS antenna ports corresponding to sequentially numbered layers, and N is one of 3, 5, 6, 7, or 8.

4. A communication method, comprising:
generating indication information and quasi co-location (QCL) information, wherein the indication information indicates a total quantity N of layers of downlink data and N demodulation reference signal (DMRS) antenna ports, and the QCL information indicates a QCL type, wherein N is a positive integer; and
sending the indication information and the quasi co-location QCL information, wherein the QCL information indicates a QCL type C, and at least one of the following occurs:
   there is a correspondence between the indication information and one of a plurality of pieces of combination information, the correspondence satisfies one of correspondences between the indication information and the combination information in the following Table A, and the combination information comprises the total quantity N of layers of downlink data and information about the N DMRS antenna ports, wherein Table A is:

| Two codewords (Two codewords: Codeword 0 enabled, Codeword 1 enabled) | |
|---|---|
| Value (value) of indication information | Combination information (message) |
| 0 | 2 layers, ports 7 and 8, n_SCID = 0 |
| 1 | 2 layers, ports 7 and 8, n_SCID = 1 |
| 2 | 3 layers, ports 7, 9, and 10 |
| 3 | 4 layers, ports 7 to 10 |
| 4 | 5 layers, ports 7, 8, 9, 10, and 12 |
| 5 | 6 layers, ports 7, 8, 11, 9, 10, and 12 |
| 6 | 7 layers, ports 7, 8, 11, 9, 10, 12, and 14 |
| 7 | 8 layers, ports 7, 8, 11, 13, 9, 10, 12, and 14 | or
there is a correspondence between the indication information and one of a plurality of pieces of combination information, the correspondence satisfies one of correspondences between the indication information and the combination information in the following Table B, and the combination information comprises the total quantity N of layers of downlink data and information about the N DMRS antenna ports, wherein Table B is:

| Two codewords (Two codewords: Codeword 0 enabled, Codeword 1 enabled) | |
|---|---|
| Value (value) of indication information | Combination information (message) |
| 0 | 2 layers, ports 7 and 8, n_SCID = 0 (OCC = 2) |
| 1 | 2 layers, ports 7 and 8, n_SCID = 1 (OCC = 2) |
| 2 | 2 layers, ports 7 and 8, n_SCID = 0 (OCC = 4) |
| 3 | 2 layers, ports 7 and 8, n_SCID = 1 (OCC = 4) |
| 4 | 2 layers, ports 11 and 13, n_SCID = 0 (OCC = 4) |
| 5 | 2 layers, ports 11 and 13, n_SCID = 1 (OCC = 4) |
| 6 | 3 layers, ports 7, 9, and 10 |
| 7 | 4 layers, ports 7 to 10 |
| 8 | 5 layers, ports 7, 8, 9, 10, and 12 |
| 9 | 6 layers, ports 7, 8, 11, 9, 10, and 12 |
| 10 | 7 layers, ports 7, 8, 11, 9, 10, 12, and 14 |
| 11 | 8 layers, ports 7, 8, 11, 13, 9, 10, 12, and 14 |
| 12 | Reserved |
| 13 | Reserved |
| 14 | Reserved |
| 15 | Reserved | or
the indication information indicating a total quantity N of layers of downlink data and N DMRS antenna ports comprises:
   the indication information indicating that the total quantity of layers of downlink data is 3, and the DMRS antenna ports are antenna ports 7, 9, and 10 in sequence; or
   the indication information indicating that the total quantity of layers of downlink data is 5, and the DMRS antenna ports are antenna ports 7, 8, 9, 10, and 12 in sequence; or
   the indication information indicating that the total quantity of layers of downlink data is 6, and the DMRS antenna ports are antenna ports 7, 8, 11, 9, 10, and 12 in sequence; or
   the indication information indicating that the total quantity of layers of downlink data is 7, and the DMRS antenna ports are antenna ports 7, 8, 11, 9, 10, 12, and 14 in sequence; or the indication information indicating that the total quantity of layers of downlink data is 8, and the DMRS antenna ports are antenna ports 7, 8, 11, 13, 9, 10, 12, and 14 in sequence.

5. The method according to claim 4, wherein the indication information is configured by higher layer signaling.

6. The method according to claim 4, wherein the N DMRS antenna ports indicated by the indication information are N non-sequentially numbered DMRS antenna ports corresponding to sequentially numbered layers, and N is one of 3, 5, 6, 7, or 8.

7. A communications apparatus, comprising one or more processors and a memory coupled to the one or more processors, wherein the memory stores programming instructions that when executed by the one or more processors, cause the communications apparatus to perform the following:

receiving indication information and quasi co-location (QCL) information, wherein the indication information indicates a total quantity N of layers of downlink data and N demodulation reference signal (DMRS) antenna ports, and the QCL information indicates a QCL type, wherein N is a positive integer; and determining, based on the QCL information and the indication information, the total quantity N of layers of downlink data and a DMRS antenna port occupied by the downlink data, wherein the QCL information indicates a QCL type C, and at least one of the following occurs:

there is a correspondence between the indication information and one of a plurality of pieces of combination information, the correspondence satisfies one of correspondences between the indication information and the combination information in the following Table A, and the combination information comprises the total quantity N of layers of downlink data and information about the N DMRS antenna ports, wherein Table A is:

| Two codewords (Two codewords: Codeword 0 enabled, Codeword 1 enabled) | |
| --- | --- |
| Value (value) of indication information | Combination information (message) |
| 0 | 2 layers, ports 7 and 8, n_SCID = 0 |
| 1 | 2 layers, ports 7 and 8, n_SCID = 1 |
| 2 | 3 layers, ports 7, 9, and 10 |
| 3 | 4 layers, ports 7 to 10 |
| 4 | 5 layers, ports 7, 8, 9, 10, and 12 |
| 5 | 6 layers, ports 7, 8, 11, 9, 10, and 12 |
| 6 | 7 layers, ports 7, 8, 11, 9, 10, 12, and 14 |
| 7 | 8 layers, ports 7, 8, 11, 13, 9, 10, 12, and 14 | or there is a correspondence between the indication information and one of a plurality of pieces of combination information, the correspondence satisfies one of correspondences between the indication information and the combination information in the following Table B, and the combination information comprises the total quantity N of layers of downlink data and information about the N DMRS antenna ports, wherein Table B is:

| Two codewords (Two codewords: Codeword 0 enabled, Codeword 1 enabled) | |
| --- | --- |
| Value (value) of indication information | Combination information (message) |
| 0 | 2 layers, ports 7 and 8, n_SCID = 0 (OCC = 2) |
| 1 | 2 layers, ports 7 and 8, n_SCID = 1 (OCC = 2) |
| 2 | 2 layers, ports 7 and 8, n_SCID = 0 (OCC = 4) |
| 3 | 2 layers, ports 7 and 8, n_SCID = 1 (OCC = 4) |
| 4 | 2 layers, ports 11 and 13, n_SCID = 0 (OCC = 4) |
| 5 | 2 layers, ports 11 and 13, n_SCID = 1 (OCC = 4) |
| 6 | 3 layers, ports 7, 9, and 10 |
| 7 | 4 layers, ports 7 to 10 |
| 8 | 5 layers, ports 7, 8, 9, 10, and 12 |
| 9 | 6 layers, ports 7, 8, 11, 9, 10, and 12 |
| 10 | 7 layers, ports 7, 8, 11, 9, 10, 12, and 14 |
| 11 | 8 layers, ports 7, 8, 11, 13, 9, 10, 12, and 14 |
| 12 | Reserved |
| 13 | Reserved |
| 14 | Reserved |
| 15 | Reserved | or the indication information indicating a total quantity N of layers of downlink data and N DMRS antenna ports comprises:

the indication information indicating that the total quantity of layers of downlink data is 3, and the DMRS antenna ports are antenna ports 7, 9, and 10 in sequence; or the indication information indicating that the total quantity of layers of downlink data is 5, and the DMRS antenna ports are antenna ports 7, 8, 9, 10, and 12 in sequence; or the indication information indicating that the total quantity of layers of downlink data is 6, and the DMRS antenna ports are antenna ports 7, 8, 11, 9, 10, and 12 in sequence; or the indication information indicating that the total quantity of layers of downlink data is 7, and the DMRS antenna ports are antenna ports 7, 8, 11, 9, 10, 12, and 14 in sequence; or the indication information indicating that the total quantity of layers of downlink data is 8, and the DMRS antenna ports are antenna ports 7, 8, 11, 13, 9, 10, 12, and 14 in sequence.

8. The apparatus according to claim 7, wherein the indication information is configured by higher layer signaling.

9. The apparatus according to claim 7, wherein the N DMRS antenna ports indicated by the indication information are N non-sequentially numbered DMRS antenna ports corresponding to sequentially numbered layers, and N is one of 3, 5, 6, 7, or 8.

10. A communications apparatus, comprising one or more processors and a memory coupled to the one or more processors, wherein the memory stores programming instructions that when executed by the one or more processors, cause the communications apparatus to perform the following:

generating indication information and quasi co-location (QCL) information, wherein the indication information indicates a total quantity N of layers of downlink data and N demodulation reference signal (DMRS) antenna ports, and the QCL information indicates a QCL type, wherein N is a positive integer; and sending the indication information and the quasi co-location QCL information, wherein the QCL information indicates a QCL type C, and at least one of the following occurs:

there is a correspondence between the indication information and one of a plurality of pieces of combination information, the correspondence satisfies one of correspondences between the indication information and the combination information in the following Table A, and the combination information comprises the total quantity N of layers of downlink data and information about the N DMRS antenna ports, wherein Table A is:

| Two codewords (Two codewords: Codeword 0 enabled, Codeword 1 enabled) | |
|---|---|
| Value (value) of indication information | Combination information (message) |
| 0 | 2 layers, ports 7 and 8, n_SCID = 0 |
| 1 | 2 layers, ports 7 and 8, n_SCID = 1 |
| 2 | 3 layers, ports 7, 9, and 10 |
| 3 | 4 layers, ports 7 to 10 |
| 4 | 5 layers, ports 7, 8, 9, 10, and 12 |
| 5 | 6 layers, ports 7, 8, 11, 9, 10, and 12 |
| 6 | 7 layers, ports 7, 8, 11, 9, 10, 12, and 14 |
| 7 | 8 layers, ports 7, 8, 11, 13, 9, 10, 12, and 14 | or there is a correspondence between the indication information and one of a plurality of pieces of combination information, the correspondence satisfies one of correspondences between the indication information and the combination information in the following Table B, and the combination information comprises the total quantity N of layers of downlink data and information about the N DMRS antenna ports, wherein Table B is:

| Two codewords (Two codewords: Codeword 0 enabled, Codeword 1 enabled) | |
|---|---|
| Value (value) of indication information | Combination information (message) |
| 0 | 2 layers, ports 7 and 8, n_SCID = 0 (OCC = 2) |
| 1 | 2 layers, ports 7 and 8, n_SCID = 1 (OCC = 2) |
| 2 | 2 layers, ports 7 and 8, n_SCID = 0 (OCC = 4) |
| 3 | 2 layers, ports 7 and 8, n_SCID = 1 (OCC = 4) |
| 4 | 2 layers, ports 11 and 13, n_SCID = 0 (OCC = 4) |
| 5 | 2 layers, ports 11 and 13, n_SCID = 1 (OCC = 4) |
| 6 | 3 layers, ports 7, 9, and 10 |
| 7 | 4 layers, ports 7 to 10 |
| 8 | 5 layers, ports 7, 8, 9, 10, and 12 |
| 9 | 6 layers, ports 7, 8, 11, 9, 10, and 12 |
| 10 | 7 layers, ports 7, 8, 11, 9, 10, 12, and 14 |
| 11 | 8 layers, ports 7, 8, 11, 13, 9, 10, 12, and 14 |
| 12 | Reserved |
| 13 | Reserved |
| 14 | Reserved |
| 15 | Reserved | or the indication information indicating a total quantity N of layers of downlink data and N DMRS antenna ports comprises:

the indication information indicating that the total quantity of layers of downlink data is 3, and the DMRS antenna ports are antenna ports 7, 9, and 10 in sequence; or the indication information indicating that the total quantity of layers of downlink data is 5, and the DMRS antenna ports are antenna ports 7, 8, 9, 10, and 12 in sequence; or the indication information indicating that the total quantity of layers of downlink data is 6, and the DMRS antenna ports are antenna ports 7, 8, 11, 9, 10, and 12 in sequence; or the indication information indicating that the total quantity of layers of downlink data is 7, and the DMRS antenna ports are antenna ports 7, 8, 11, 9, 10, 12, and 14 in sequence; or the indication information indicating that the total quantity of layers of downlink data is 8, and the DMRS antenna ports are antenna ports 7, 8, 11, 13, 9, 10, 12, and 14 in sequence.

\* \* \* \* \*